US011035364B2

(12) United States Patent
Kreuger

(10) Patent No.: US 11,035,364 B2
(45) Date of Patent: Jun. 15, 2021

(54) PRESSURE CHANGING DEVICE

(71) Applicant: Sten Kreuger, Chonburi (TH)

(72) Inventor: Sten Kreuger, Chonburi (TH)

( * ) Notice: Subject to any disclaimer, the term of this patent is extended or adjusted under 35 U.S.C. 154(b) by 216 days.

(21) Appl. No.: 16/164,406

(22) Filed: Oct. 18, 2018

(65) Prior Publication Data
US 2019/0154038 A1    May 23, 2019

Related U.S. Application Data

(60) Continuation-in-part of application No. 15/629,602, filed on Jun. 21, 2017, now Pat. No. 10,408,214.
(Continued)

(51) Int. Cl.
*F04C 29/00* (2006.01)
*F04C 23/00* (2006.01)
(Continued)

(52) U.S. Cl.
CPC .......... *F04C 29/0057* (2013.01); *F01C 1/104* (2013.01); *F02B 53/00* (2013.01);
(Continued)

(58) Field of Classification Search
CPC .... F04C 29/0057; F04C 29/124; F04C 18/22; F04C 23/0001; F04C 27/001; F04C 2250/201; F01C 1/104; F02B 2053/005
See application file for complete search history.

(56) References Cited

U.S. PATENT DOCUMENTS 1,629,370 A     5/1927  Vauclain
1,892,217 A  *  12/1932  Moineau .................. F01C 1/107
                                                                 74/458
(Continued)

FOREIGN PATENT DOCUMENTS

CN     86104412 A    2/1987
CN     87203294 U    8/1988
(Continued)

OTHER PUBLICATIONS

Weisstein, Eric W., Limacon, May 25, 1999, Michigan State Univeristy, https://archive.lib.msu.edu/crcmath/math/math/l/l273.htm (Year: 1999).*
(Continued)

*Primary Examiner* — Connor J Tremarche
(74) *Attorney, Agent, or Firm* — Andrew D. Fortney; Central California IP Group, P.C.

(57) ABSTRACT

Pressure changing devices and methods of making and using the same are disclosed. One pressure changing device includes an elliptic cylinder and a piston that has an external surface with a trochoid cross-section. Another pressure changing device includes a piston and a rotating cylinder that has an internal surface with a trochoid cross-section. Another pressure changing device includes two fixed axes, one for rotation of one component and another for orbiting or oscillation of the other component. The devices and methods include stacked pressure changing devices with one or more common shafts. The pressure changing device may be easier and less expensive to manufacture and repair than prior pressure changing devices of the same or similar functionality, and can provide efficient gap sealing in a high-pressure expansion part of a compression or expansion cycle.

20 Claims, 61 Drawing Sheets

Related U.S. Application Data which is a division of application No. 14/855,059, filed on Sep. 15, 2015, now Pat. No. 10,001,123.

(60) Provisional application No. 62/168,515, filed on May 29, 2015.

(51) Int. Cl.
    *F04C 18/22* (2006.01)
    *F02B 53/00* (2006.01)
    *F01C 1/10* (2006.01)
    *F04C 27/00* (2006.01)
    *F04C 29/12* (2006.01)

(52) U.S. Cl.
    CPC ......... *F02B 2053/005* (2013.01); *F04C 18/22* (2013.01); *F04C 23/001* (2013.01); *F04C 27/001* (2013.01); *F04C 29/124* (2013.01); *F04C 2250/201* (2013.01)

(56) References Cited

U.S. PATENT DOCUMENTS

| | | | |
|---|---|---|---|
| 2,525,265 A | 10/1950 | Moineau | |
| 2,525,946 A * | 10/1950 | Roberts | F16H 33/02 |
| | | | 477/6 |
| 3,208,391 A | 9/1965 | Lindberg | |
| 3,299,822 A | 1/1967 | Payne | |
| 3,338,220 A | 8/1967 | Marshall | |
| 3,387,772 A | 6/1968 | Wutz | |
| 4,923,376 A | 5/1990 | Wright | |
| 6,877,314 B2 | 4/2005 | Pels | |
| 6,926,505 B2 | 8/2005 | Sbarounis | |
| 7,549,850 B2 | 6/2009 | Trapalis | |
| 7,726,957 B2 | 6/2010 | Zelezny | |
| 7,896,627 B2 | 3/2011 | Okamoto et al. | |
| 8,220,381 B2 | 7/2012 | Nickl | |
| 8,539,931 B1 | 9/2013 | Hanna | |
| 8,578,695 B1 * | 11/2013 | Fluhler | F02G 3/00 |
| | | | 60/39.01 |
| 9,393,648 B2 | 7/2016 | Underwood et al. | |
| 2006/0018779 A1 | 1/2006 | Gorban | |
| 2006/0127259 A1 | 6/2006 | Gorban | |
| 2006/0233653 A1 | 10/2006 | Trapalis | |
| 2007/0128063 A1 | 6/2007 | Zelezny | |
| 2011/0200476 A1 * | 8/2011 | Holtzapple | F01C 19/085 |
| | | | 418/61.3 |
| 2012/0324903 A1 * | 12/2012 | Dewis | F02C 6/003 |
| | | | 60/772 |
| 2014/0250945 A1 * | 9/2014 | Huntington | F23C 9/00 |
| | | | 62/602 |

FOREIGN PATENT DOCUMENTS

| | | |
|---|---|---|
| CN | 2160025 Y | 3/1994 |
| CN | 1116277 A | 2/1996 |
| CN | 1485527 A | 3/2004 |
| CN | 1768192 A | 5/2006 |
| CN | 1842636 A | 10/2006 |
| EP | 0310549 A1 | 4/1989 |

OTHER PUBLICATIONS

Bai, Ming; Rotary=Piston Engine & Pump Thereof; Bibliographic data: CN87203294; Aug. 17, 1988; 1 pg.; https://worldwide.espacenet.com.

First Office Action and Search Report (with partial English translation); Application No. 201610379488.2; dated Jul. 25, 2019; 8 pgs.; State Intellectual Property Office of People's Republic of China.

Mechanic's Magazine, Museum, Register, Journal, and Gazette; Woodhouse's Rotary Steam-Engine; Feb. 2, 1839; No. 808.

Jun Yang et al.; "Development of a Two-Cylinder Rolling Piston CO2 Expander"; 2010; 5 pages; International Compressor Engineering Conference; Paper 2022.

F. Wrede et al.; "Recent Status of Trochoidal Type Compressors for Heat Pumps in Germany"; 1986; 28 pages; International Compressor Engineering Conference; Paper 530.

* cited by examiner

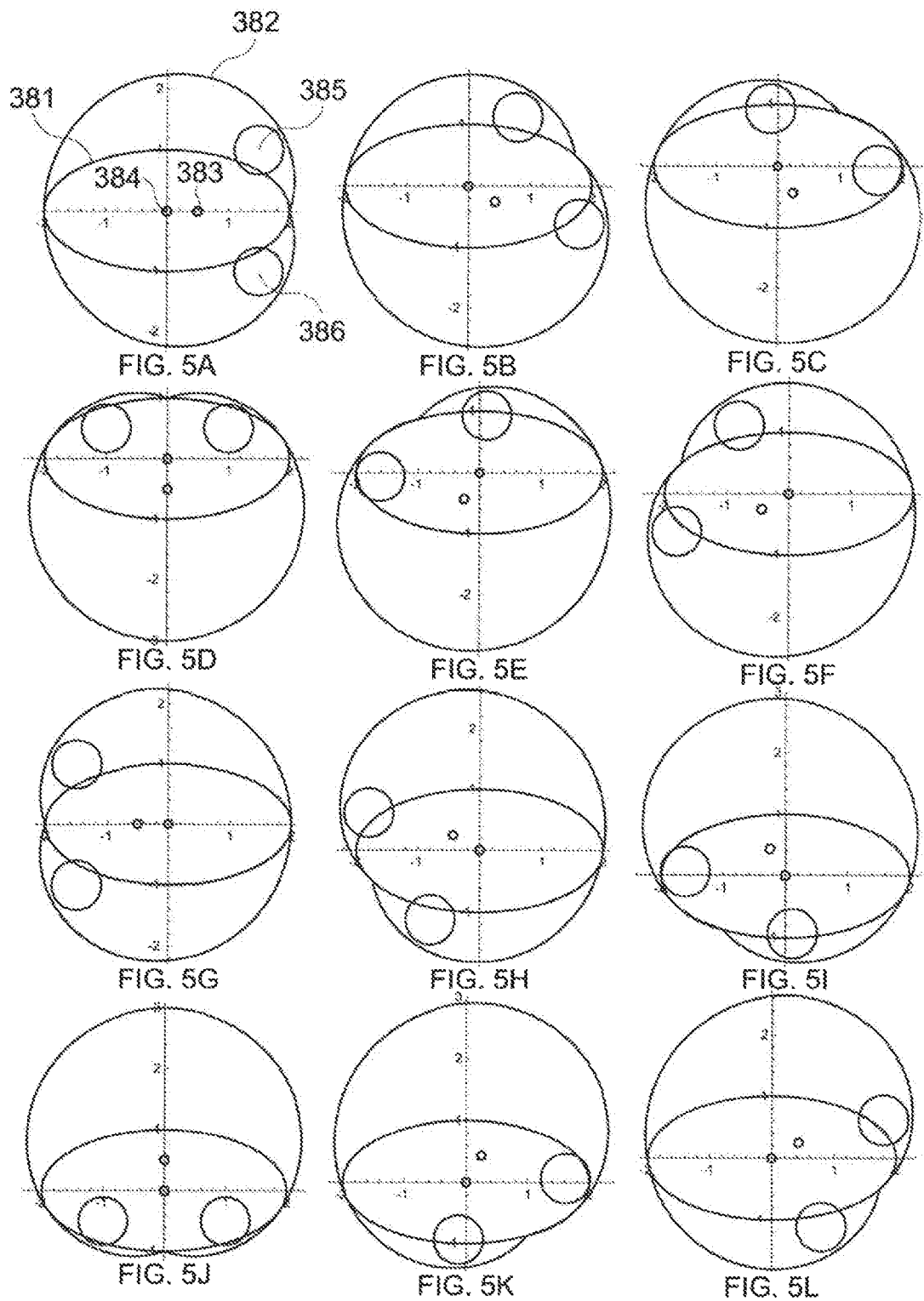

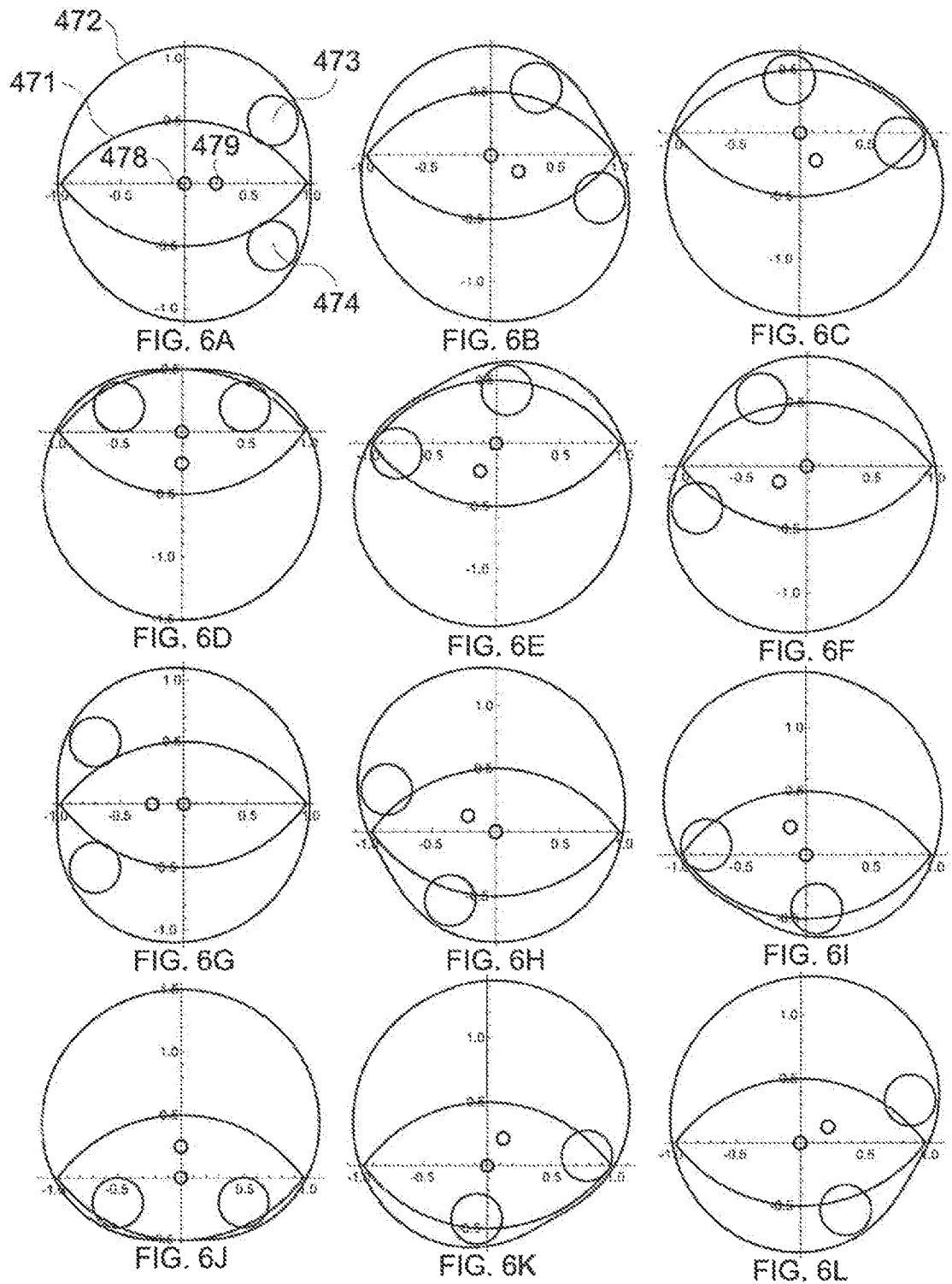

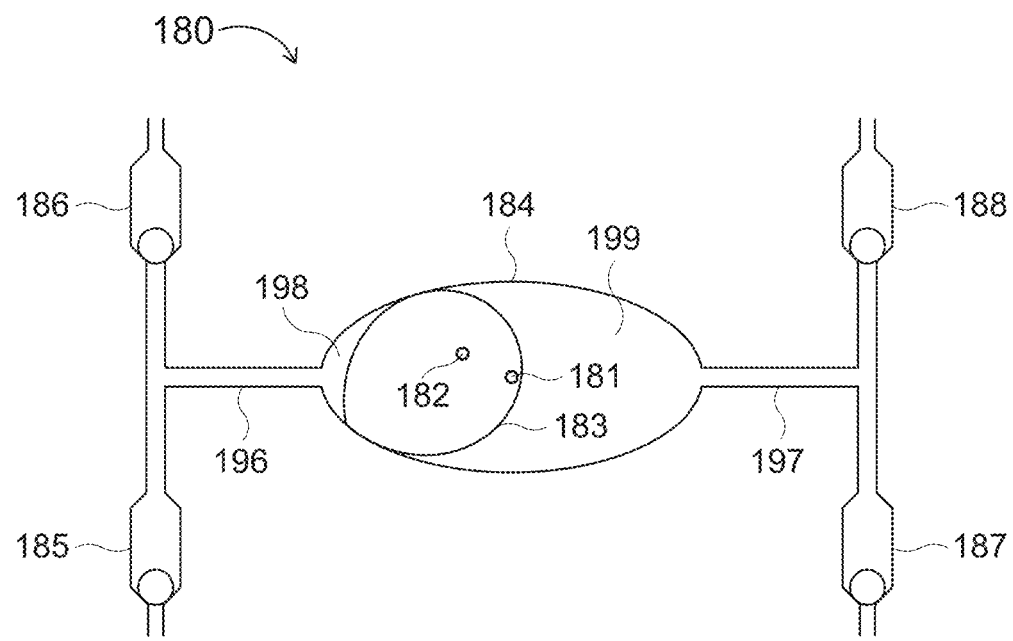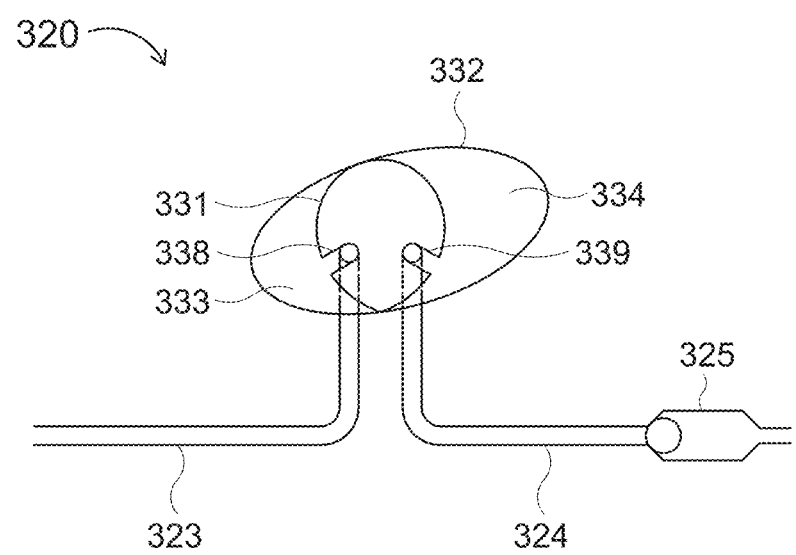
FIG. 7

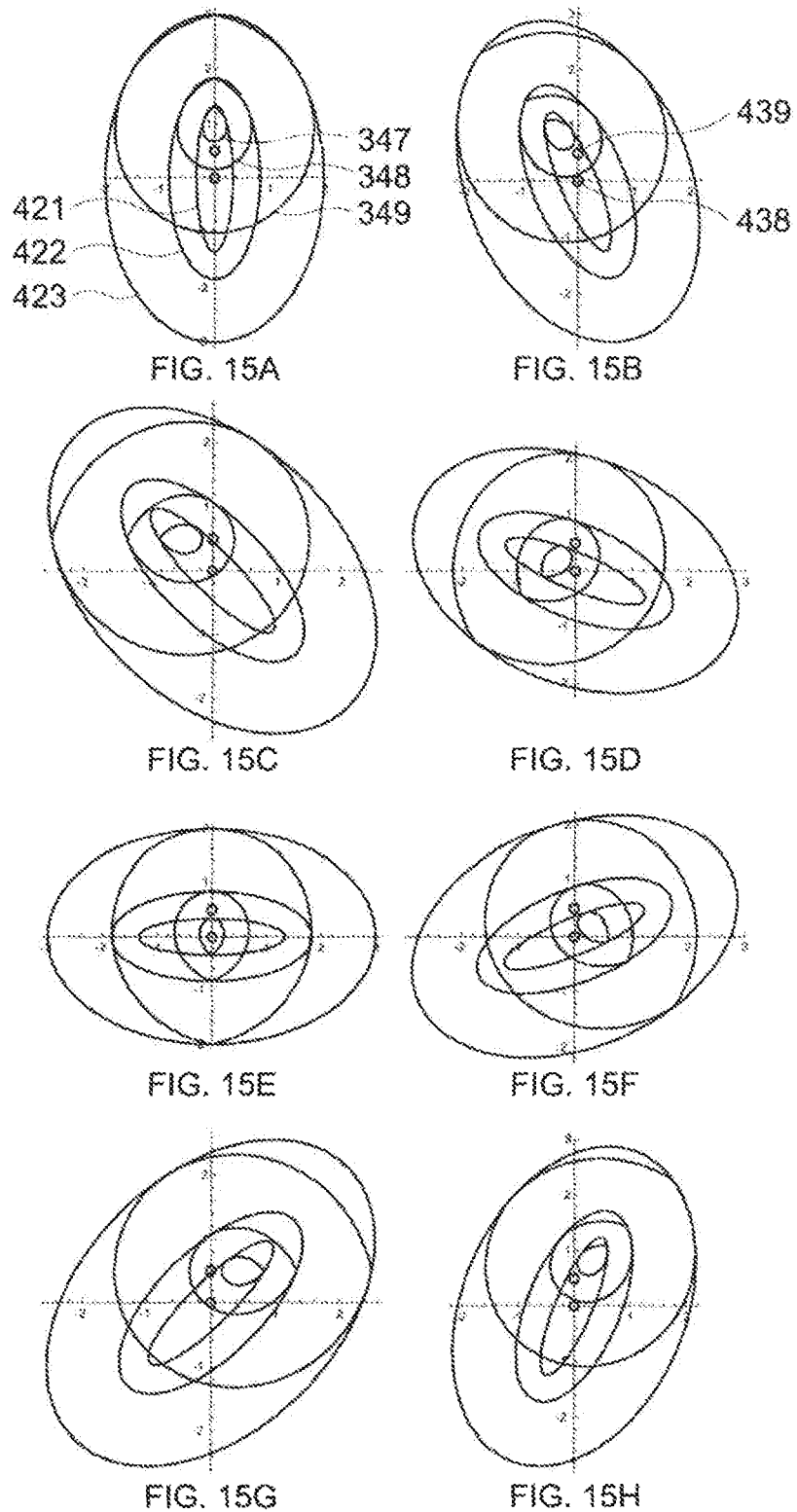

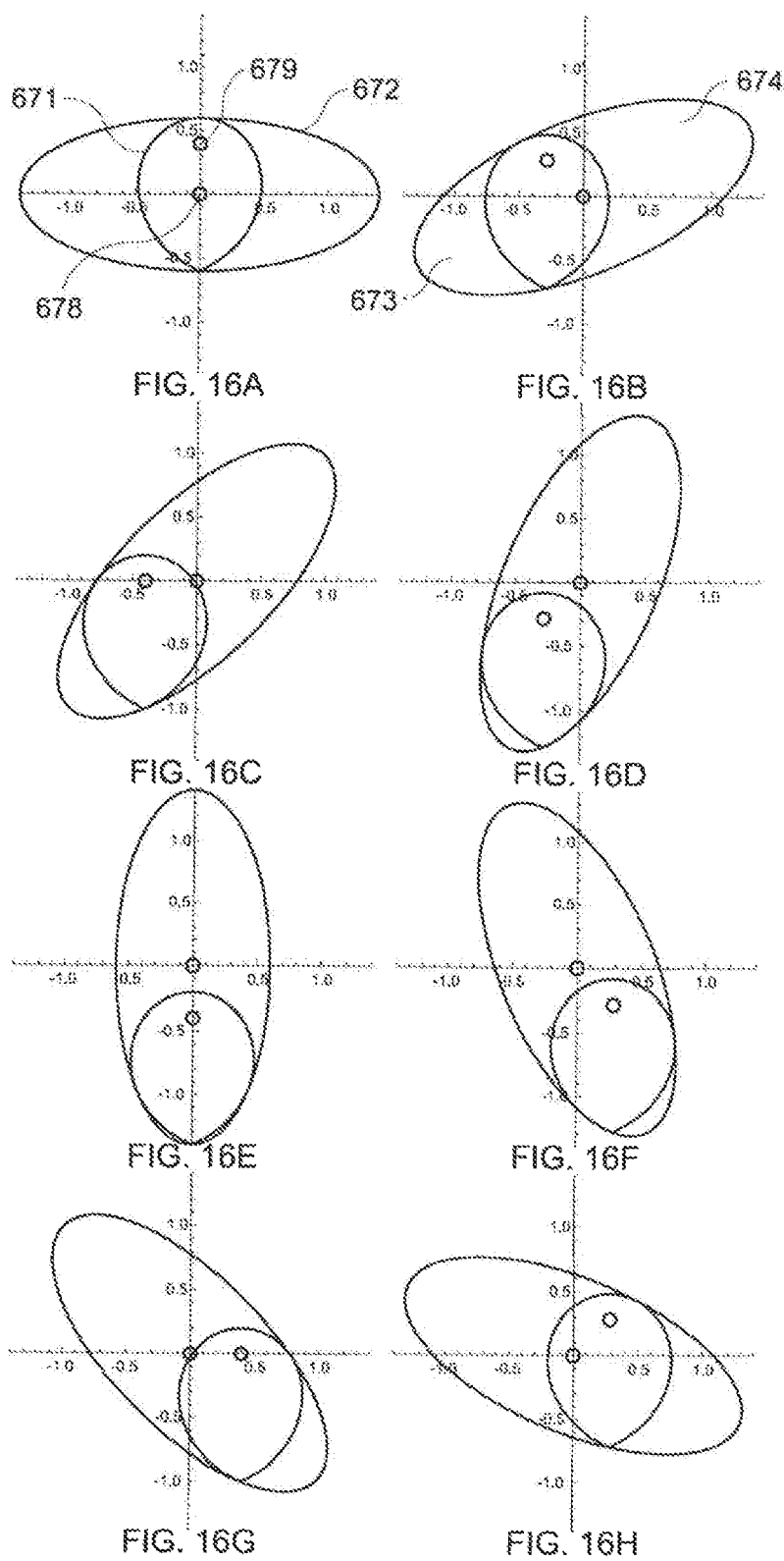

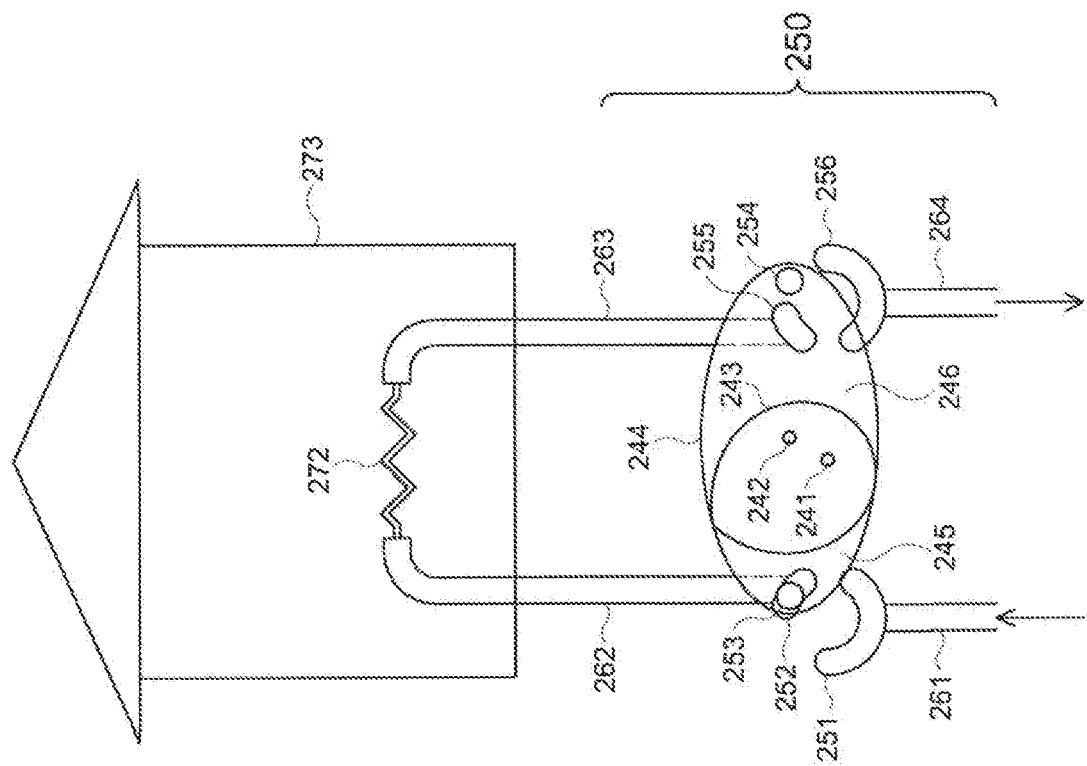
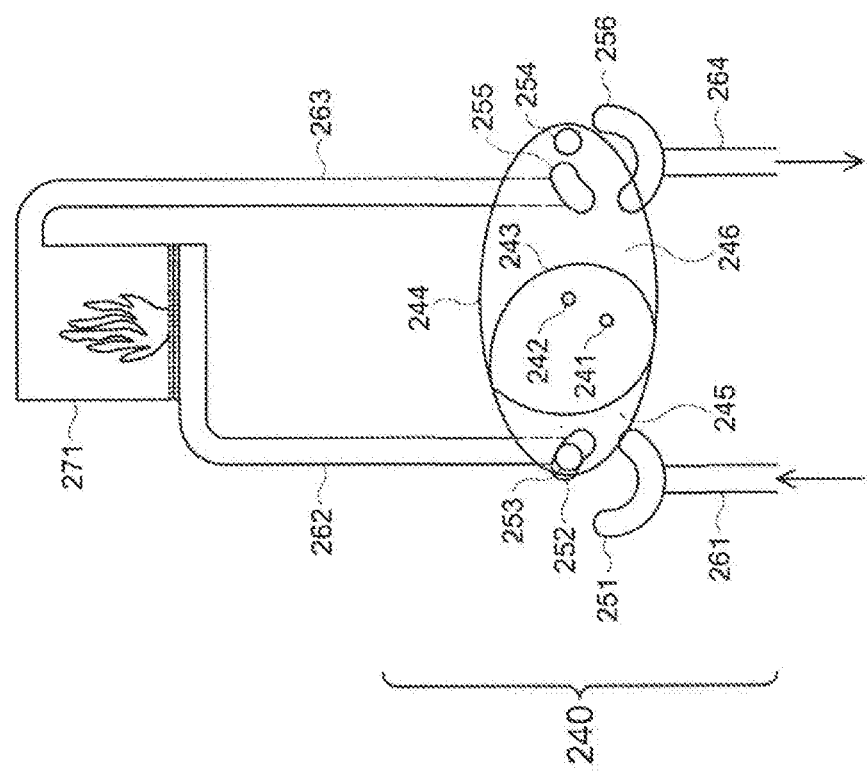

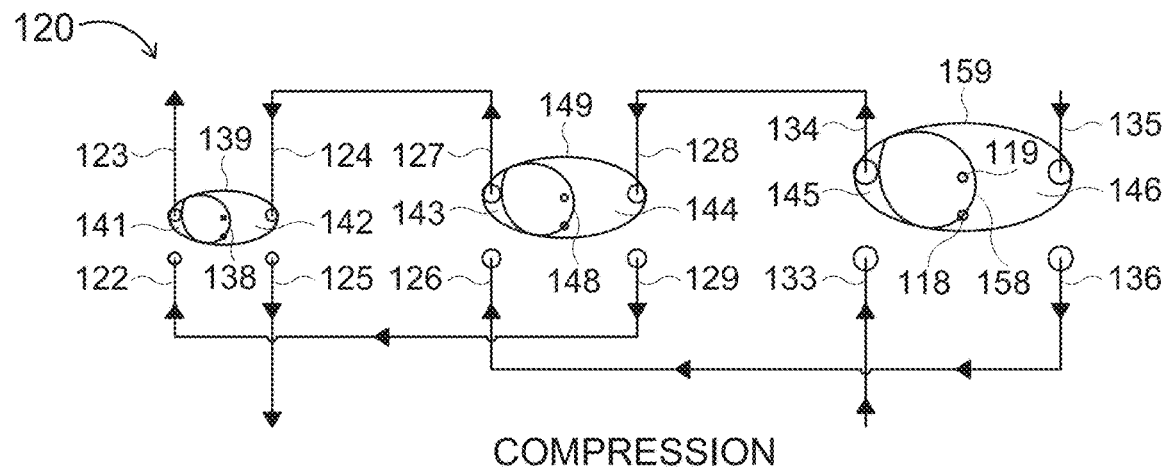
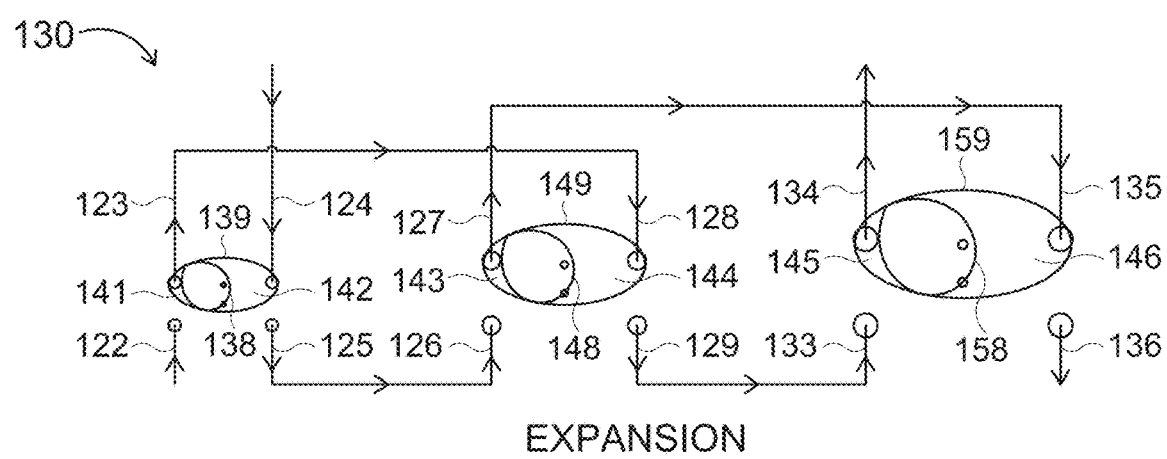
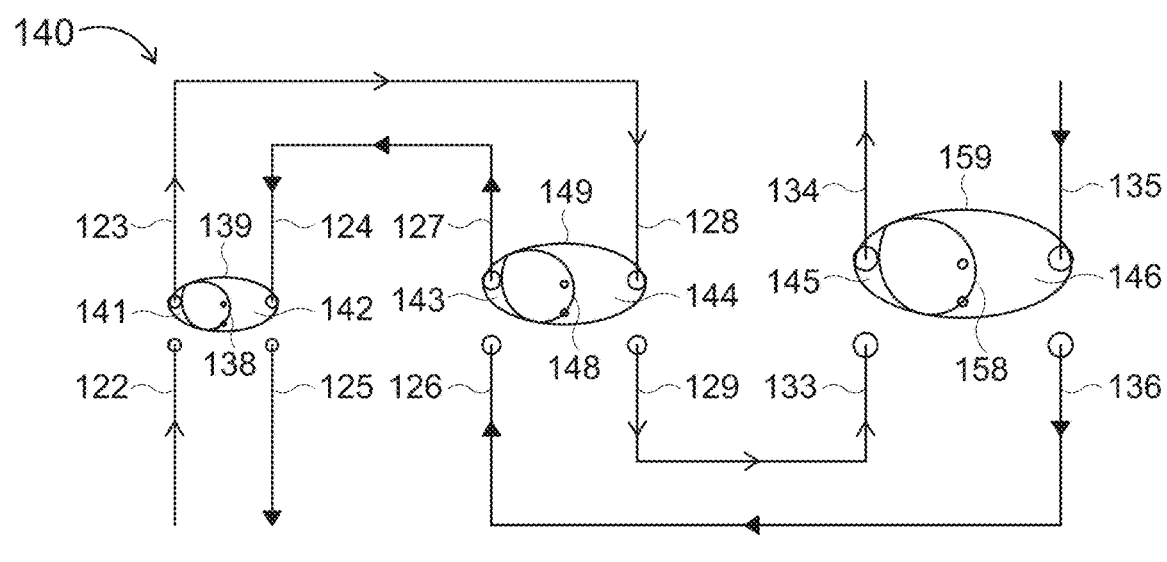
FIG. 26

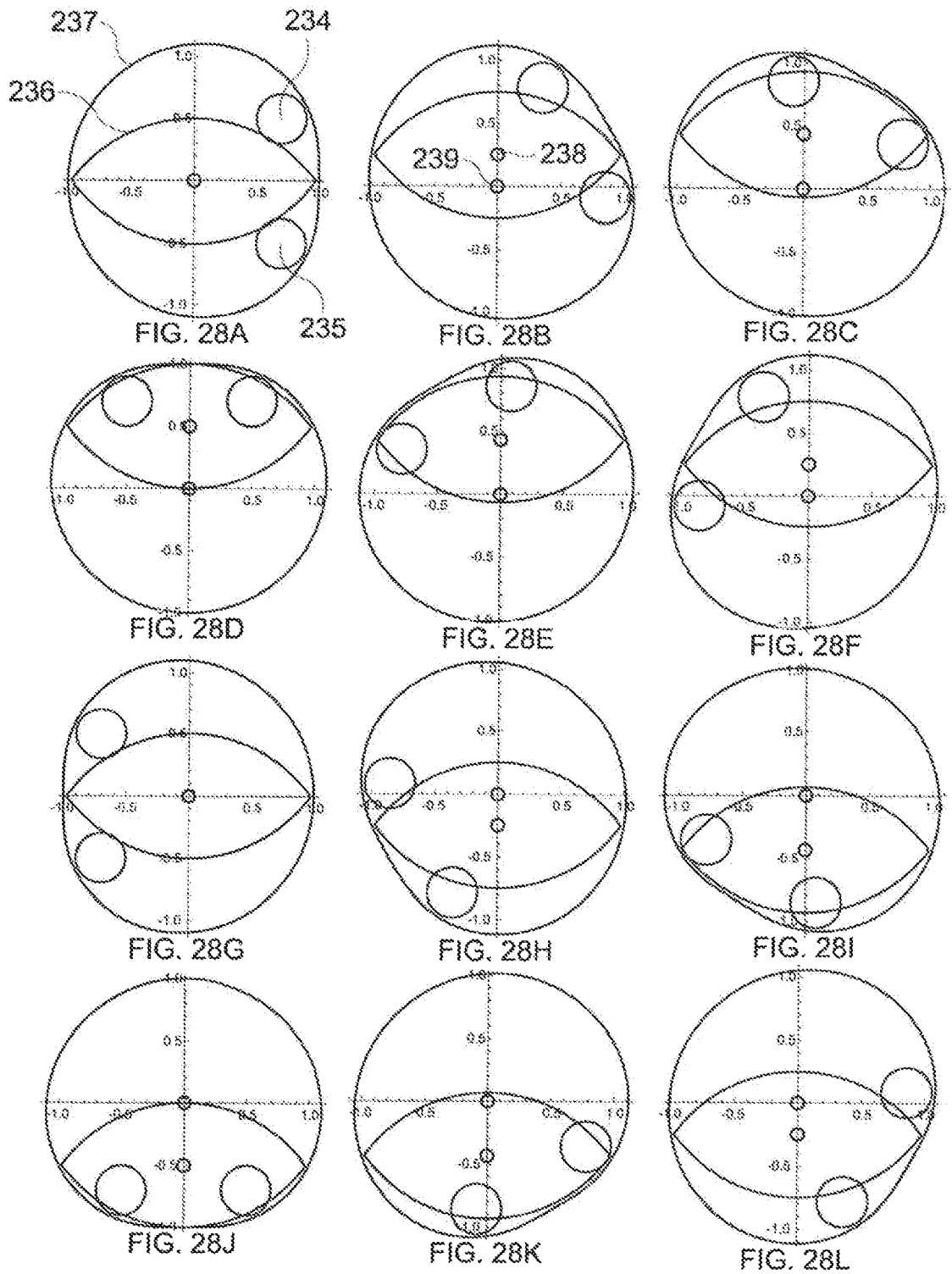

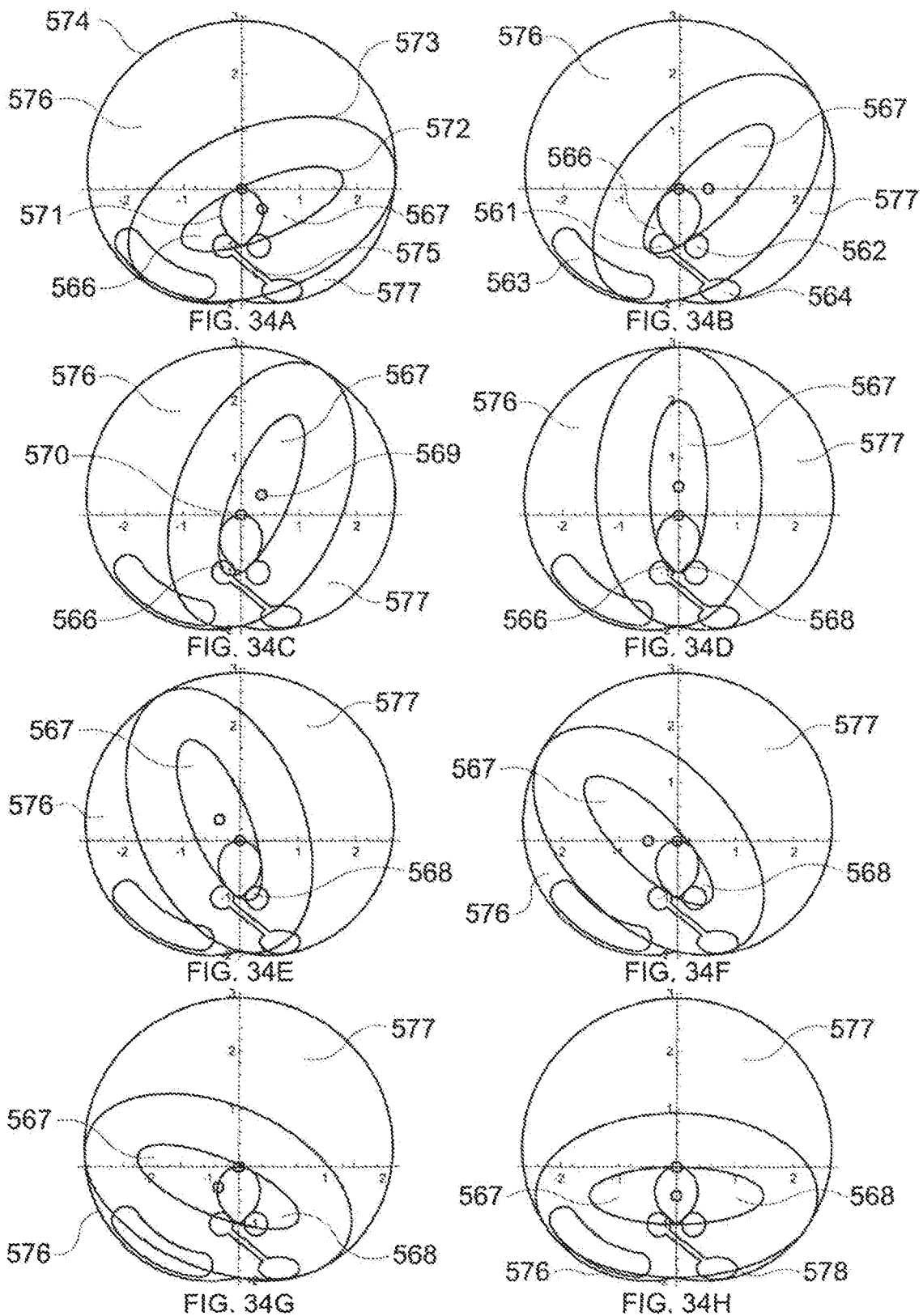

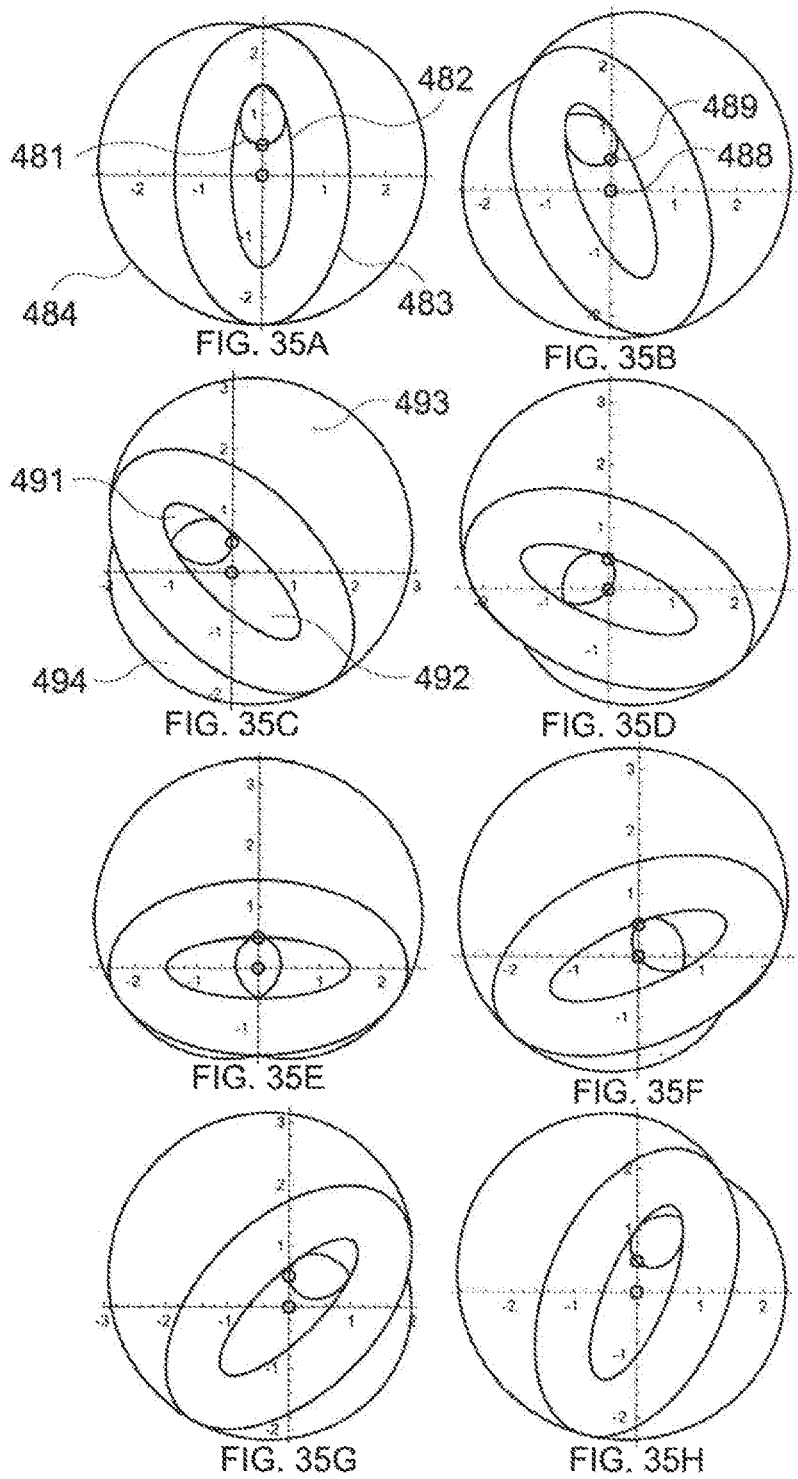

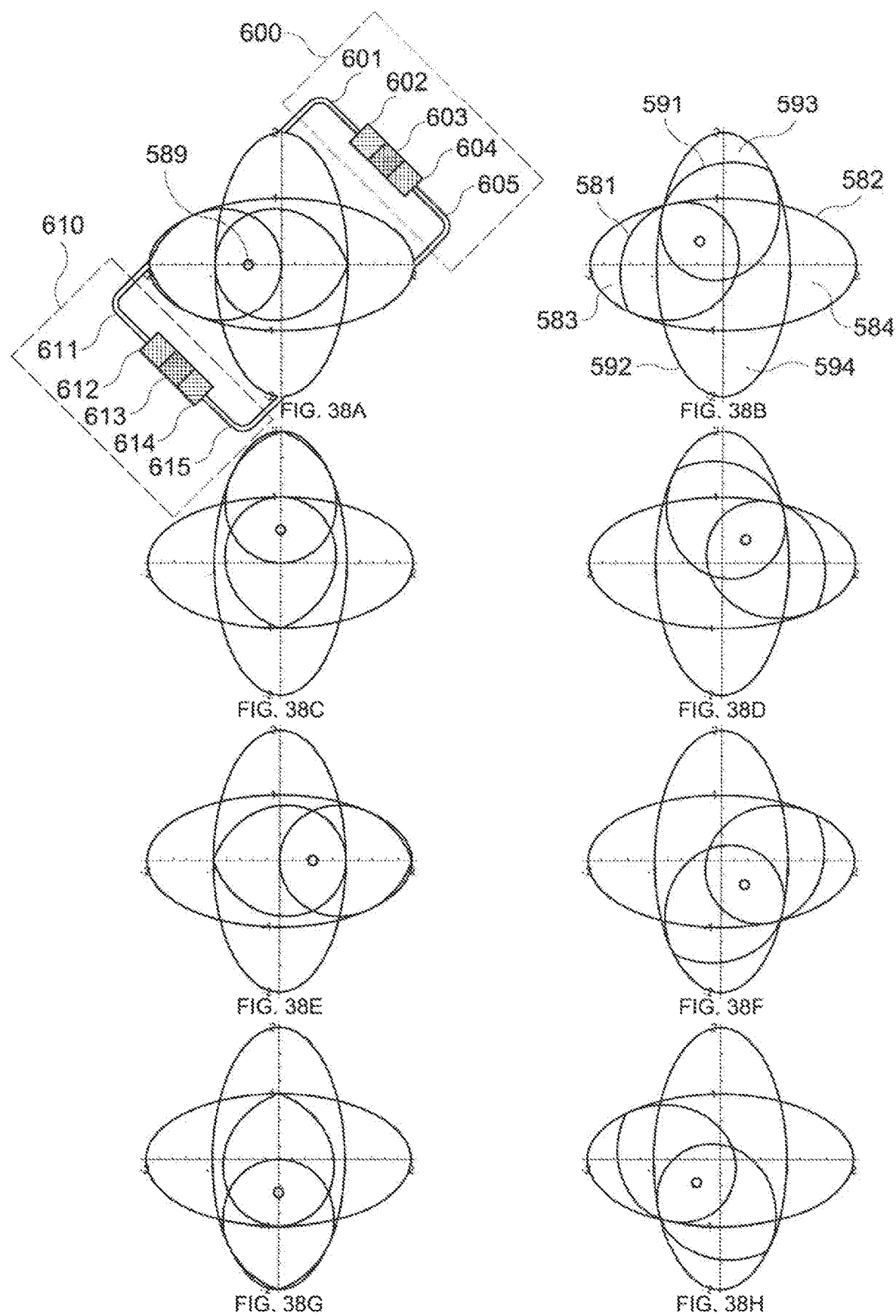

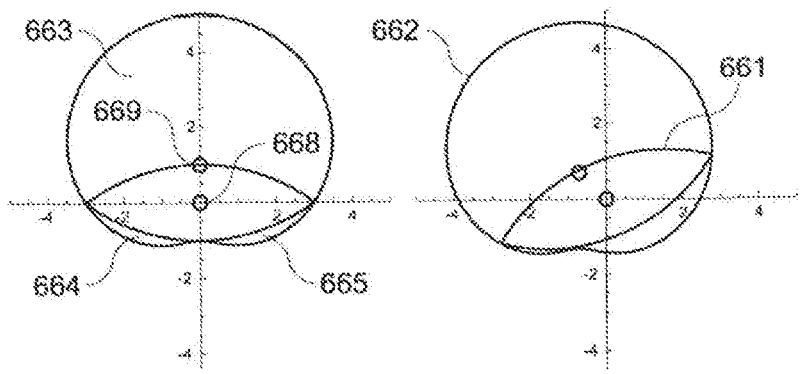
FIG. 39A
FIG. 39B
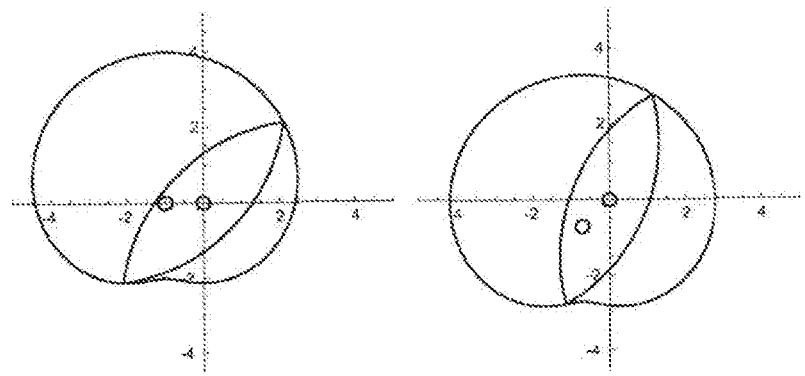
FIG. 39C
FIG. 39D
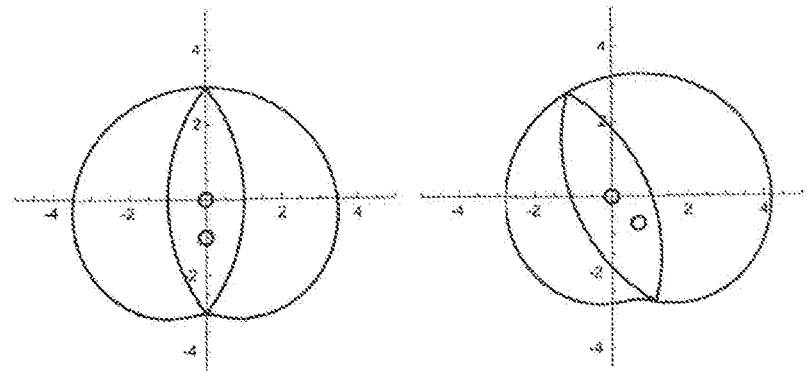
FIG. 39E
FIG. 39F
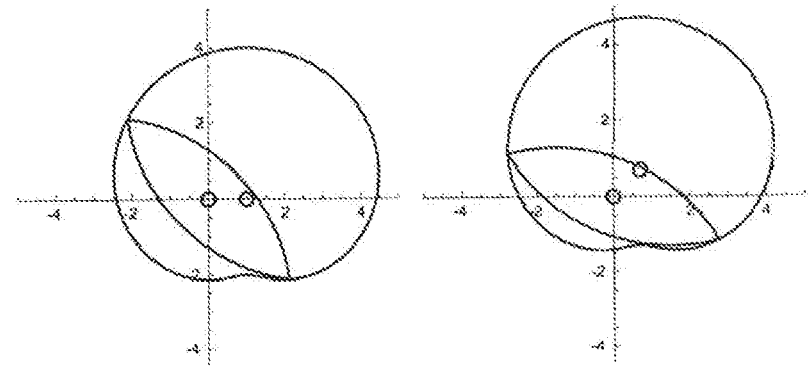
FIG. 39G
FIG. 39H

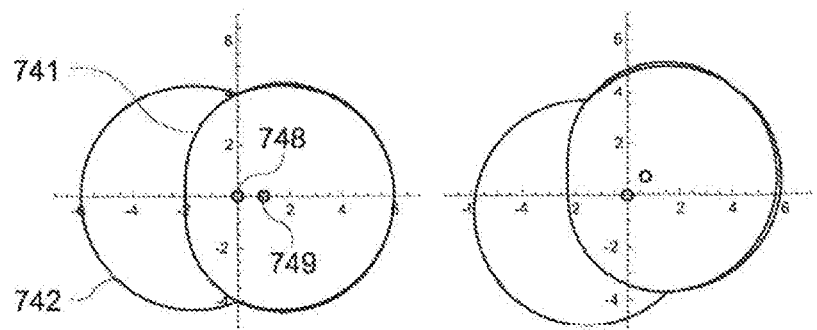
FIG. 40A
FIG. 40B
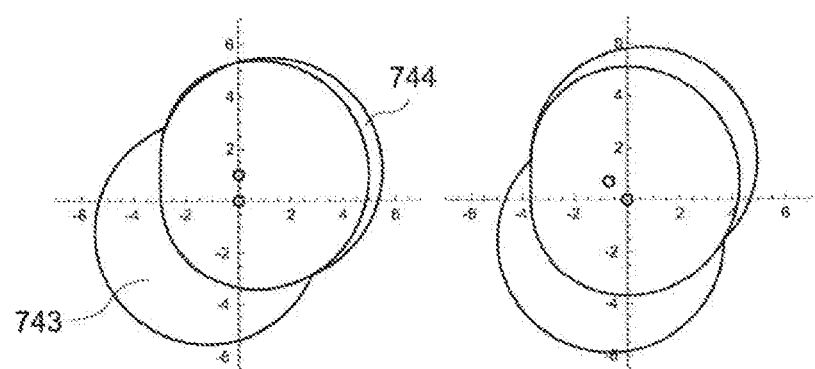
FIG. 40C
FIG. 40D
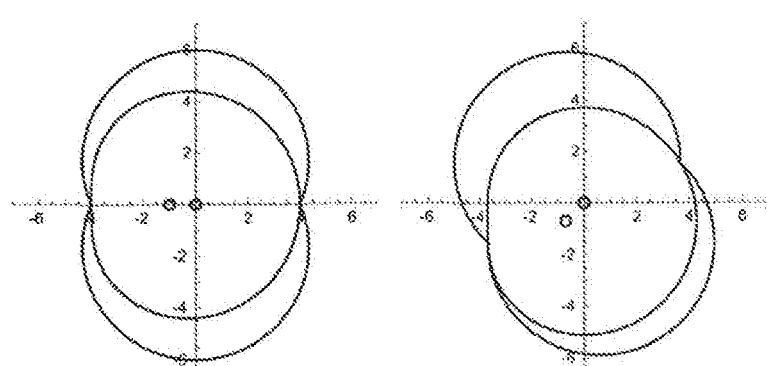
FIG. 40E
FIG. 40F
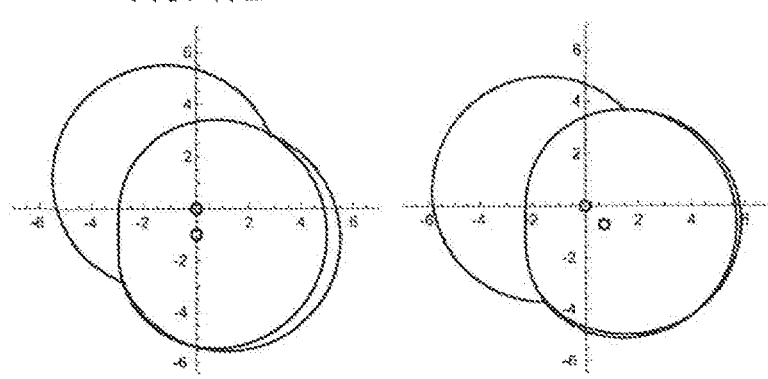
FIG. 40G
FIG. 40H

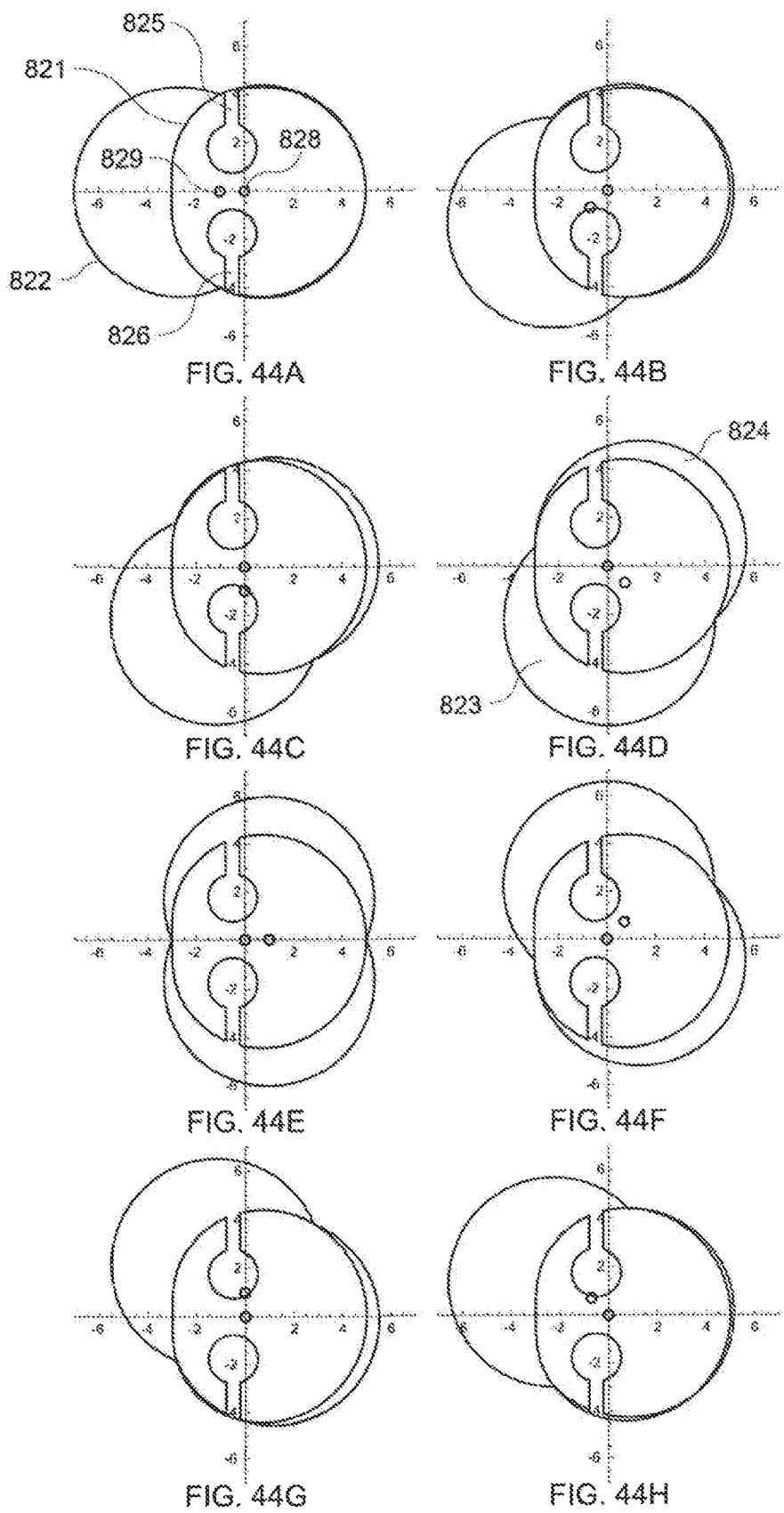

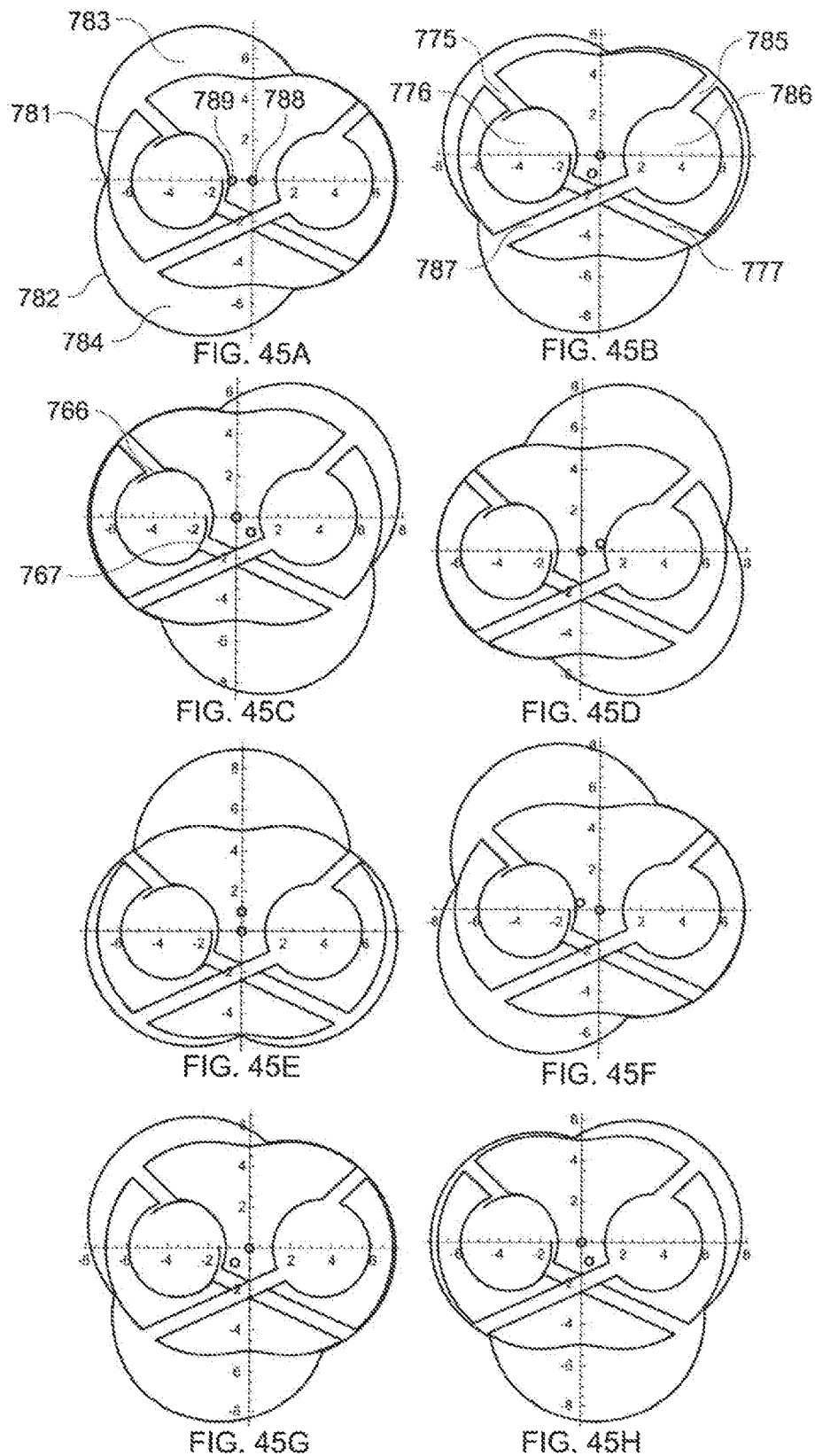

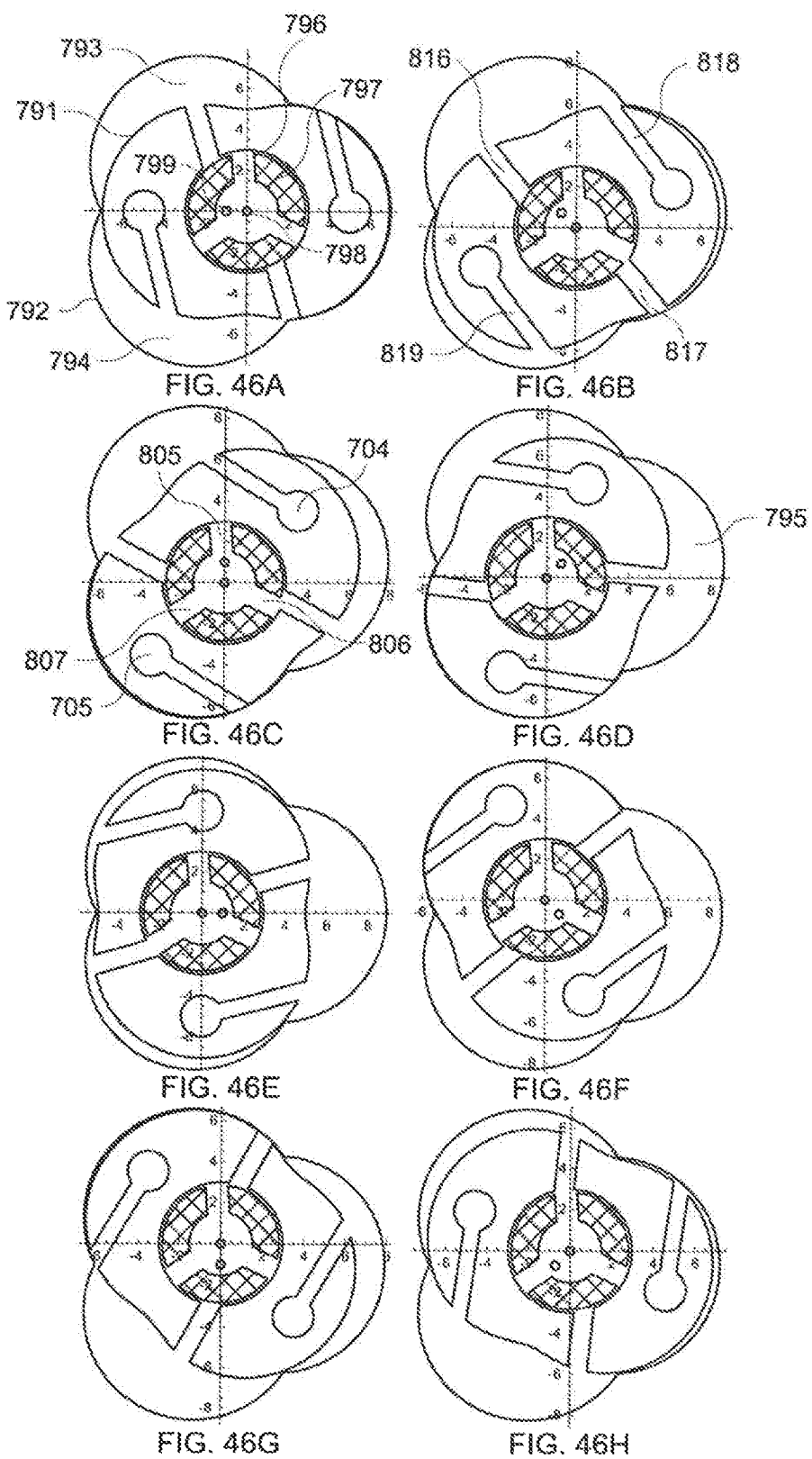

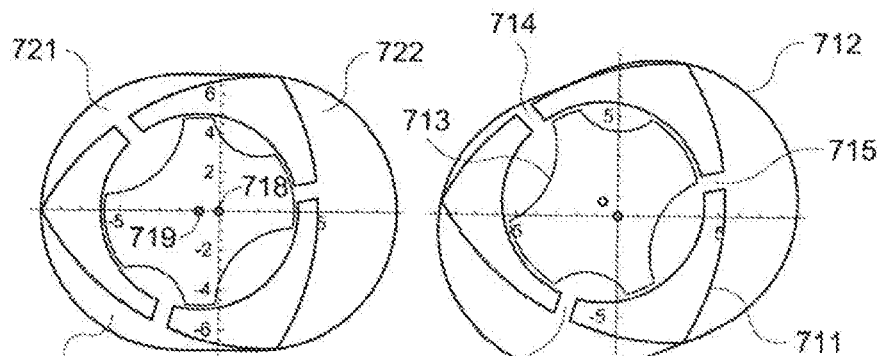
FIG. 50A FIG. 50B
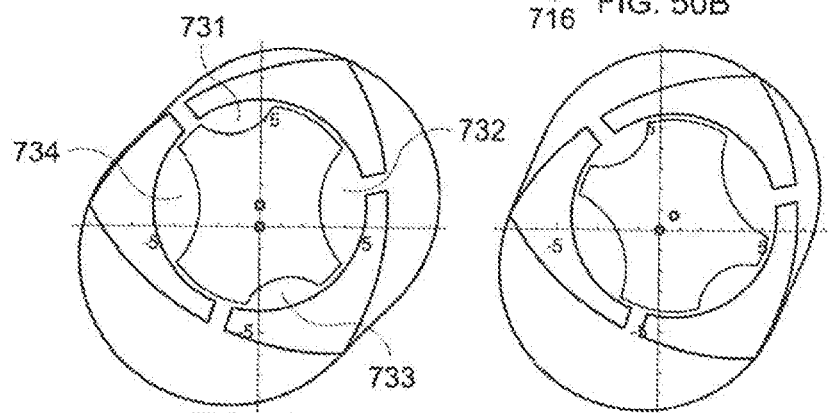
FIG. 50C FIG. 50D
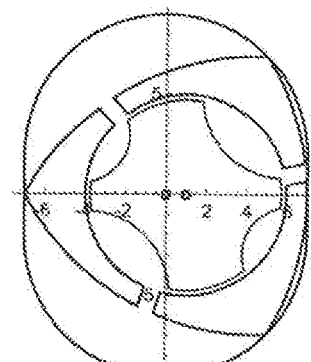 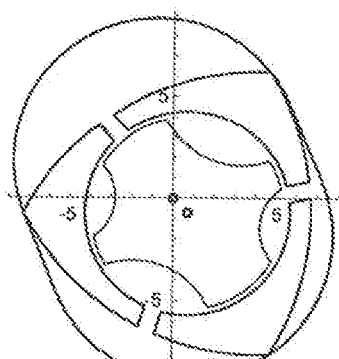
FIG. 50E FIG. 50F
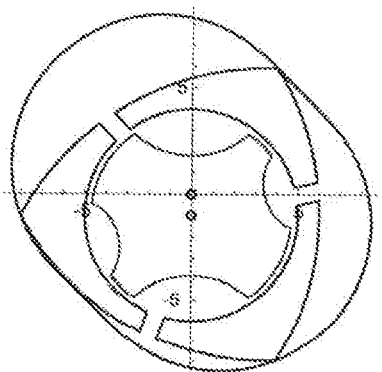 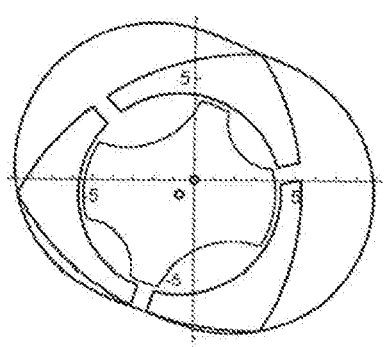
FIG. 50G FIG. 50H

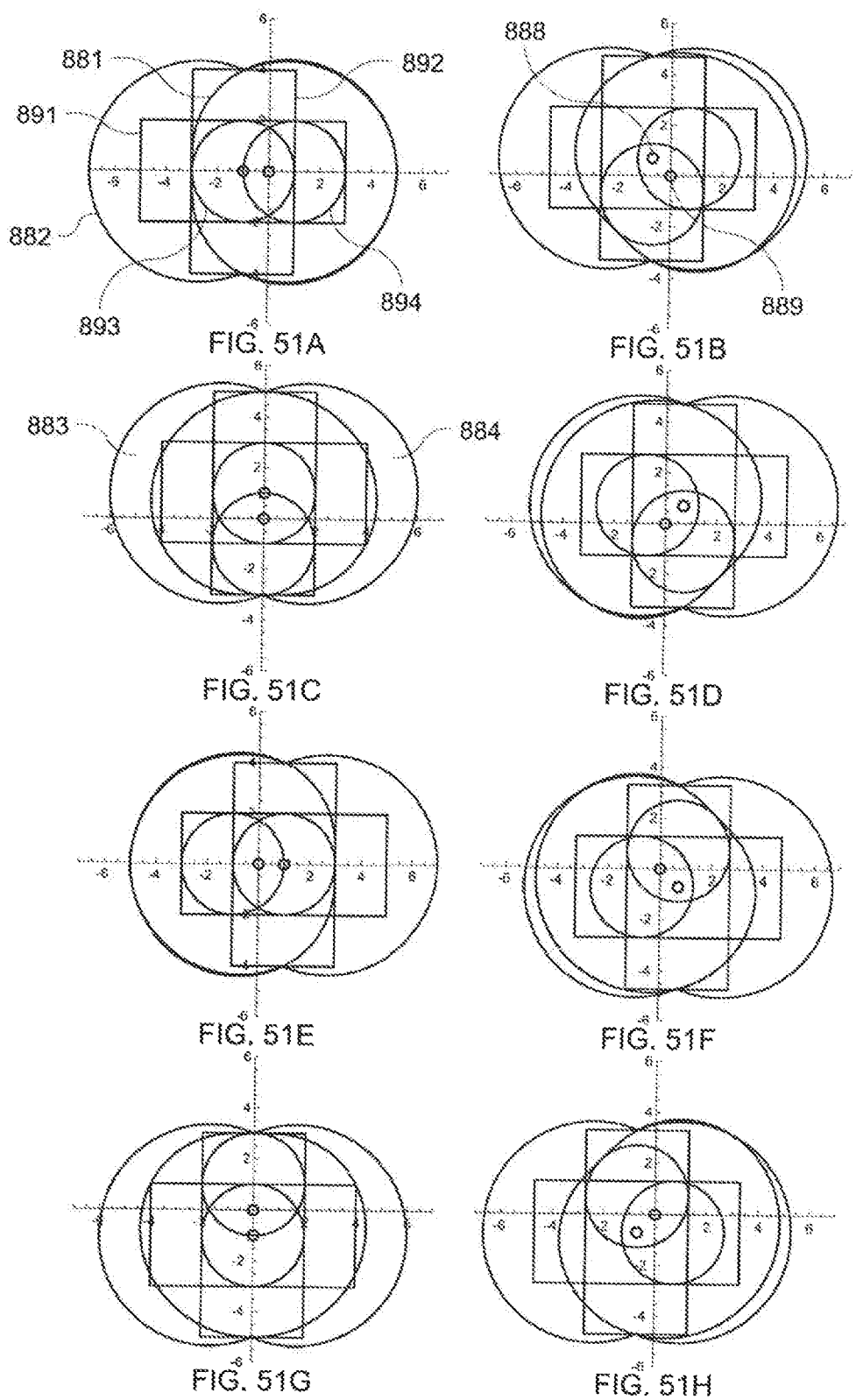

PRESSURE CHANGING DEVICE

RELATED APPLICATION(S)

The present application is a continuation-in-part of U.S. patent application Ser. No. 15/629,602, filed Jun. 21, 2017, which is a divisional of U.S. patent application Ser. No. 14/855,059, filed Sep. 15, 2015, which claims priority to U.S. Provisional Pat. Appl. No. 62/168,515, filed May 29, 2015, each of which is incorporated herein by reference in its entirety.

FIELD OF THE INVENTION

The present invention generally relates to the field of pressure changing devices and methods of making and using the same. More specifically, embodiments of the present invention pertain to a device that compresses or expands a gas and that includes a design or structure based on a limaçon.

DISCUSSION OF THE BACKGROUND

An epitrochoid is defined as a roulette that is formed when a first circle rolls around the outside of a second circle. The first circle is called the rolling generating circle. The second circle is called the fixed generating circle. The trochoid is called a limaçon when the diameter of the fixed circle and the rolling generating circle are equal. The equation of a limaçon in polar coordinates has the form $r=b+a \cos \alpha$. The epitrochoid is called a Wankel type when the diameter of the fixed circle is twice that of the rolling generating circle. (The cylinder of the Wankel engine is an epitrochoid.)

When b>a, the limaçon is a single-loop limaçon and has no inner loop, and the rotating piston has two sharp corners. Pistons with sharp corners have problems with sealings and leaks. There are hundreds of patents disclosing systems in which b>a. Early examples include Woodhouse's rotary steam engine from 1839 and U.S. Pat. No. 298,952 from 1884, and recent examples include U.S. Pat. No. 8,539,931 and EP Patent Publication No. 0 310 549 (see, e.g., FIG. 1 of the present application). A fixed single loop limaçon cylinder with an orbiting piston has been in the public domain for more than 175 years.

FIG. 1 shows a conventional fixed single-loop limaçon cylinder 106 and a piston 105 with sharp corners. The piston 105 rotates around an orbital axis 101, and the orbital axis 101 moves circularly around a fixed axis 102 that is parallel to the orbital axis. 103 is an intake port. 104 is an exhaust port. 108 is a compression space, and 107 is an intake space.

If b<a, the limaçon is a dual-loop limaçon and has an external loop and an internal loop. The piston has the form of an ellipse with a major axis equal to a+b and a minor axis equal to a-b. Examples of a fixed limaçon external loop cylinder with an orbital elliptic piston include U.S. Pat. Nos. 3,387,772 and 6,926,505 and US Patent Application Publication No. 2011/0200476.

FIG. 2 shows a cross-section of a conventional fixed limaçon cylinder 114 and an elliptic piston 113. The cylinder 114 has a shape that corresponds to the external loop of a dual-loop limaçon. The piston 113 rotates around an orbital axis 112, and the orbital axis 112 moves circularly around a fixed axis 111 that is parallel to the orbital axis 112. 115 is an exhaust port. 116 is a compression space, and 117 is an intake space.

A piston rotating inside a fixed cylinder with limaçon cross-section will always have at least two lines of contact with the cylinder wall. The piston rotates around a first axis, and the first axis simultaneously makes a circular orbital motion around another axis that is fixed relative to that limaçon cylinder and that is parallel to the first axis. The ratio between the rotation of the piston around the center of the piston and the circular motion of the first axis around the center of the circular motion is 1:2 (see, e.g., the example of FIGS. 3A-L). (In the Wankel engine, the corresponding relation between the rotation of the piston and the orbital angular motion is 3:2.)

A piston with an internal loop limaçon cross-section rotating inside a fixed elliptic cylinder always has at least two lines of contact. The piston rotates one turn counter-clockwise when the axis of rotation makes one turn clockwise (e.g., in the opposite direction).

In an Otto or Diesel engine, 29% of the energy in the fuel is transferred to the cooling system, and 33% goes to the exhaust system. With hot cylinder walls, the cooling can virtually disappear. With a higher expansion ratio than compression ratio, the exhaust losses can diminish. Losses due to friction between the piston and the cylinder are also diminished.

An n-step, n+1 volume, volume-to-volume expander uses a relatively small first displacement space. The first displacement gas space is connected to a high-pressure gas source and filled with an amount (mass) of gas. The amount of gas is transferred to a bigger second displacement space. The transfer of the amount of gas from a smaller to a bigger displacement space is repeated n times in a cycle. The (n+1)th (or last) displacement space is connected to a low-pressure gas sink and emptied with the working gas.

An n-step, volume-to-volume expander needs n+1 expansion volumes in order to do n expansion steps. Shanghai Jiaotong University (report to the International Compressor Engineering Conference at Purdue Univ., July 2010) and Daikin (U.S. Pat. No. 7,896,627) disclose volume-to-volume expanders using the principle in their experimental rolling piston expanders. U.S. Pat. Nos. 6,877,314 and 8,220,381 disclose free piston, one-step, volume-to-volume expanders. U.S. Pat. No. 8,695,335 discloses a liquid ring volume-to-volume expander.

A single rotor helical pump was disclosed by Moineau in 1932 (U.S. Pat. No. 1,892,217) and is commonly used in Moineau pumps or motors (now known as progressive cavity pumps or motors, although they may sometimes be referred to as worm compressors). Moineau (U.S. Pat. No. 2,085,115 [1935]) further disclosed a gear mechanism that has a helical or screw-type piston inside a helical or screw-type cylinder. Such devices are commonly used in deep well drilling.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a pressure changing device (e.g., an expander, a compressor, a pump, or a liquid pressure energy reclaiming device) that includes an elliptic cylinder and a limaçon piston.

One embodiment of the present pressure changing device uses a cylinder with an elliptic cross-section and a piston with a cross-section of an internal loop limaçon.

One advantage of the pressure changing device is that it is easier to make the ports for an expander using the present approach. Another advantage is efficient gap sealing in the high-pressure expansion part of the cycle.

One main advantage compared to the conventional approaches discussed above is that the intake port and the outtake port are separated by 180° when an elliptic cylinder is used. In the above conventional approaches, when the limaçon external loop is used as a cylinder, the intake and the outtake are implemented using a separate mechanism (i.e. through the central axis).

Another advantage of the present pressure changing device is that during most of the high-pressure part of the cycle, the two compression and expansion spaces are separated with a long sealing gap between the piston and the cylinder. Also, a small gap between the piston and cylinder eliminates any need for sliding sealings and lubrication. The sealing effect is increased if at least some parts of the inner surface of piston, cylinder or both are provided with a rough or slotted inside surface. The sealing effects do not exclude conventional sealings (e.g., Wankel-type), or a vane-type sealing in the sharp corner of the internal loop limaçon or the sharp corner of the external loop limaçon. These effects also do not exclude use of lubricant or liquid spray as a seal.

Another advantage with embodiments of the present pressure changing device using orbital and/or oscillating movement is avoiding any need for gears.

Another advantage of the present pressure changing device is avoiding any need for gears in the piston(s), and enabling separation of the transmission (when present) from the piston and cylinder, which facilitates the use of ceramic piston and cylinders. This is an advantage when, e.g., biomass or waste (e.g., garbage) is used as fuel.

Another advantage with the limaçon piston device is that one space or volume on one side of the piston can be used as a compression space and another space or volume on another side of the piston can be used as an expander space simultaneously in the same cylinder, during a single rotation of the piston (see, e.g., FIGS. 20A-B).

Another advantage of the present pressure changing device is the relatively easy ability to change from compression to expansion, which is very useful in Heat Energy Storage (HES) applications in which the same pressure changing device can be used for both charging and discharging. Combined with the ability to stack multiple pressure changing devices, the present pressure changing device is also useful in HES applications where precise volume relationships between different pressure changing devices in the same system are necessary for high efficiency.

If the elliptic cylinder rotates around a first fixed axis with an angular velocity ω, and the inner loop limaçon piston rotates around a second fixed axis with an angular velocity 2ω (see, e.g., FIGS. 9A-L), the configuration has the same relative motion between the piston and the cylinder as the relative motion between a stationary inner loop limaçon and a rotating ellipse as described mathematically herein and/or as shown in FIGS. 3A-L.

If the external loop limaçon cylinder rotates around a first fixed axis with an angular velocity ω rad/s, and the elliptic piston makes an oscillating movement with a frequency ω/(2π) Hz (one oscillation cycle for each revolution; see, e.g., along the minor axis shown in FIGS. 27A-L or along the major axis shown in FIGS. 30A-L), the configuration has the same relative motion between the piston and the cylinder as the relative motion between a stationary limaçon and a rotating ellipse as described mathematically herein and/or as shown in FIGS. 3A-L.

If the inner loop limaçon piston rotates around a first fixed axis with an angular velocity ω rad/s, and the elliptic cylinder makes an oscillating movement with an amplitude b and a frequency ω/(2π) Hz (i.e., one oscillation cycle for each revolution; see, e.g., along the minor axis shown in FIGS. 24A-H or along the major axis shown in FIGS. 29A-L), the configuration has the same relative motion between the piston and the cylinder as the relative motion between a stationary inner loop limaçon and an orbiting and rotating ellipse as described mathematically herein and/or as shown in FIGS. 3A-L.

The angular velocity of an orbiting point is the time derivative of the angle of radius vector of the point in polar coordinates in the plane of the orbit path. In the present invention, all orbiting paths may be circular, and the center of the circle defining an orbit path is an origin of the coordinates.

If the elliptic cylinder makes an orbital motion without rotation around a first fixed axis with an angular velocity ω, and the inner loop limaçon piston rotates in an opposite direction around a second fixed axis with an angular velocity −ω (see, e.g., FIGS. 18A-L), the configuration has the same relative motion between the piston and the cylinder as the relative motion between a stationary inner loop limaçon and a rotating ellipse as described mathematically herein and/or as shown in FIGS. 3A-L.

Novel aspects of the present invention include:
1. A rotating piston in a trochoid cylinder in non-rotating orbital movement.
2. Non-rotating orbital movement of a trochoid piston in a rotating cylinder.
3. An oscillating piston in a rotating trochoid cylinder.
4. A rotating trochoid piston in an oscillating cylinder.
5. A fixed trochoid piston in a rotating and orbiting cylinder.
6. A fixed piston in a rotating and orbiting trochoid cylinder.
7. Cam and cam follower movement controlling an oscillating piston in a rotating trochoid cylinder.
8. A rotating trochoid piston in an oscillating cylinder controlled by a cam and cam follower.
9. Cam and cam follower movement controlling a non-rotating orbiting piston in a rotating trochoid cylinder.
10. A rotating trochoid piston in a non-rotating orbiting cylinder controlled by a cam and cam follower.
11. Multiple limaçon pressure changing devices with the same b-value and multiple piston and cylinder pairs on two common axes.
12. Multiple limaçon piston and cylinder pairs with two common axes.
13. Multiple limaçon oscillating pressure changing devices on one or more common axes.
14. Multiple limaçon orbiting pressure changing devices on one or more common axes.

In one embodiment of the present invention, the elliptic cylinder is fixed, and a limaçon inner loop piston rotates around an axis. The axis moves simultaneously in a circular orbital movement. When the orbiting axis rotates one revolution around the fixed axis in one direction, the piston rotates one revolution in the opposite direction.

In another embodiment of the present invention, the limaçon inner loop piston rotates around a fixed axis, and the elliptic cylinder rotates around another fixed axis with an angular speed relation of 2:1. An advantage with this embodiment is an easily balanced system.

In one embodiment of the present invention, the limaçon inner loop piston rotates around a fixed axis, and the elliptic cylinder makes a circular orbital motion without rotation around another fixed axis.

In another embodiment of the present invention, the limaçon inner loop piston rotates around a fixed axis, and the elliptic cylinder makes an oscillating motion with the same frequency as the rotational rate (e.g., the number of revolutions per second) of the limaçon inner loop piston.

In one embodiment of the present invention, the limaçon external loop cylinder rotates around a fixed axis, and the elliptic piston rotates around another fixed axis with an angular speed relation of 2:1.

In one embodiment of the present invention, the limaçon single loop cylinder rotates around a fixed axis, and the elliptic piston rotates around another fixed axis with an angular speed relation or ratio of 2:1.

In one embodiment of the present invention, the limaçon external loop cylinder rotates around a fixed axis, and the elliptic piston makes an oscillating motion with the same frequency as the rotational rate (e.g., the number of revolutions per second) of the limaçon inner loop piston.

In one embodiment of the present invention, the limaçon single loop cylinder rotates around a fixed axis, and the elliptic piston makes an oscillating motion with the same frequency as the rotational rate (e.g., the number of revolutions per second) of the limaçon inner loop piston.

In further embodiments of the present invention, the device may further comprise at least one in-port (e.g., intake port) and at least one out-port (e.g., exhaust port). For example, devices comprising an elliptic cylinder may have at least one combined in and out (e.g., intake and exhaust) port in each of two opposed ends of a major axis of the cylinder.

In even further embodiments of the present invention, the device may comprise a progressive cavity pressure changing device, including a helical or screw-type piston and a complementary helical or screw-type cylinder. In such embodiments, each cross-section along the length of the piston is an inner loop of a limaçon, and each cross-section along the length of the cylinder is an ellipse. As for other embodiments, the piston defines at least one pressure changing space in said cylinder. The cylinder may oscillate along a first axis, orbit around a second axis without rotating, and/or rotate around a third axis.

One advantage with rectilinear oscillation and orbiting movement is avoiding any need for complicated geared transmission. The oscillation can be controlled by an inexpensive excenter device like a Scotch yoke, an Oldham coupling, a cam and a cam follower, a crankshaft, or a scroll compressor excenter device. A Scotch yoke is a cam and cam-follower with a circular cam. A Scotch yoke can be used to guide the movement of the oscillating elliptic cylinder as shown in FIGS. 23A-L, 24A-H and 25. An elliptic piston oscillating in an external limaçon loop cylinder (e.g., as shown in FIGS. 27A-L) can be guided in the same way. Two perpendicular Scotch yokes can be used to guide the orbital movement of a cylinder or piston (see, e.g., FIGS. 41A-H).

The present device may further comprise an excenter device comprising a first excenter part and a second excenter part, the first and second excenter parts being selected from an excenter driver and an excenter follower, wherein the excenter driver is attached to the first rotating pressure changing part or component, and the excenter follower is attached to the second non-rotating pressure changing part or component. The excenter driver may comprise a circular cam, and the excenter follower may comprise a cam follower controlling an oscillation of the second non-rotating pressure changing part or component. The excenter driver may comprise two circular cams with a 180° phase difference, and the excenter follower may comprise two perpendicular cam followers controlling an orbital movement of the second non-rotating pressure changing part or component. The excenter driver may comprise two elliptic cams with a 90° phase difference, and the excenter follower may comprise two perpendicular cam followers controlling an orbital movement of the second non-rotating pressure changing part or component. The excenter driver may comprise two cams having three lobes with a 60° phase difference, and the excenter follower may comprise two perpendicular cam followers controlling an orbital movement of the second non-rotating pressure changing part or component. The excenter driver may comprise a crankshaft, and the excenter follower may comprise a crank bearing controlling an orbital movement of the second non-rotating pressure changing part or component. The excenter driver may comprise a shaft in a Scotch yoke, and the excenter follower may comprise a slot in the Scotch yoke controlling an oscillation of the second non-rotating pressure changing part or component. The excenter driver may comprise a shaft common to two Scotch yokes, and the excenter follower may comprise slots in the two Scotch yokes perpendicular to each other and controlling an orbital movement of the second non-rotating pressure changing part or component.

Another advantage with rectilinear oscillation and orbiting movement is that several of the present pressure changing devices can be mounted on a single fixed axis. This facilitates an arrangement in which a compressor can be driven by an expander, and/or in which expansion and compression are conducted in several steps.

With a sliding transmission (e.g., without gears), or a two-axis fixed axis gear transmission, it is possible to have a relatively small distance between the piston and the cylinder, without lubrication. A combination of high combustion temperature, ceramic cylinder(s) and piston(s), small tolerances, and serial expansion and compression all contribute to high thermodynamic efficiency and are all possible in the present pressure changing device.

One advantage of the present pressure changing device is eliminating lubricant in the displacement area. One estimation is an efficiency loss of 2% for every 1% of oil in the refrigerant in a vapor compression device. Old vapor compression devices can have up to 10% oil in the refrigerant.

BRIEF DESCRIPTION OF THE DRAWINGS

FIGS. 5A-L show stages of yet another exemplary limaçon-based pressure changing device with a fixed elliptic piston inside an orbiting and rotating external loop limaçon cylinder.

FIGS. 6A-L show a device that is similar to the device in FIGS. 5A-L, but with a single loop limaçon cylinder and a piston with two sharp corners.

FIG. 7 shows an exemplary limaçon piston compressor with two separate compression chambers.

FIGS. 15A-H show stages of the 2-step, 3-volume limaçon pressure changing system in FIGS. 13 and 14.

FIGS. 16A-H show stages of a non-rotating inner-loop limaçon piston orbiting counterclockwise around a fixed axis inside a rotating elliptic cylinder.

FIG. 20A is another exemplary Brayton heat engine with a combustion chamber and with a limaçon piston in an elliptic cylinder, simultaneously working as a compressor and an expander.

FIG. 20B is another exemplary Brayton heat pump, cooling or heating a house depending on the rotation direction of the pressure changing device.

FIG. 26 depicts exemplary volume-to-volume expansion and compression processes using the present pressure changing device(s).

FIGS. 28A-L show stages of counterclockwise rotation of a single loop limaçon cylinder around a fixed axis, with a vertically oscillating piston.

FIGS. 34A-H show stages of a fixed external loop limaçon cylinder and a fixed inner loop limaçon piston with a common orbiting and rotating elliptic cylinder-piston.

FIGS. 35A-H show stages of a fixed axis rotating external loop limaçon cylinder and inner loop limaçon piston with a common fixed axis rotating elliptic cylinder-piston.

FIGS. 38A-H show stages of two orbiting and rotating inner loop limaçon pistons with fixed cylinders and with 90° phase difference as a dual Stirling cycle heat driven heat pump (e.g., for use in a solar powered air conditioning [AC] system).

FIGS. 39A-H show stages of a piston rotating counterclockwise around a fixed axis inside a non-rotating orbiting single-loop limaçon cylinder FIGS. 40A-H show stages of a non-rotating, orbiting single-loop limaçon piston inside a cylinder rotating counterclockwise around a fixed axis.

FIGS. 44A-H show stages of a fixed single-loop limaçon piston inside a rotating and orbiting cylinder.

FIGS. 45A-H show stages of a fixed trochoid piston inside a rotating and orbiting cylinder.

FIGS. 46A-H show stages of a rotating trochoid piston inside a non-rotating and orbiting cylinder.

FIGS. 50A-H show stages of a non-rotating, clockwise-orbiting triangular piston inside a counterclockwise-rotating Wankel-type trochoid cylinder.

FIGS. 51A-H show stages of a cam and cam-follower device orbiting and rotating in opposite directions, and orbiting with the same angular speed as the angular speed of the rotating part.

DETAILED DESCRIPTION

Figure 1:
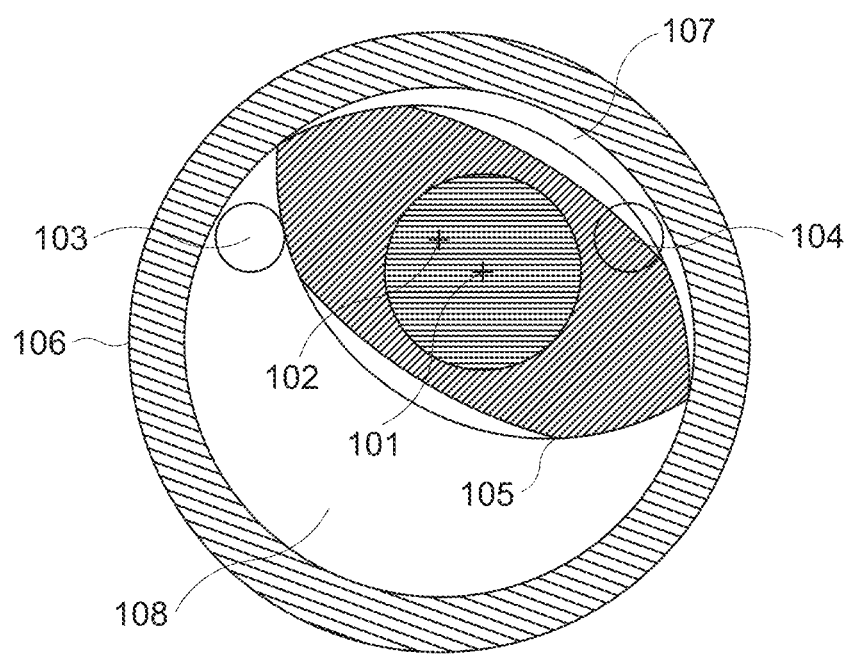
FIG. 1 shows a prior art pressure changing device with a fixed single-loop limaçon cylinder and a piston with sharp corners, in which b>a in the limaçon polar coordinate equation r=b+a cos α.
Figure 2:
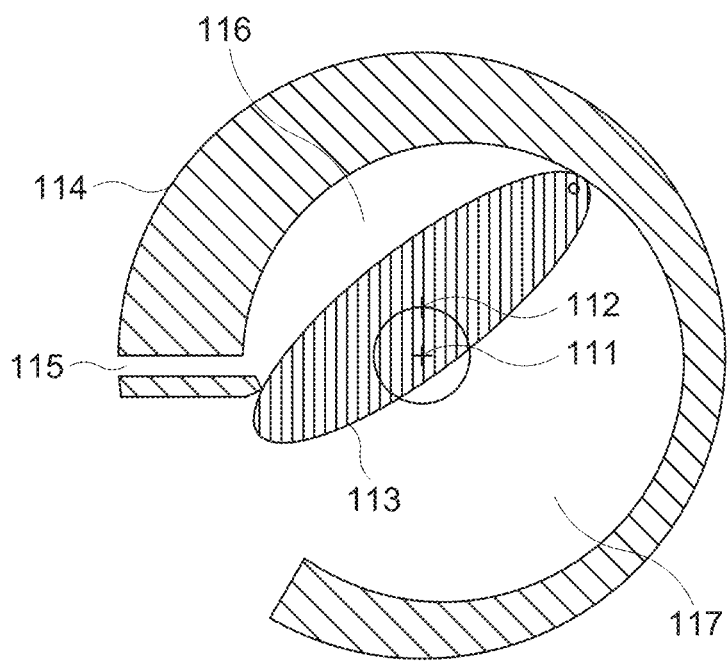
FIG. 2 shows a prior art pressure changing device with a fixed limaçon cylinder with b<a and an elliptic piston.
Figure 3A:
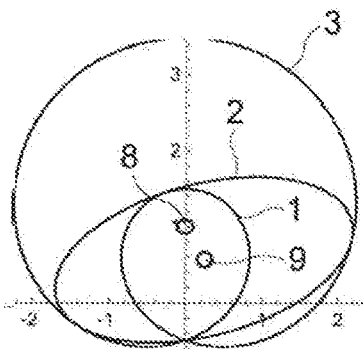
FIGS. 3A-L show stages of rotation of an ellipse in a fixed dual-loop limaçon.
Figure 3B:
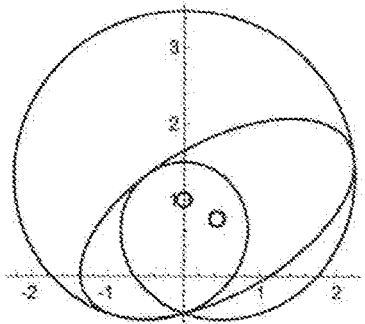
Figure 3C:
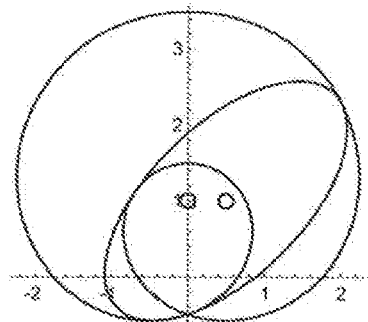
Figure 3D:
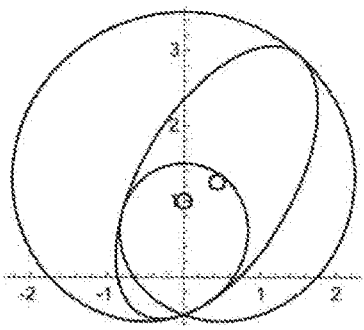
Figure 3E:
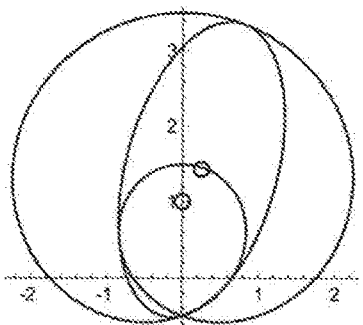
Figure 3F:
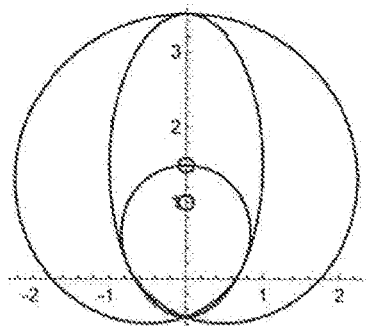
Figure 3G:
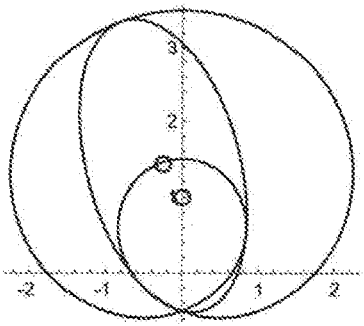
Figure 3H:
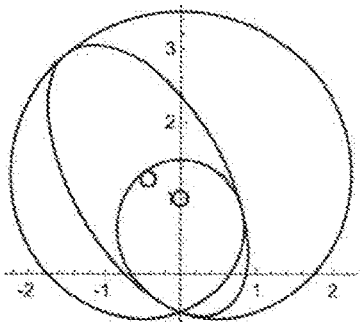
Figure 3I:
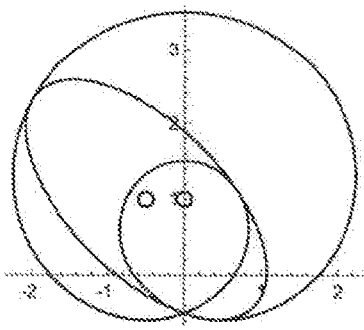
Figure 3J:
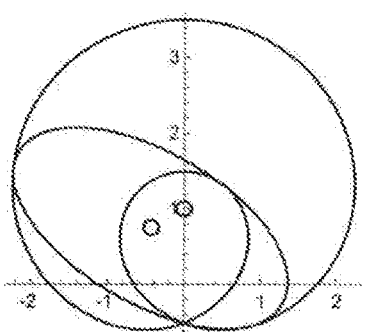
Figure 3K:
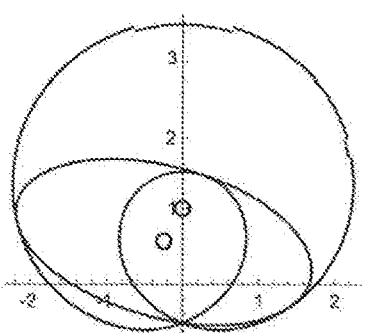
Figure 3L:
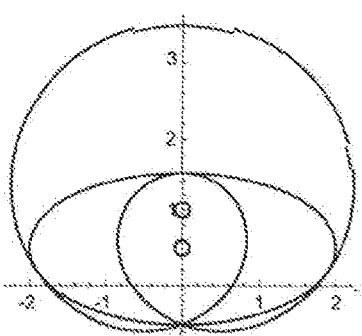

Examples of various embodiments of the invention are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. Thus, based on the described embodiments of the present invention, other embodiments can be obtained by one skilled in the art without creative contribution and are in the scope of legal protection given to the present invention. In other instances, well-known methods, procedures, components, and materials have not been described in detail so as not to unnecessarily obscure aspects of the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "connected to," "coupled with," "coupled to," and "in communication with" may be used interchangeably, and use of one of the terms in one of these groups will generally include the others unless the context of use clearly indicates otherwise, but these terms are also generally given their art-recognized meanings. Also, a "gas" refers to a material or substance that is in the gas phase at temperatures of the expansion and/or compression processes in which it participates.

The invention, in its various aspects, will be explained in greater detail below with regard to exemplary embodiments.

Exemplary Pressure Changing Devices

The pressure changing devices of the present invention may have one epitrochoid part or component and one non-epitrochoid part or component. For example, the epitrochoid part or component is the cylinder in FIGS. 5A-L, FIGS. 6A-L, FIGS. 17A-H, FIGS. 21A-L and 22A-L, FIGS. 27A-L and 28A-L, FIGS. 30A-L and 31A-L, FIGS. 39A-H, and FIGS. 48A-H, 49A-H, and 50A-H, the piston in FIGS. 4A-L, FIGS. 7, 8, 9A-L, 10-11, 12A-L, 13-14, 15A-H, and 16A-H, FIGS. 18A-L, 19A-L, and 20A-B, FIGS. 24A-H and 25-26, FIGS. 29A-L, FIGS. 32A-B and 33A-H, FIGS. 36A-H and 37A-H, FIGS. 40A-H, 41A-H, 42A-H, 43A-H, 44A-H, 45A-H, 46A-H, and 47A-H, and FIGS. 51A-H, 52A-D, 53A-D, 54A-F, and the limaçon parts or components in FIGS. 3A-L, FIGS. 23A-L, FIGS. 34A-H and FIGS. 35A-H. The non-epitrochoid part or component is the other part or component (i.e., the other of the piston-cylinder pair) in the FIGS. An ellipse is for instance a hypotrochoid and non-epitrochoid. Ports (intake, exhaust or single) connected to the non-epitrochoid part or component are timed ports in reversible expander-compressor devices and expanders, and ports with check valves in standalone compressors. Ports (intake, exhaust) connected to the epitrochoid part in a volume to volume system do not need timing, and have a direct connection to the pressure changing device(s) and/or to a high-pressure or low-pressure source or sink. Ports connected to the epitrochoid part or component in a standalone compressor may have a check valve between the high-pressure port and a high-pressure sink, and a direct connection between the low-pressure port and a low-pressure source. Ports connected to the epitrochoid part or component in a standalone expander may have a timed valve between the high-pressure port and a high-pressure source and direct connection between the low-pressure port and a low-pressure sink. A type of port in an epitrochoid part or component in one device may be used in an epitrochoid part or component in another device, and a type of port in a non-epitrochoid part or component in one device may be used in a non-epitrochoid part or component in another device. FIGS. 34A-G show a combined expander with a first timed port expansion, a volume to volume expansion, and a second timed port expansion.

FIGS. 1-8 have one part or component attached to an orbiting and rotating axis, and another part or component fixed (i.e., not moving).

FIGS. 3A-L show a first example of components in a limaçon-based pressure changing device. For example, FIGS. 3A-L show stages of rotation of an ellipse 2 rotating counterclockwise around an axis 9 in a counterclockwise orbital movement around a fixed axis 8 in a fixed dual-loop limaçon, demonstrating the connection between the ellipse 2 and the inner loop 1 and external loop 3 of the limaçon. As the ellipse 2 rotates, a gas in the space or volume above and to the left of the ellipse 2 is compressed, and a gas in or entering the space or volume below and to the right of the ellipse 2 is expanded.

Figure 4A:
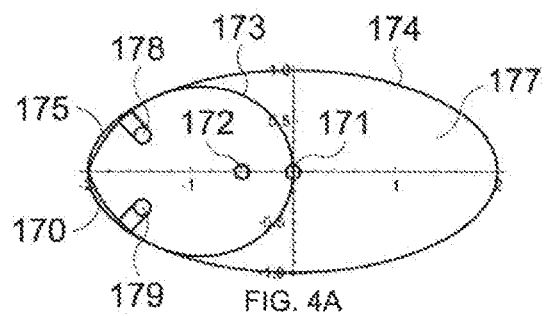
FIGS. 4A-L show stages of a piston rotating counter-clockwise around an orbital axis inside a fixed elliptic cylinder of an exemplary limaçon-based pressure changing device.
Figure 4B:
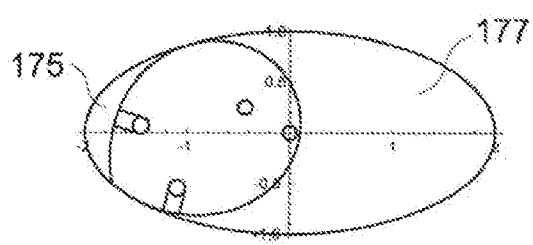
Figure 4C:
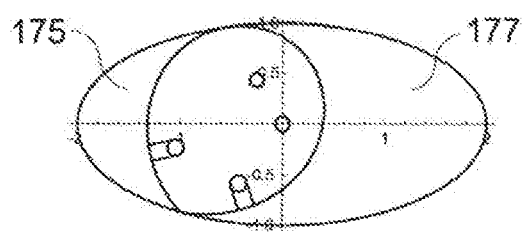
Figure 4D:
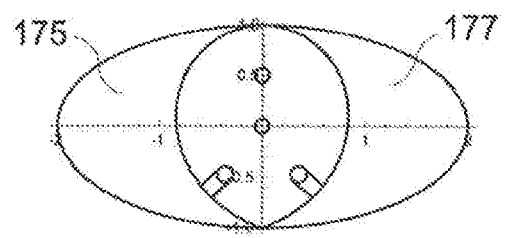
Figure 4E:
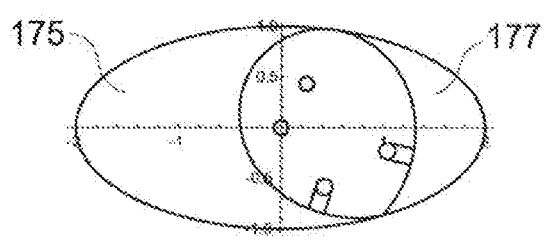
Figure 4F:
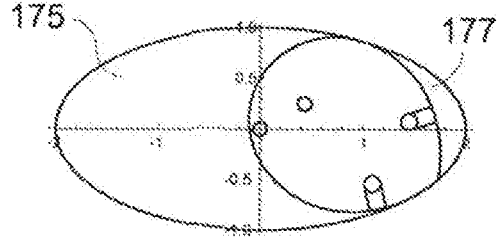
Figure 4G:
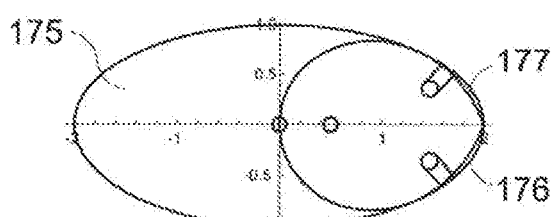
Figure 4H:
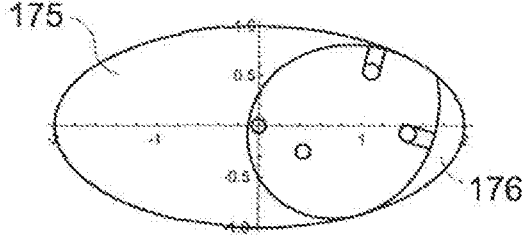
Figure 4I:
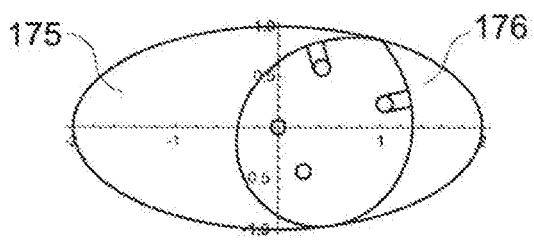
Figure 4J:
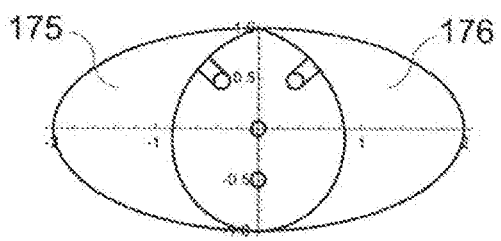
Figure 4K:
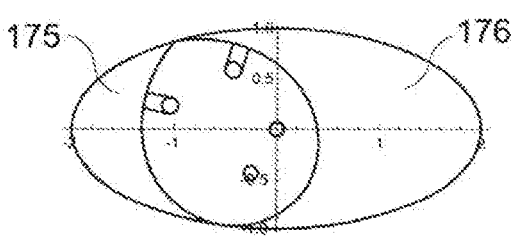
Figure 4L:
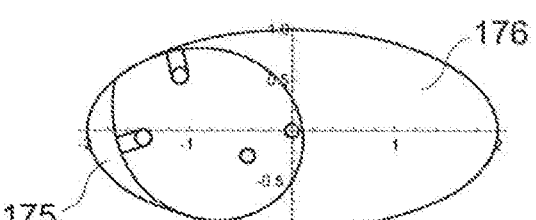

FIGS. 4A-L show stages of an inner loop limaçon piston 173 rotating counterclockwise around an orbital axis 172 inside a fixed elliptic cylinder 174 of yet another pressure changing device according to the present invention. In the pressure changing device of FIGS. 4A-L, the orbital axis 172 moves circularly in a clockwise direction around a fixed axis 171 that is parallel to the orbital axis 172. The piston 173 includes an intake port 178 and an exhaust port 179. The operation of a pressure changing device with intake and exhaust ports in the piston is shown in and/or discussed with respect to FIG. 8 and the pressure changing device 320 in FIG. 7. The elliptic cylinder 174, which does not move or rotate, may have an exhaust space 177 and an intake and exhaust space 175. In FIG. 4A, a new intake space 175 is created and the former exhaust space 170 is disappearing. In FIGS. 4B-4F, gas is flowing into the intake space 175 through the intake port 178, and the gas in the exhaust space 177 is flowing out through the exhaust port 179. In FIGS. 4H-4L, gas is flowing into the space 176 through the intake port 178, and the gas in the space 175 is flowing out through the exhaust port 179.

FIGS. 5A-L show stages of a fixed elliptic piston 381 having a center 384, inside a cylinder 382 having a center 383, of another pressure changing device according to the present invention. The cylinder 382 rotates (e.g., counterclockwise in one of an expansion mode and a compression mode) around an orbital axis 383. The orbital axis 383 moves circularly clockwise around a fixed axis 384 parallel to the orbital axis 383. The elliptic piston 381 neither rotates nor moves. In the shown example, port 386 is an intake port and port 385 is an exhaust port. If the intake port 386 is connected to a high-pressure gas and the exhaust port 385 is connected to a low-pressure gas, the device works as an expander.

The device of FIGS. 5A-L may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIGS. 6A-L are similar to FIGS. 5A-L, but with a single loop limaçon cylinder 472 and a piston 471 with two sharp corners. The cylinder 472 rotates around an orbital axis 479. The orbital axis 479 moves circularly clockwise around a fixed axis 478 parallel to the orbital axis 479. The piston 471 is fixed. In the shown example, port 474 is an intake port and port 473 is an exhaust port. If the intake port 474 is connected to a high-pressure gas and the exhaust port 473 is connected to a low-pressure gas, the device works as an expander.

The device of FIGS. 6A-L may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIG. 7 shows a first pressure changing device 180 that is an example of a limaçon piston compressor with two separate compression chambers 198 and 199 and check valves 185, 186, 187 and 188. The pressure changing device 180 includes an inner loop limaçon piston 183 rotating inside a fixed elliptic cylinder 184.

The compressor 180 of FIG. 7 makes two compression cycles for each turn of the piston 183. For example, when the piston 183 rotates counterclockwise from the position shown in FIG. 7, gas is drawn into the expansion volume 198 through the check valve 185 after the pressure in the expansion volume 198 decreases below a first threshold pressure (or pressure differential) that opens the check valve 185 (e.g., by raising the ball in the check valve 185). Check valve 186 remains closed during this part of the cycle. Similarly, as the piston 183 rotates counterclockwise from the position shown in FIG. 7, gas is expelled from the compression volume 199 through the check valve 188 after the pressure in the compression volume 199 increases above a second threshold pressure (or pressure differential) that opens the check valve 188 (e.g., by raising the ball in the check valve 188). Check valve 187 also remains closed during this part of the cycle. After the piston 183 rotates about 150-180° from the position shown in FIG. 7, the volume on the right-hand side of the cylinder 184 becomes the expansion volume, and the volume on the left-hand side of the cylinder 184 becomes the compression volume. Gas is expelled from the compression volume on the left-hand side of the cylinder 184 through the check valve 186 after the pressure in the compression volume increases above a third threshold pressure (or pressure differential) that opens the check valve 186 (e.g., by raising the ball in the check valve 186). Check valve 185 remains closed during this part of the cycle. Similarly, as the piston 183 continues to rotate counterclockwise from a position about 150-180° from that shown in FIG. 7, gas is drawn into the expansion volume on the right-hand side of the cylinder 184 through the check valve 187 after the pressure in the expansion volume decreases below a fourth threshold pressure (or pressure differential) that opens the check valve 187 (e.g., by raising the ball in the check valve 187). Check valve 188 also remains closed during this part of the cycle. Continuous repetition of the cycle thereby compresses the gas flowing from a volume upstream of the check valve 185 to a volume downstream from the check valve 186, as well as the gas flowing from a volume upstream of the check valve 187 to a volume downstream from the check valve 188, thus making two compression cycles for each full rotation of the piston 183.

FIG. 7 also shows a second pressure changing device 320 that is an example of a limaçon piston compressor with two compression chambers 333 and 334. The pressure changing device 320 includes an elliptic cylinder 332 orbiting and rotating around a fixed inner loop limaçon piston 331.

Conduit 323 is connected to a low-pressure source or volume of gas (not shown) and the intake port 338 in the piston 331 (e.g., similar to intake port 178 in FIG. 4).

Conduit 324 is connected to the exhaust port 339 in the piston 331 (e.g., similar to exhaust port 179 in FIGS. 4A-L) and to a high-pressure gas sink or volume (not shown) via a check valve 325. The check valve 325 operates similarly to check valves 185, 186, 187 and 188.

Figure 8:
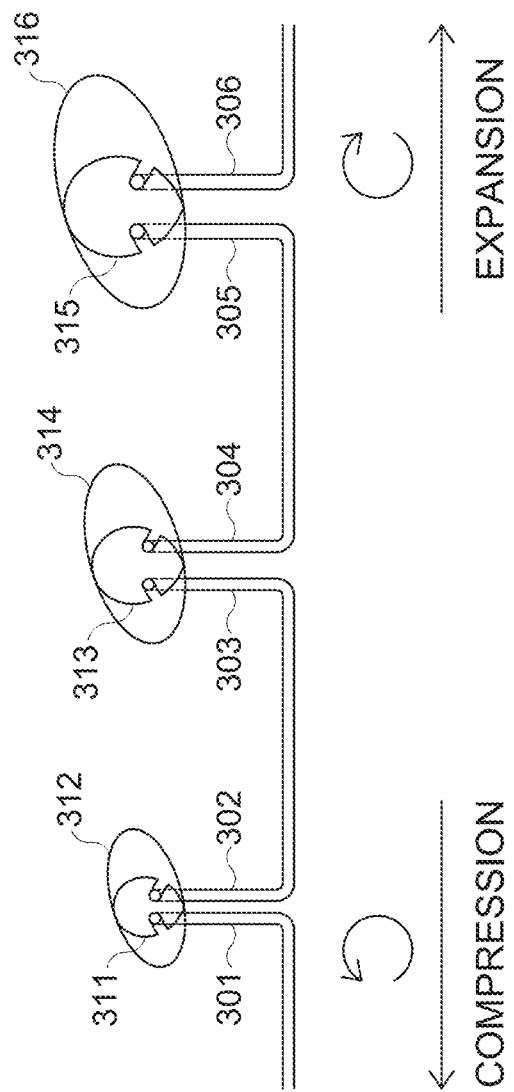
FIG. 8 depicts exemplary volume-to-volume expansion and compression processes using an exemplary limaçon-based pressure changing device.

FIG. 8 is graphic depiction of exemplary volume-to-volume expansion and compression processes. The pistons 311, 313 and 315 are fixed. Each of the elliptic cylinders 312, 314 and 316 rotates around an orbital axis. This orbital axis is parallel to a fixed axis that is normal to the plane of the page and runs through the center of the piston 311, 313 or 315. Each of the orbital axes of the elliptic cylinders 312, 314 and 316 moves circularly in a direction around the fixed axis. In expansion mode, all cylinders rotate clockwise, and the center of the cylinders simultaneously move clockwise in orbital circles. Conduit 301 is connected to a high-pressure gas source or volume (not shown) and to the intake port of the piston 311. Conduit 302 is connected to the exhaust port of piston 311. Conduit 303 (which may be continuous with, or connected directly or indirectly to, conduit 302) is connected to the intake port of the piston 313. Conduit 304 is connected to the exhaust port of the piston 313. Conduit 305 (which may be continuous with, or connected directly or indirectly to, conduit 304) is connected to the intake port of the piston 315. Conduit 306 is connected to the exhaust port of the piston 315 and to a low-pressure gas sink or volume (not shown). The conduits and/or connections 302-303 and 304-305 are volume-to-volume expansion connections. In compression mode, all of the cylinders 312, 314 and 316 rotate counterclockwise, the centers of the cylinders 312, 314 and 316 simultaneously move counterclockwise in orbital circles, all of the intake ports become exhaust ports, and all of the exhaust ports become intake ports.

FIGS. 9A-15H show devices that have one part attached to a fixed rotating axis and the other part attached to another fixed rotating axis.

FIGS. 9A-L show stages of an inner loop limaçon piston 34 rotating counterclockwise inside an elliptic cylinder 33. The piston 34 rotates around a first fixed axis 32, and the elliptic cylinder 33 rotates counterclockwise around a second fixed axis 31. In expansion mode (counterclockwise rotation of the piston 34), expanding gas enters the cylinder 33 through an in-port 35 (e.g., and intake port), and compressing gas exits the cylinder 33 through an out-port 36 (e.g., and exhaust port).

Figure 9A:
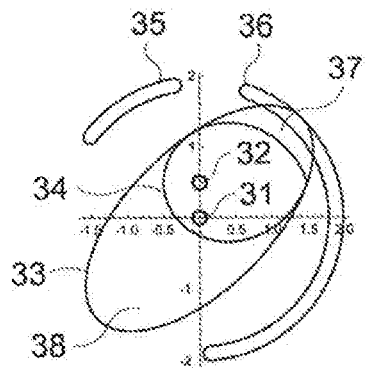
FIGS. 9A-L show stages of an inner loop limaçon piston rotating counterclockwise inside an elliptic cylinder around a first fixed axis, and the elliptic cylinder rotating counterclockwise around a second fixed axis, in an exemplary limaçon-based pressure changing device.
Figure 9B:
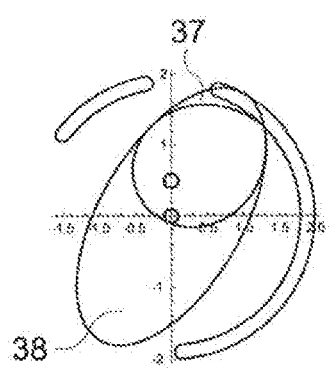
Figure 9C:
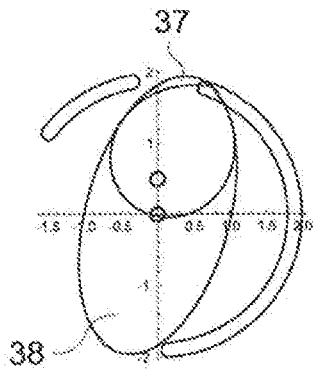
Figure 9D:
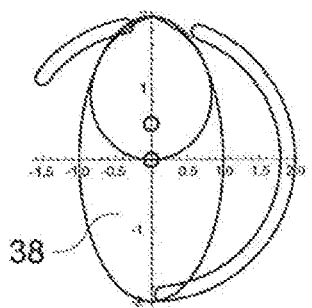
Figure 9E:
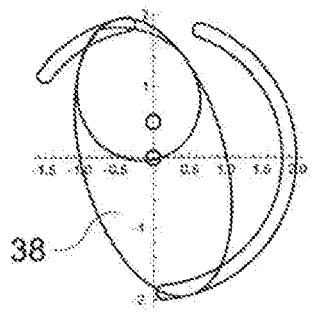
Figure 9F:
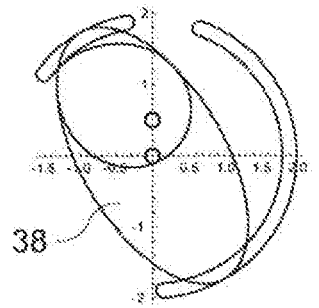
Figure 9G:
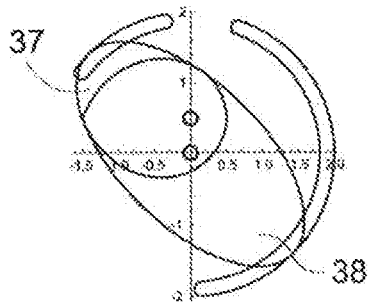
Figure 9H:
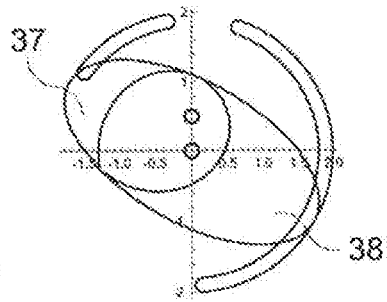
Figure 9I:
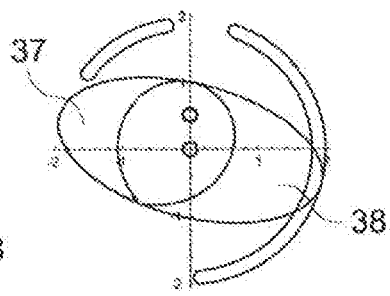
Figure 9J:
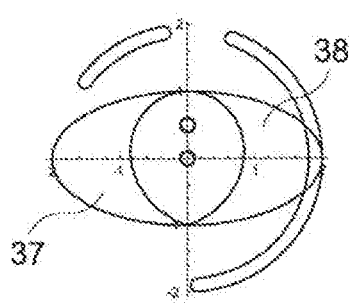
Figure 9K:
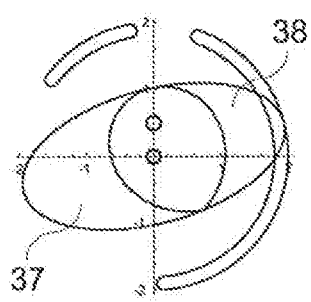
Figure 9L:
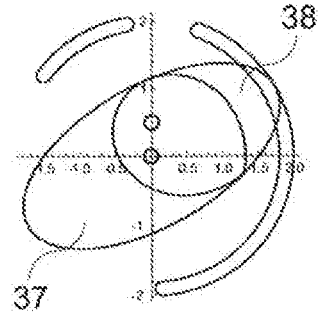

In FIGS. 9A-9C, the volume 37 in the cylinder 33 is exhausting gas through port 36, and the gas in the volume 38 is expanding. In FIG. 9D, the volume 38 is changing from an expansion volume to an exhausting volume, and the volume 37 is changing from an exhausting volume to an intake volume, taking in high-pressure gas through the intake port 35. In FIGS. 9E-9G, the volume 37 is taking in high-pressure gas through the intake port 35, and the gas in volume 38 is exhausting gas through the out-port 36. In FIG. 9H, the volume 37 is changing from taking in high-pressure gas to expanding the gas inside the volume 37. In FIGS. 9I-9L, the gas in volume 37 is expanding, and the volume 38 is exhausting gas through port 36.

Figure 10:
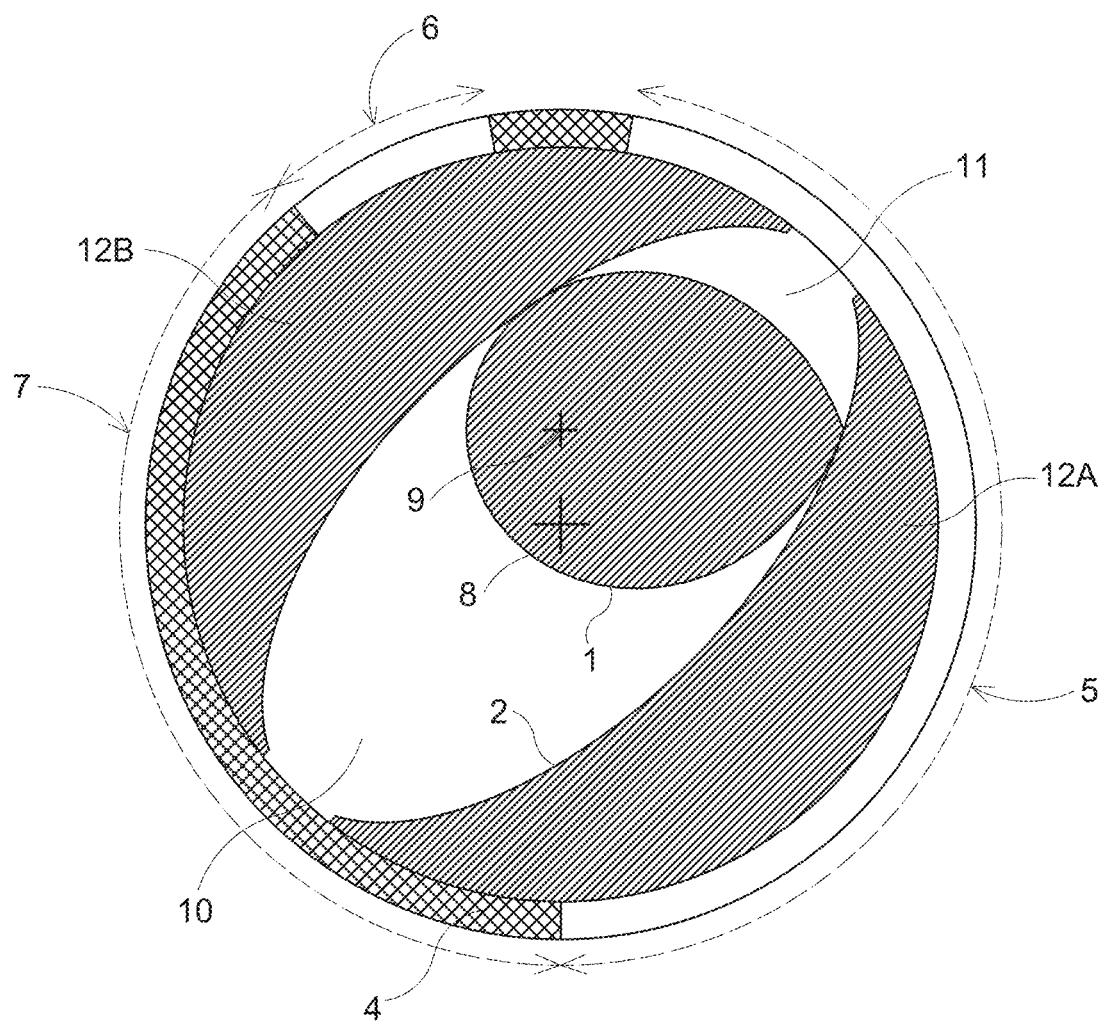
FIG. 10 shows an exemplary pressure changing device similar to the device of FIGS. 9A-L, but with radial ports instead of axial ports.

The pressure changing device of FIG. 10 is similar to the pressure changing device of FIG. 9, but with radial ports instead of axial ports. The inner loop limaçon piston has a surface 1 that sealingly contacts the elliptic cylinder surface 2 in two locations as it rotates around a fixed axis of rotation 9 within the elliptic cylinder. The elliptic cylinder rotates around an axis 8 within a fixed circular port timing cylinder 4, which includes an out-port sector 5, an in-port sector 6, and an expansion sector 7. The elliptic cylinder includes body parts or portions 12A and 12B that define at least in part an expanding volume 10 and an exhausting volume 11. The pressure changing device of FIG. 10 may further include top and bottom plates at ends of the timing cylinder 4, the elliptic cylinder, and the piston, in which case the timing cylinder 4, the elliptic cylinder, and the piston may have the same or substantially the same heights. Alternatively, the pressure changing device of FIG. 10 may seal the volumes 10 and 11 in the elliptic cylinder using structures the same as or similar to sealing structures disclosed elsewhere in this disclosure. Also, the timing cylinder 4, the elliptic cylinder, and the piston may be enclosed in a housing or vessel that includes partitions that separate the volumes of gas exiting and entering the timing cylinder 4 (i.e., through ports corresponding to sectors 5 and 6).

Figure 11:
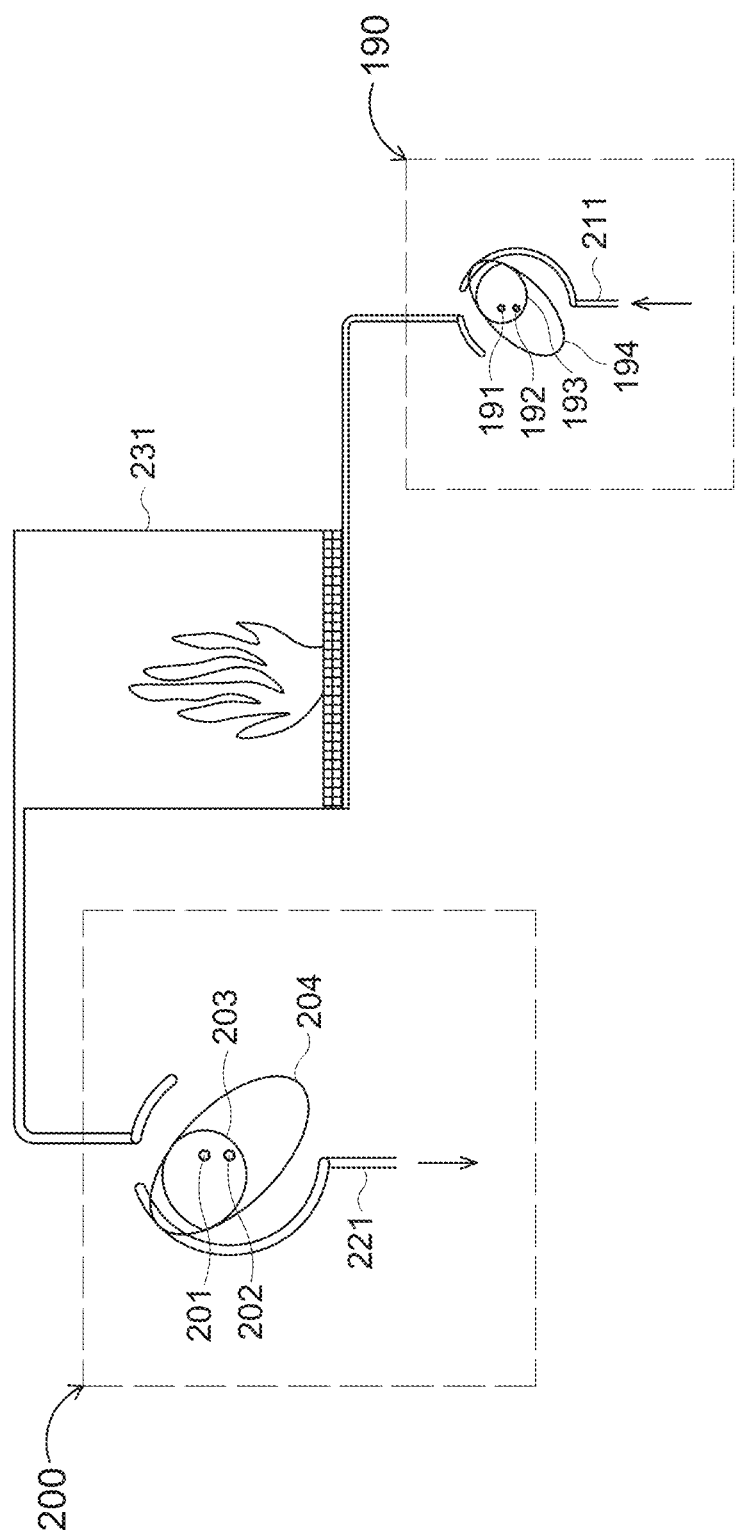
FIG. 11 is an exemplary Brayton engine with a small limaçon piston compressor, a larger expander, and a combustion chamber.
Figure 12:
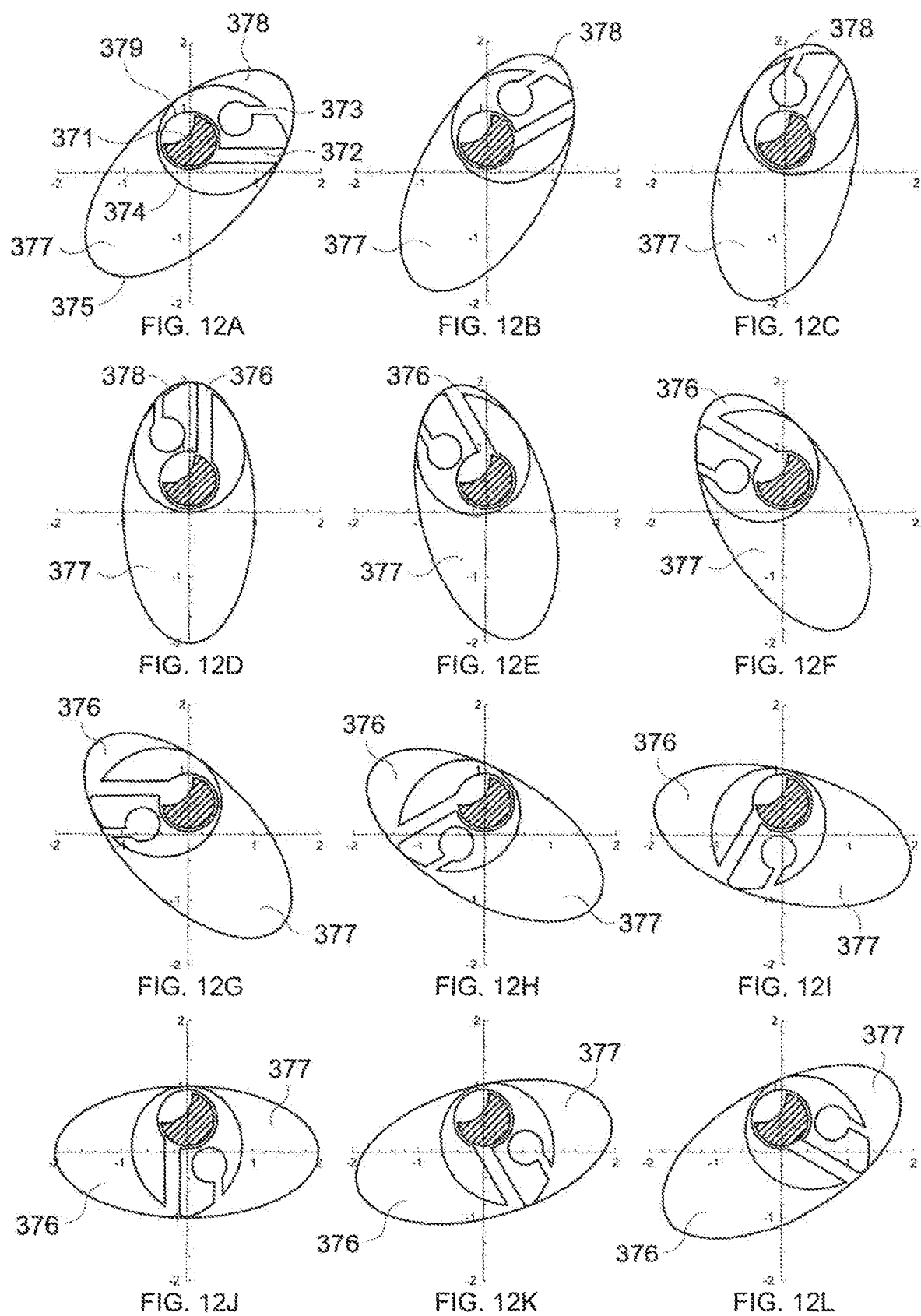
FIGS. 12A-L show stages of an exemplary expander with an inner loop limaçon piston rotating counterclockwise inside an elliptic cylinder around a first fixed axis, and the elliptic cylinder rotating counterclockwise around a second fixed axis with a timed inlet port and open outlet port.

FIG. 11 is an example of a Brayton engine (e.g., for combustion of biofuels) with a small limaçon piston compressor 190 on the right-hand side of FIG. 11, a larger expander 200 on the left-hand side of FIG. 11, and a combustion chamber 231. The cylinders 204 and 194 and the pistons 203 and 193 rotate counterclockwise in the example shown. As the piston 203 and the cylinder 204 in the expander 200 rotate, a mechanical energy transfer mechanism such as a shaft, axle, cam, wheel, piston, etc. coupled to one or both of the piston 203 and the cylinder 204 drives a conventional generator (e.g., to make electricity, some of which can be used to operate the compressor 190). A gear or gearbox can be added to increase or decrease a rotational speed of the mechanical energy transfer mechanism relative to that of the piston 203 and/or cylinder 204 (or, similarly, to increase or decrease a rotational speed of the generator relative to that of the mechanical energy transfer mechanism). The Brayton engine further includes an air intake 211 and an exhaust pipe 221. The combustion chamber 231 may further include a conventional fuel feed mechanism and a conventional solid waste removal mechanism (not shown).

FIGS. 12A-L show stages of an expander that includes an inner loop limaçon piston 374 rotating counterclockwise inside an elliptic cylinder 375 around a first fixed axis (e.g., at [0,0.5]), and an elliptic cylinder 375 rotating counterclockwise around a second fixed axis (e.g., at [0,0]). A cylinder 379 within the piston 374 includes a timing valve 371 and a high-pressure port 372 and a low-pressure port 373. The timing valve 371 is fixed, and does not rotate. In expansion mode (counterclockwise rotation of the piston 374 and the cylinder 375), the high-pressure port 372 works as an intake port and the low-pressure port 373 works as an exhaust port. In FIGS. 12A-12C, the cylinder 375 includes an expansion space 377 and an exhaust volume or exhaust space 378. In FIG. 12D, a new intake space 376 is created; the former exhaust space 378 is disappearing. In FIGS. 12D-12H, gas is flowing into the space 376 through the intake port 372. The gas in the expansion space 377 in FIGS. 12A-12C and in the expansion space 376 in FIGS. 12I-12L is expanding. In FIGS. 12F-12L, the gas in the space 377 continuously flows out through the exhaust port 373. In FIGS. 12A-12D, the gas in the space 378 continuously flows out through the exhaust port 373.

In compression mode, the inner loop limaçon piston 374 and the elliptic cylinder 375 in FIGS. 12A-L rotate clockwise. The high-pressure port 372 works as an exhaust port, and the low-pressure port 373 works as an intake port.

Figure 13:
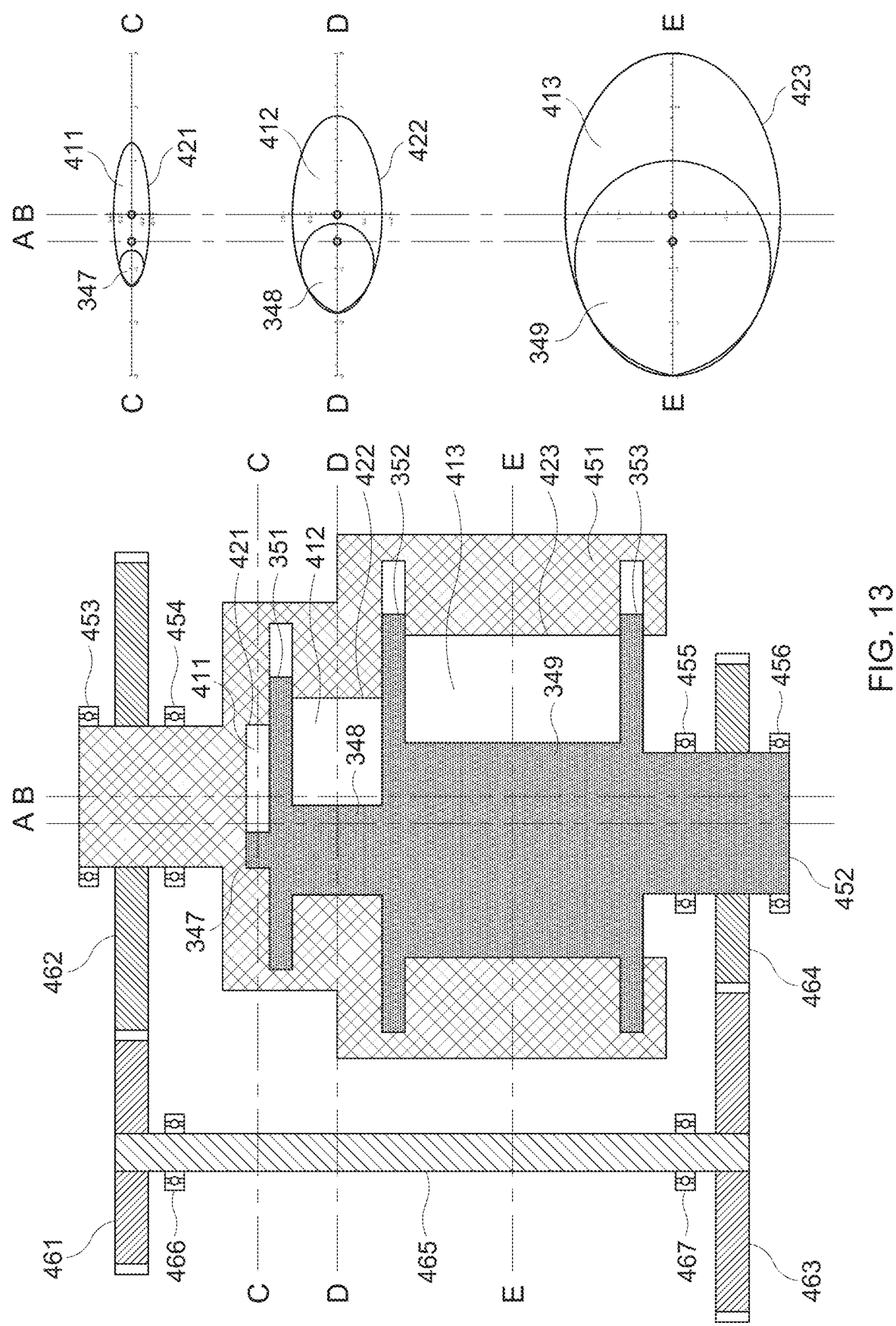
FIG. 13 is an example of a 2-step limaçon volume-to-volume pressure changing device with 3 devices with the same b-value but different a-values and different lengths of the piston.

FIG. 13 shows an example of a 2-step limaçon pressure changing system with 3 devices in series, having the same b-value but different a-values and different lengths. The axes A and B are shown throughout FIG. 13. A cylinder casing 451 rotates around axis B and encloses or defines the 3 different elliptic cylinders 421, 422 and 423. The piston 452 rotates around the axis A in the casing 451 and includes 3 different inner loop limaçon piston sections 347, 348 and 349, each in a unique cylinder section. Gears 461-464 in a 1:2 transmission result in the inner loop limaçon piston 452 revolve two turns for every one turn of the elliptic cylinder casing 451. Cross-sections of the different cylinders and the corresponding piston sections are shown along the lines C-C, D-D and E-E. The circular discs 351, 352 and 353 are rotating in slots and working as gas sealings between the devices.

Figure 14:
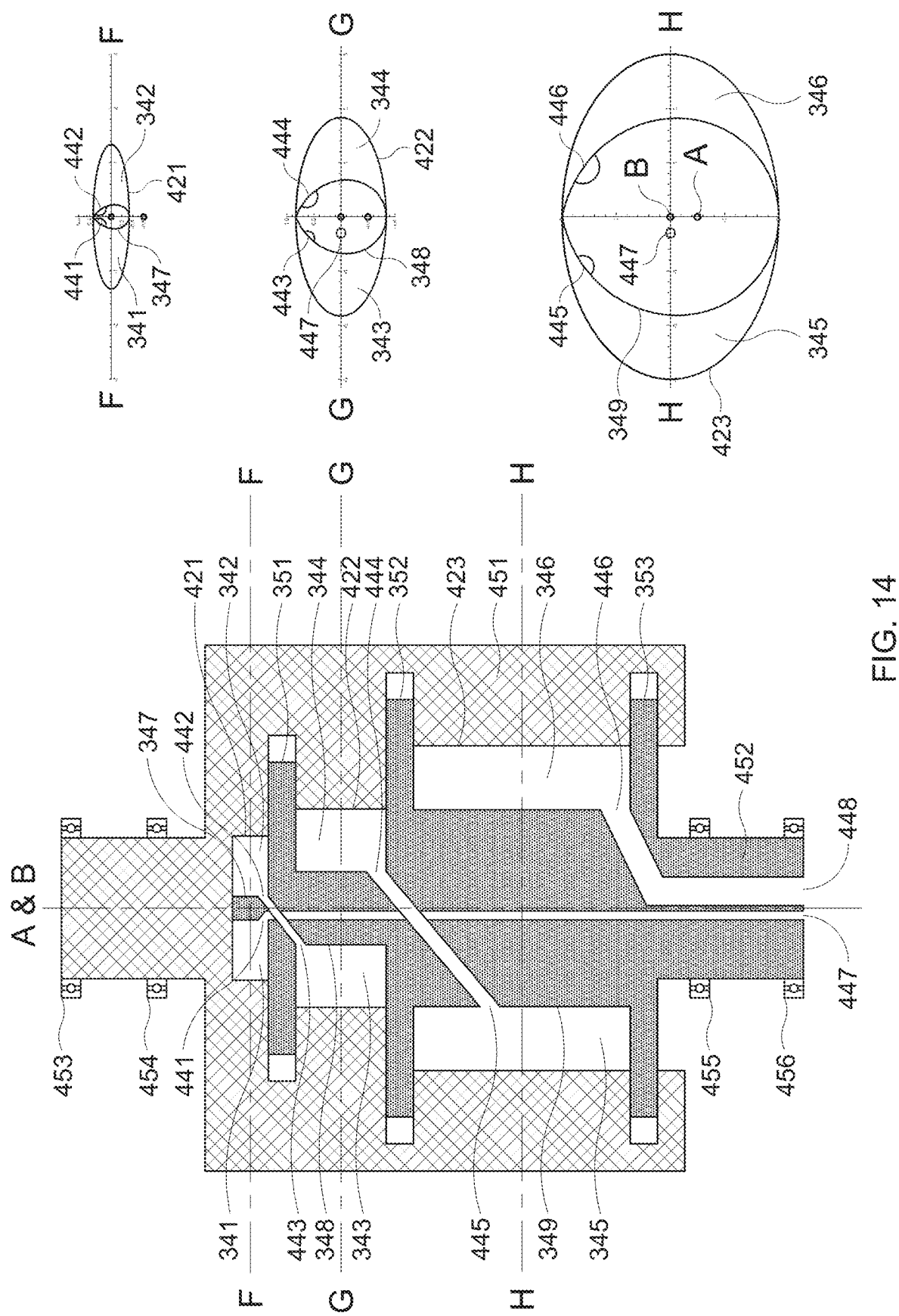
FIG. 14 is a view perpendicular to the view of the pressure changing device in FIG. 13, with the limaçon piston rotated 180° and the elliptic cylinder rotated 90° from the orientation shown in FIG. 13.
Figures 17A, 17B, 17C, 17D, 17E, 17F, 17G, 17H:
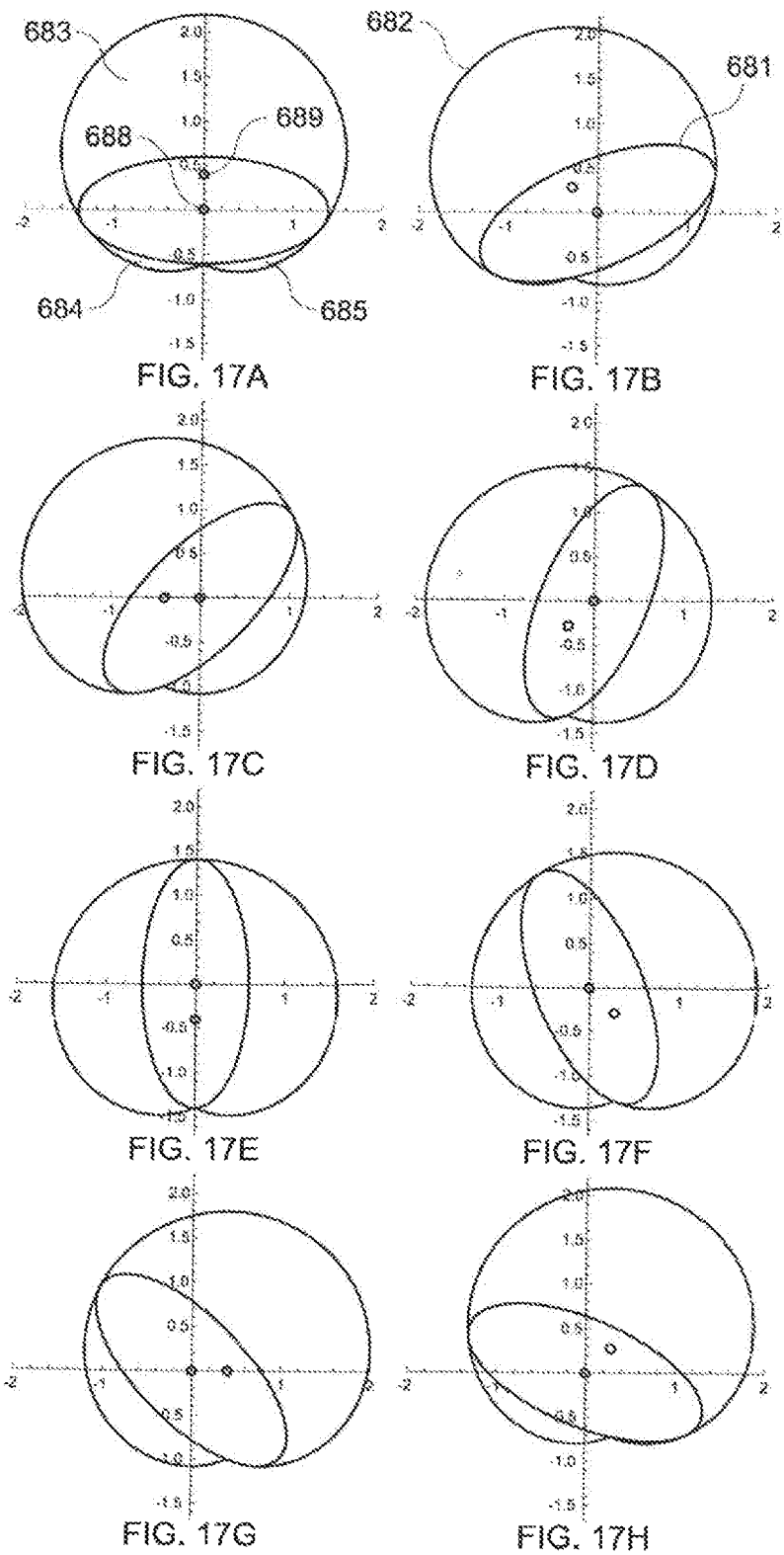
FIGS. 17A-H show stages of an elliptic piston rotating counterclockwise around a fixed axis inside an orbiting, non-rotating external loop limaçon cylinder.
Figure 18A:
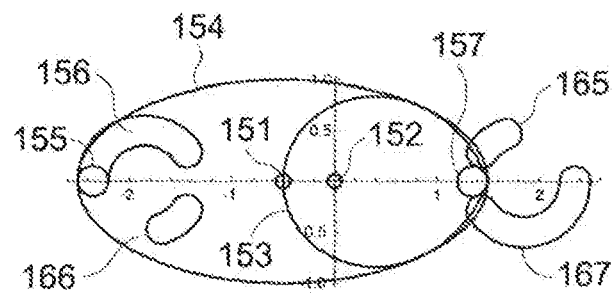
FIGS. 18A-L show stages of a piston rotating counterclockwise around a fixed axis inside a non-rotating orbiting elliptic cylinder of an exemplary limaçon-based pressure changing device.
Figure 18B:
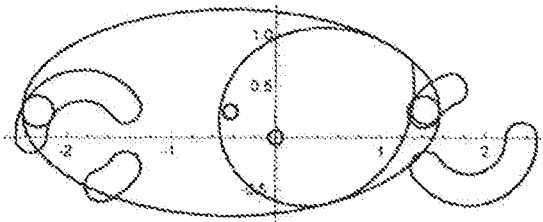
Figure 18C:
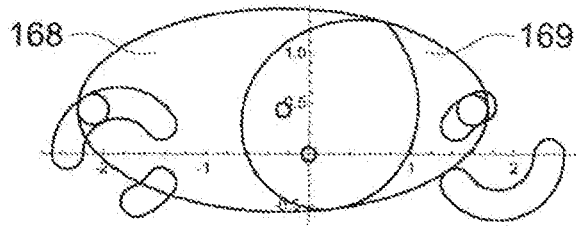
Figure 18D:
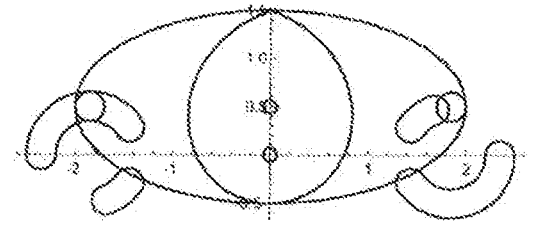
Figure 18E:
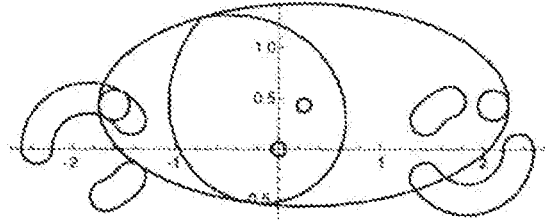
Figure 18F:
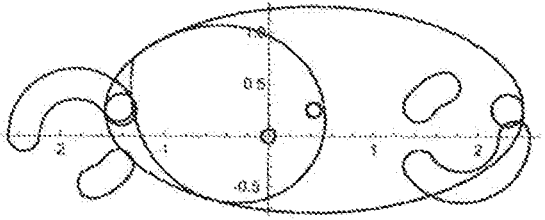
Figure 18G:
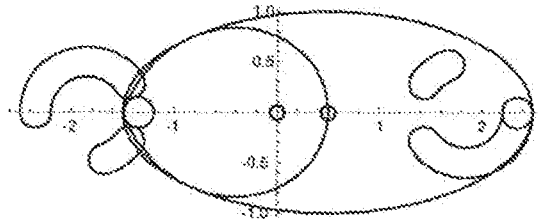
Figure 18H:
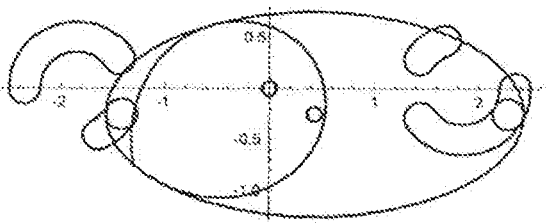
Figure 18I:
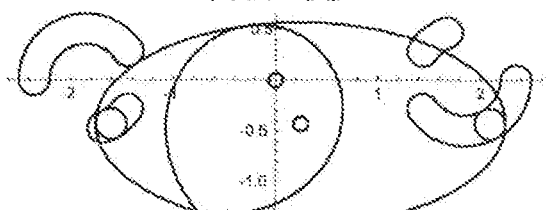
Figure 18J:
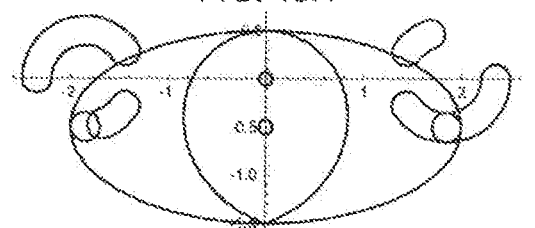
Figure 18K:
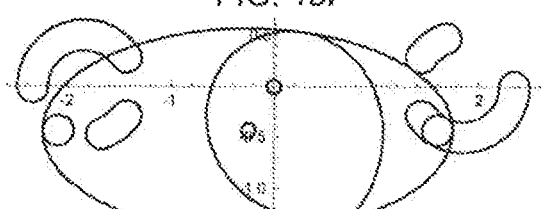
Figure 18L:
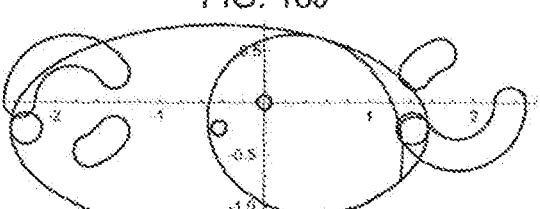
Figure 19A:
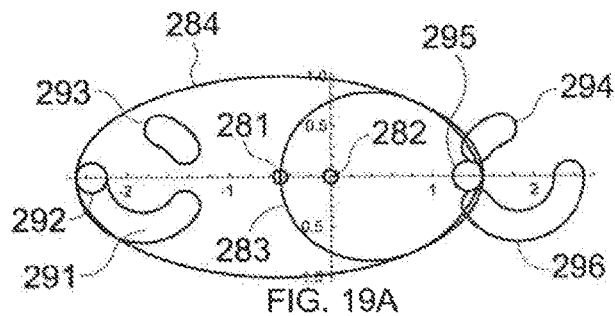
FIGS. 19A-L show stages of the exemplary device in FIGS. 20A-B with a piston rotating counterclockwise around a fixed axis inside a non-rotating orbiting elliptic cylinder.
Figure 19B:
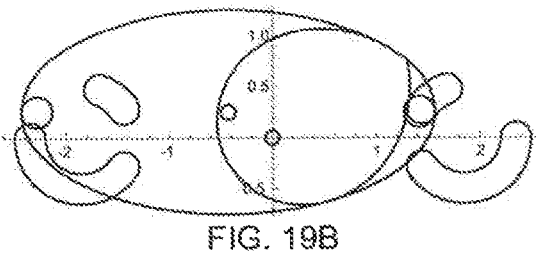
Figure 19C:
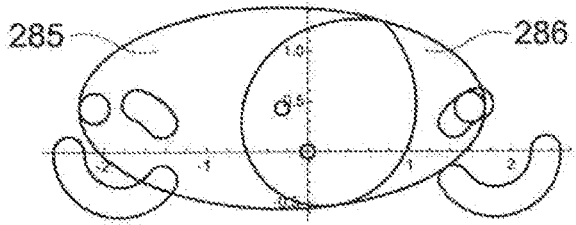
Figure 19D:
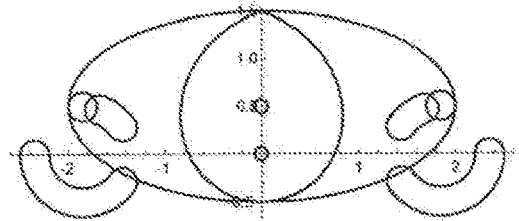
Figure 19E:
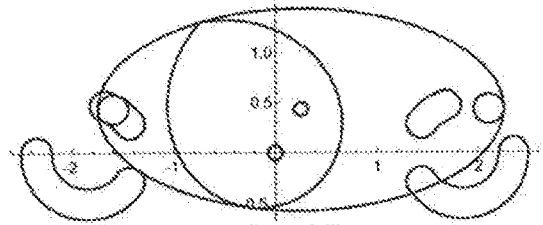
Figure 19F:
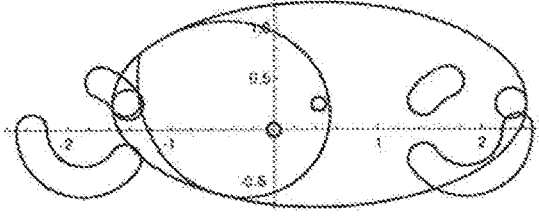
Figure 19G:
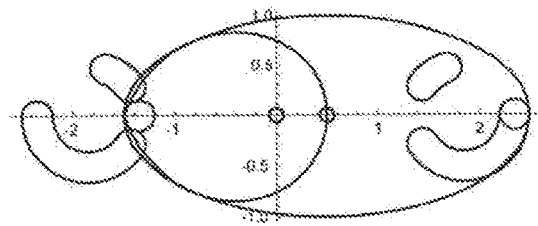
Figure 19H:
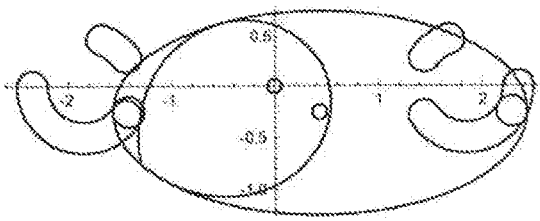
Figure 19I:
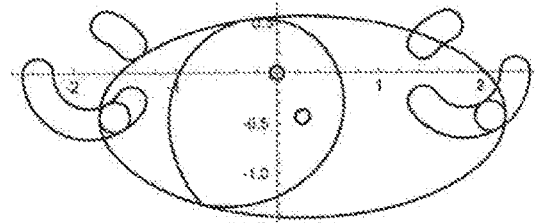
Figure 19J:
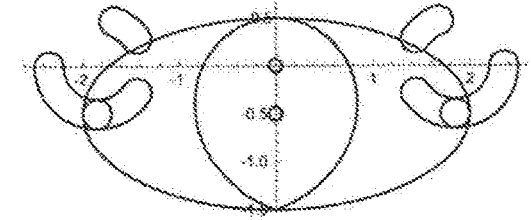
Figure 19K:
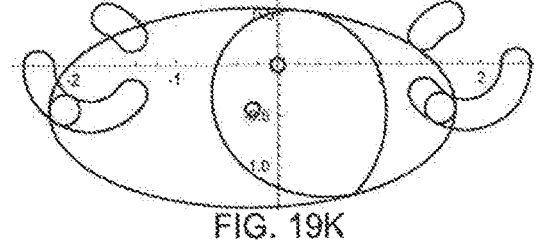
Figure 19L:
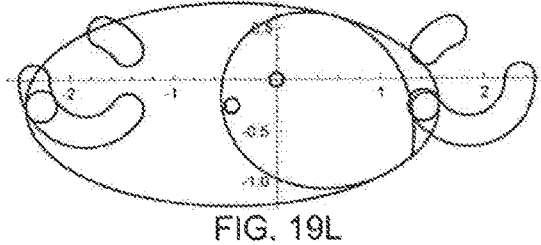
Figure 21A:
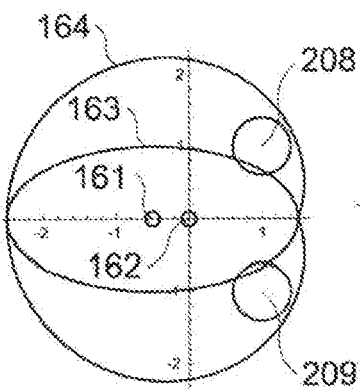
FIGS. 21A-L show stages of an elliptic piston in a circular movement without rotation inside a cylinder.
Figure 21B:
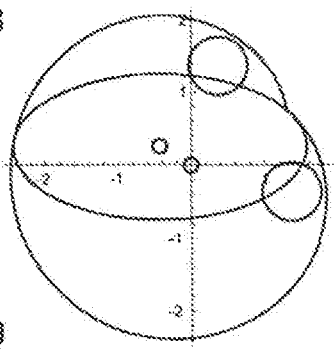
Figure 21C:
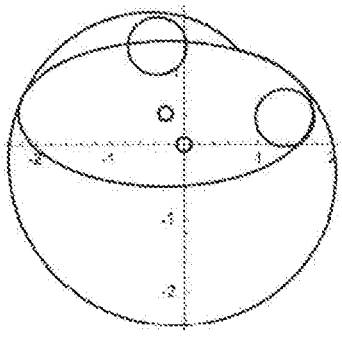
Figure 21D:
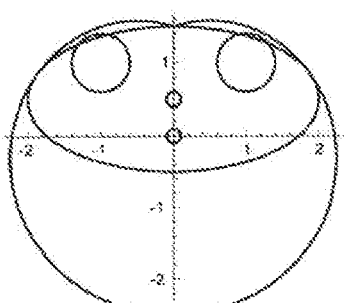
Figure 21E:
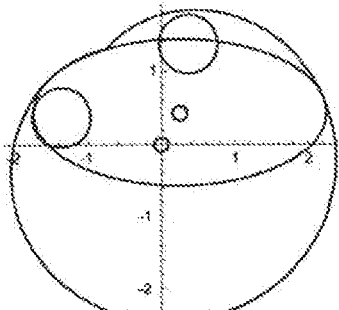
Figure 21F:
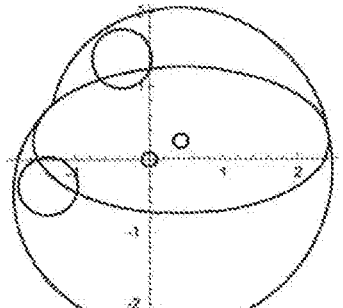
Figure 21G:
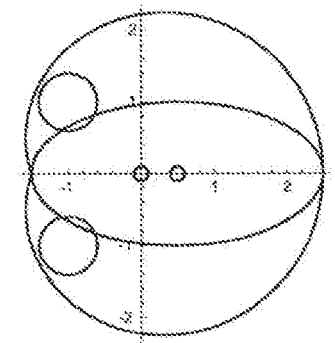
Figure 21H:
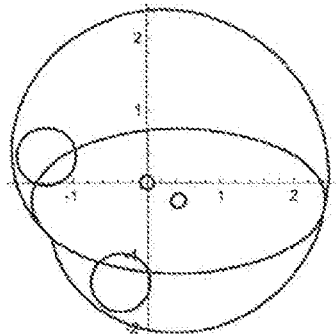
Figure 21I:
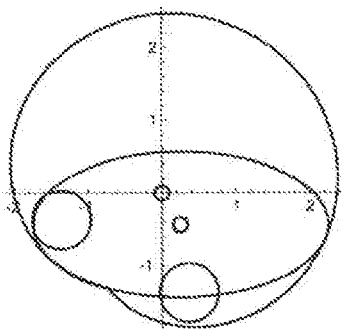
Figure 21J:
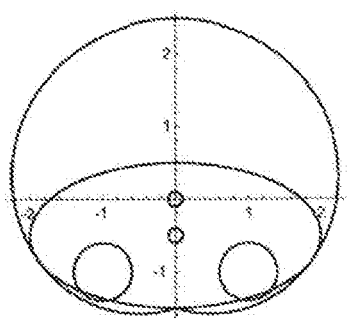
Figure 21K:
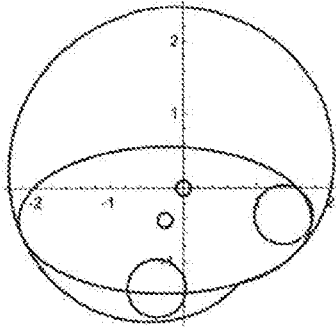
Figure 21L:
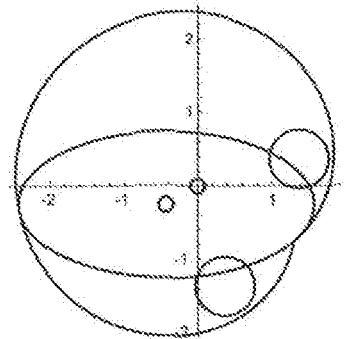
Figure 22A:
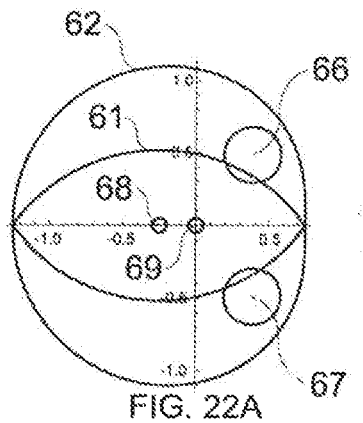
FIGS. 22A-L show stages of an orbiting piston inside a rotating single loop limaçon cylinder.
Figure 22B:
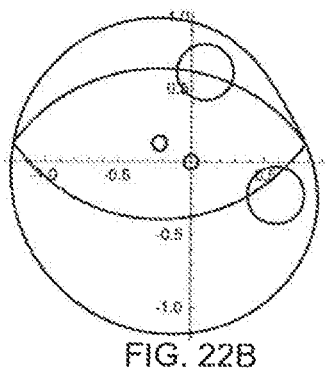
Figure 22C:
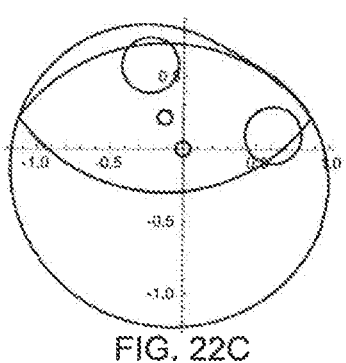
Figure 22D:
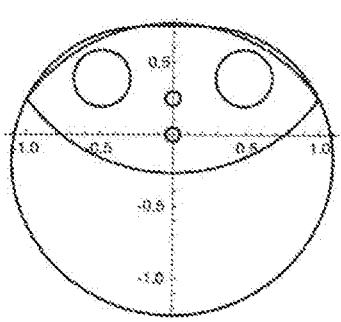
Figure 22E:
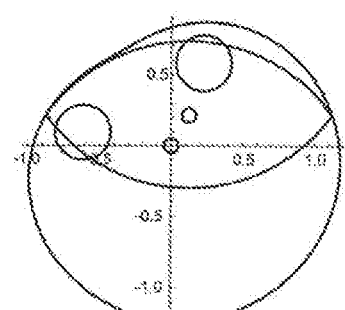
Figure 22F:
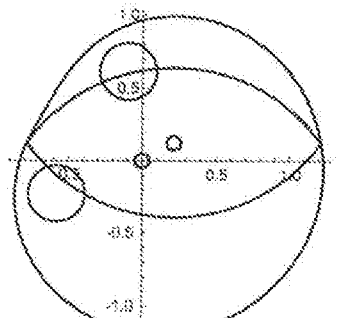
Figure 22G:
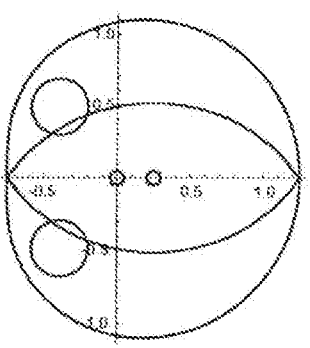
Figure 22H:
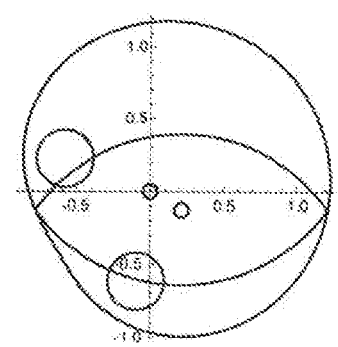
Figure 22I:
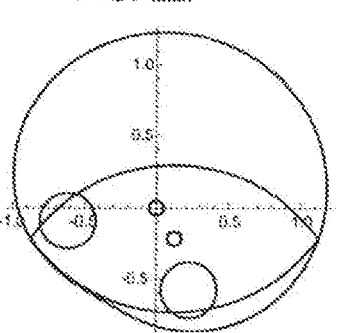
Figure 22J:
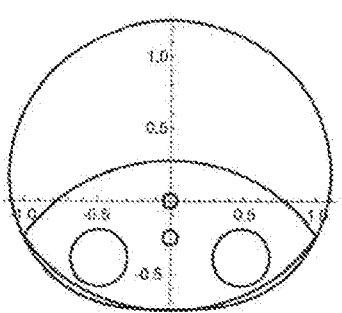
Figure 22K:
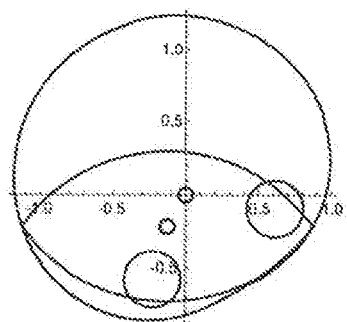
Figure 22L:
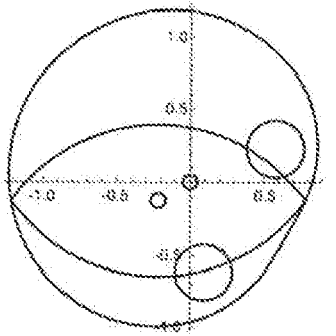
Figure 23A:
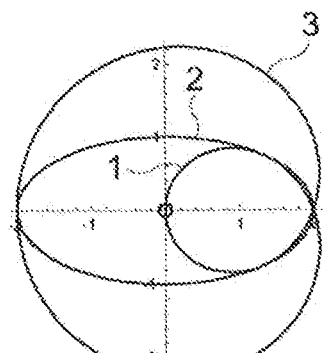
FIGS. 23A-L shows stages of counterclockwise rotation of a dual-loop limaçon around a fixed axis, with a vertically oscillating ellipse therein.
Figure 23B:
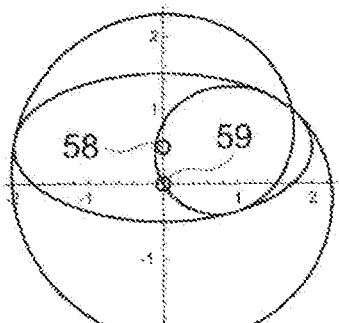
Figure 23C:
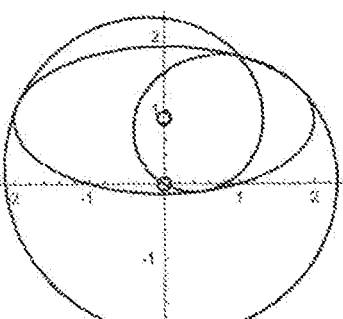
Figure 23D:
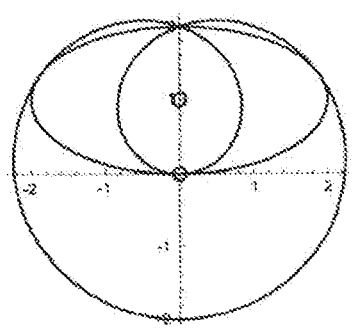
Figure 23E:
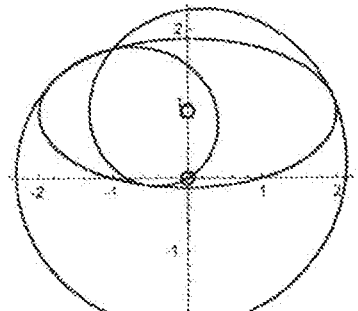
Figure 23F:
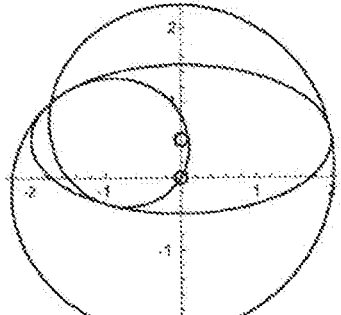
Figure 23G:
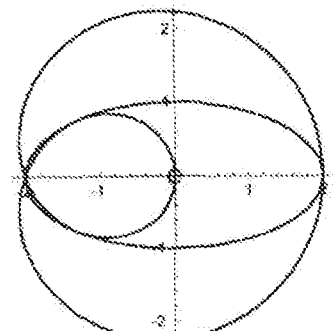
Figure 23H:
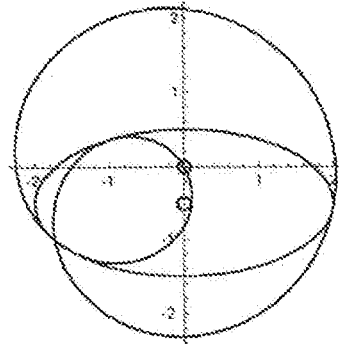
Figure 23I:
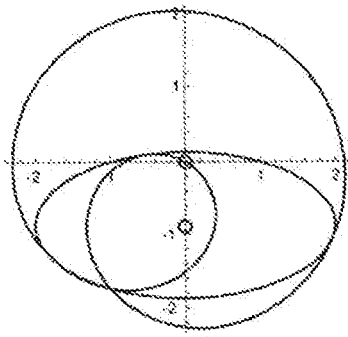
Figure 23J:
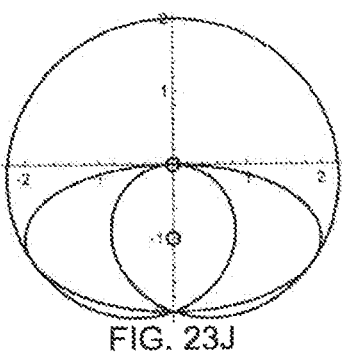
Figure 23K:
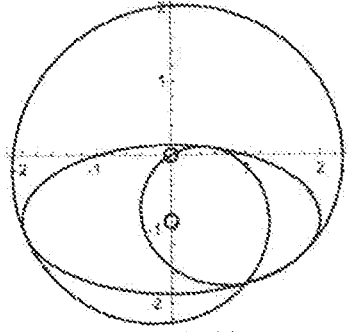
Figure 23L:
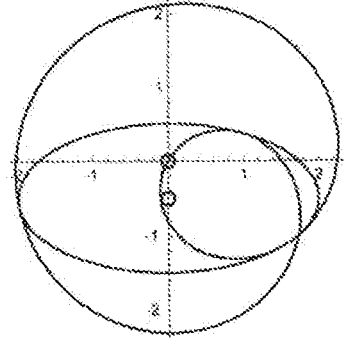

FIG. 14 is a drawing showing the pressure changing device of FIG. 13 in a perpendicular orientation (e.g., with the cylinder rotated 90°) and the piston rotated 180°. The connection between the ports 442 and 443 and the connection between the ports 444 and 445 are drawn to visualize the flow pattern in the device. In a real device, they are nearer to the tip of the piston, rather than in the drawing plane. In expansion mode, ports 442, 444 and 446 are outlet ports, and ports 441, 443 and 445 are inlet ports. Inlet 447 is connected to a high-pressure gas supply/source, and outlet 448 is connected to a low-pressure gas outlet or sink.

In the example expander shown in FIGS. 13 and 14, the ratio of the volume of the space 411 to the volume of the space 413 is 1:40. This corresponds to temperature change of −205° C. or +1030° C. from 25° C. for a two-atom gas (e.g., nitrogen, hydrogen, etc.) and −246° C. or +3128° C. for a noble gas. A cryo-expander according to FIGS. 13 and 14 can produce liquid air, liquid methane or liquid hydrogen with a minimum of moving parts. The exemplary expander shown in FIGS. 13 and 14 having two fixed axes is relatively simple, but more complex expanders (e.g., having a larger number of devices in series) are envisioned.

FIGS. 15A-H show stages of the 2-step limaçon pressure changing system in FIGS. 13 and 14. Axis 439 is the fixed axis (A-A in FIG. 13) of the rotating piston (452 in FIG. 13) with 3 different inner loop limaçon piston sections 347, 348 and 349. Axis 438 is the fixed axis (B-B in FIG. 13) of the rotating cylinder casing (451 in FIG. 13) with 3 different elliptic cylinders 421, 422 and 423.

FIGS. 16A-H show stages of a non-rotating piston 671 with an axis 679 orbiting counterclockwise around a fixed axis 678 inside and at the center of an elliptic cylinder 672. The piston 671 has an external surface with a cross-section that is an internal loop of a dual-loop limaçon.

FIGS. 17A-H show stages of an elliptic piston 681 rotating counterclockwise around a fixed axis 688 inside an orbiting non-rotating cylinder 682. The center 689 of the cylinder 682 orbits counterclockwise around the axis 688. The cylinder 682 has an internal surface with a cross-section that is an external loop of a dual-loop limaçon. Space 685 is an intake space, space 684 is an outlet space, and space 683 is a transition space (e.g., that transitions from an expansion space to an outlet space).

FIGS. 18A-22L show devices having one part (i.e., the cylinder or piston) on a fixed rotating axis, and the other part attached to an orbiting axis.

FIGS. 18A-L show stages of a piston 153 rotating counterclockwise around a fixed axis 152 inside an elliptic cylinder 154 in a still further pressure changing device according to the present invention. The elliptic cylinder 154 has a center 151 that moves circularly in a clockwise direction around a fixed axis 152, but the cylinder 154 does not rotate. The cross-section of the outside surface of the piston 153 is the internal loop of a dual loop limaçon. The pressure changing device of FIG. 18 includes ports 155 and 157 that are fixed to and moving with the cylinder 154, and ports 156, 165, 166, and 167 that are fixed in the stationary casing at one end of the cylinder 154 and piston 153. The short ports 165 and 166 are high-pressure ports working as intake ports in expansion mode and as exhaust ports in compression mode. The long ports 156 and 167 are low-pressure ports, working as exhaust ports in expansion mode and as intake ports in compression mode. The high-pressure port opening angle depends on the high-pressure to low-pressure ratio. A small angle may be appropriate or desirable for a high ratio, and vice versa. In a volume-to-volume pressure changing device, the low-pressure port may be open nearly 180°. The gas in the left-hand space 168 is expanding in FIGS. 18K-18L. The gas in the right-hand space 169 is expanding in FIGS. 18D-18F.

FIGS. 19A-L show stages of the pressure changing device 240 in FIGS. 20A-B, in which the piston 283 (which corresponds to the piston 243 in FIGS. 20A-B) rotates counterclockwise around a fixed axis 282 inside an orbiting and non-rotating elliptic cylinder 284 (which corresponds to the cylinder 244 in FIGS. 20A-B). The elliptic cylinder 284 has a center 281 that moves circularly in a clockwise direction around the fixed axis 282. The device is similar to that of FIGS. 18A-L, with the timing of the ports adapted or customized for the application shown in FIGS. 20A-B. In this example, the left displacement volume 285 is a compression volume, and the right displacement volume 286 is an expansion volume. In other words, the left side of the device is a compressor, and the right side of the device is an expander. The left port 292 works as a low-pressure intake port in FIGS. 19H-19L and FIG. 19A. The left port 292 works as a high-pressure exhaust port in FIGS. 19D-19F. The gas in the left-hand space 285 is compressed in FIGS. 19B-19D. The right port 295 works as a low-pressure exhaust port in FIGS. 19G-19L. The right port 295 works as a high-pressure intake port in FIGS. 19B-19D. The gas in the right-hand space 286 is expanding in FIGS. 19D-19F.

FIG. 20A is an example of another Brayton engine (e.g., for combustion of biofuels) with a pressure changing device 240 that includes a limaçon piston 243 in an elliptic cylinder 244. The pressure changing device 240 works simultaneously as a compressor and an expander. The Brayton engine of FIG. 20A further includes a combustion chamber 271. The elliptic cylinder 244 has a center 242 that makes a clockwise circular motion around the axis 241, without rotating. The piston 243 rotates counterclockwise around a fixed axis 241. The cylinder 244 includes ports 253 and 254 fixed thereto or therein. Port 251 is low-pressure intake port, port 252 is high-pressure exhaust port, port 255 is a high-pressure intake port, and port 256 is a low-pressure exhaust port. An air intake 261 is in gaseous communication with the low-pressure intake port 251. An exhaust pipe 264 is in gaseous communication with low-pressure exhaust port 256. In the example shown in FIG. 20A, the left displacement volume 245 is a compression volume, and the right displacement volume 246 is an expansion volume. Conduit 262 allows compressed, relatively high-temperature gas to flow to an inlet to the combustion chamber 271, and conduit 263 carries gases from an outlet in the combustion chamber 271. The combustion chamber 271 may include a conventional fuel feed mechanism and a conventional solid waste removal mechanism (not shown).

FIG. 20B is an example of a Brayton heat pump system with a pressure changing device 250 similar to the device 240 in FIG. 20A with a heat exchanger 272 inside a room or building 273. The heat pump heats the room 273 when the piston 243 rotates counterclockwise and cools the room 273 when the piston 243 rotates clockwise. In heating mode, the left side of the device 250 is a compressor, and the right side is an expander, and vice versa in cooling mode. The pressure in the system 250 may be higher with a closed system by adding an additional heat exchanger connected between intake 261 and exhaust 264. The system may work in a similar way with a heat exchanger between intake 261 and exhaust 264 and no heat exchanger between conduits 262 and 263. Devices 240 and 250 can be mounted in series on a common shaft is to form a heat driven AC unit. When combustion chamber 271 is replaced with a solar collector, the system forms a solar driven AC unit.

FIGS. 21A-L show stages of an elliptic piston 163 that moves without rotation inside a limaçon cylinder 164 of another pressure changing device according to the present invention. In FIGS. 21A-L, the center 161 of the piston 163 moves circularly (orbits without rotation) in a clockwise direction around a fixed axis 162, and the cylinder 164 rotates counterclockwise around the fixed axis 162. Changing the direction of rotation changes the function of the pressure changing device (e.g., from compressor to expander). The cross-section of the inside surface of the cylinder 164 is the external loop of a dual loop limaçon. In the shown example port 209 is an intake port and 208 is an exhaust port. In expansion mode, the intake port 209 is connected to a high-pressure gas supply, and the exhaust port 208 is connected to a low-pressure gas sink. In compression mode, the intake port 209 is connected to a low-pressure gas supply, and the exhaust port 208 is connected to a high-pressure gas sink.

The device of FIGS. 21A-L may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIGS. 22A-L show stages of counterclockwise rotation of a single loop limaçon cylinder 62 around a first fixed axis 69 (e.g., at [0,0]) similar to FIGS. 17A-H and 31A-L, including a piston 61 with relatively sharp end points, in which the piston 61 with the center 68 orbits around said first fixed axis 69 without rotation. A pressure changing device comprising the piston and cylinder of FIGS. 22A-L may have an intake port 67 and an exhaust port 66. In the shown example, port 67 is an intake port, and port 66 is an exhaust port. In expansion mode, the intake port 67 is connected to a high-pressure gas supply, and the exhaust port 66 is connected to a low-pressure gas sink. In compression mode, the intake port 67 is connected to a low-pressure gas supply, and the exhaust port 66 is connected to a high-pressure gas sink. The device of FIGS. 22A-L may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIGS. 23A-28L show devices and/or systems that have one part (i.e., a cylinder or piston) on a fixed rotating axis and the other part oscillating along the minor axis of an elliptic cross-section.

FIGS. 23A-L show stages of counterclockwise rotation of a dual-loop limaçon 1, 3 around a fixed axis 59 and an ellipse 2 oscillating along the minor axis of the ellipse 2. The components of the dual-loop limaçon of FIGS. 23A-L have the same relative movement as the inner loop 1 and external loop 3 of the limaçon and the ellipse 2 in FIGS. 3A-L, but with a different movement relative to an external fixed reference system.

Figure 24A:
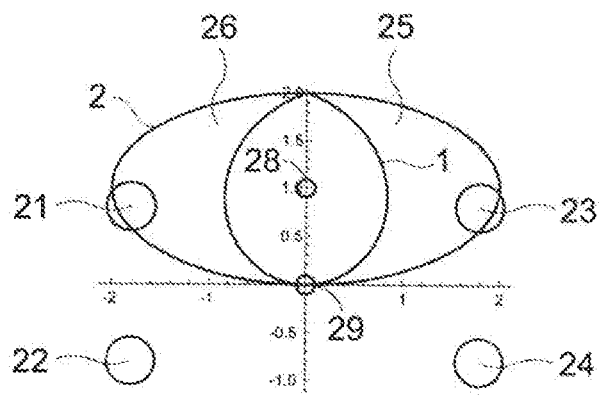
FIGS. 24A-H show stages of an inner loop limaçon piston rotating counterclockwise around a fixed axis inside an oscillating elliptic cylinder of an exemplary limaçon-based pressure changing device.
Figure 24B:
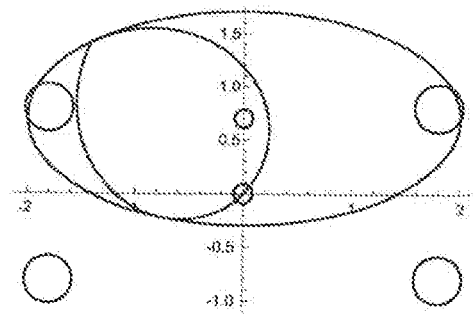
Figure 24C:
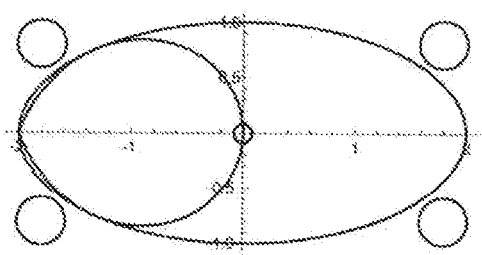
Figure 24D:
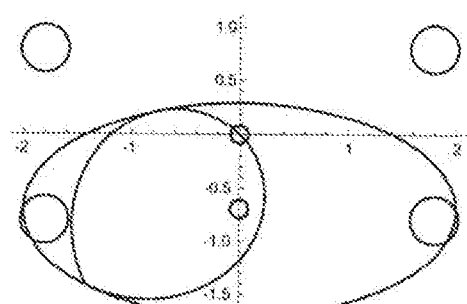
Figure 24E:
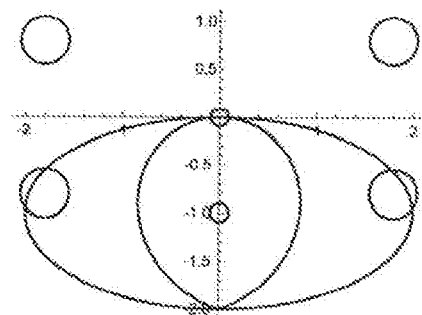
Figure 24F:
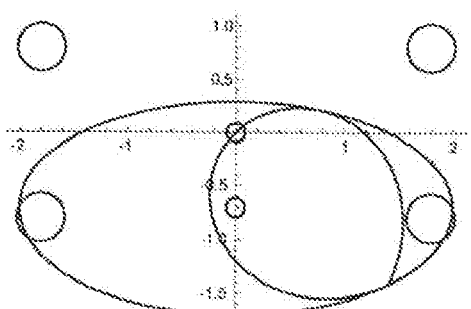
Figure 24G:
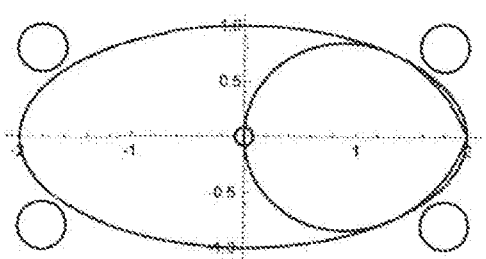
Figure 24H:
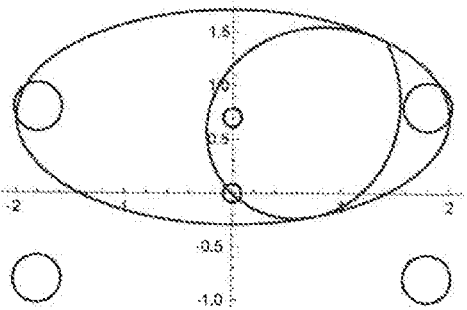

FIGS. 24A-H show stages of a further pressure changing device with an inner loop limaçon piston 1 rotating counterclockwise around a fixed axis 29 (e.g., at [0,0]) inside an elliptic cylinder 2 having a center 28 that oscillates (e.g., vertically in the plane of the page) with substantially the same movement as the ellipse 2 and the inner loop limaçon 1 in FIGS. 23A-L. In the shown example, the piston 1 rotates counterclockwise. In FIGS. 24H and 24A-B, gas enters the space 25 in the cylinder 2 through intake port 23, and gas leaves the space 26 in the cylinder 2 through the exhaust port 21. In FIG. 24C, the space 26 changes from an exhaust space to an intake space, and vice versa with space 25. In FIGS. 24D-F, gas enters the left-hand space 26 in the cylinder 2 through a second intake port 22, and gas leaves the right-hand space 25 in the cylinder 2 through a second exhaust port 24. In FIG. 24G, the space 25 changes from an exhaust space to an intake space, and vice versa with space 26. Different volume to volume port configurations for the device shown in FIGS. 24A-H are shown in FIG. 26.

Figure 25:
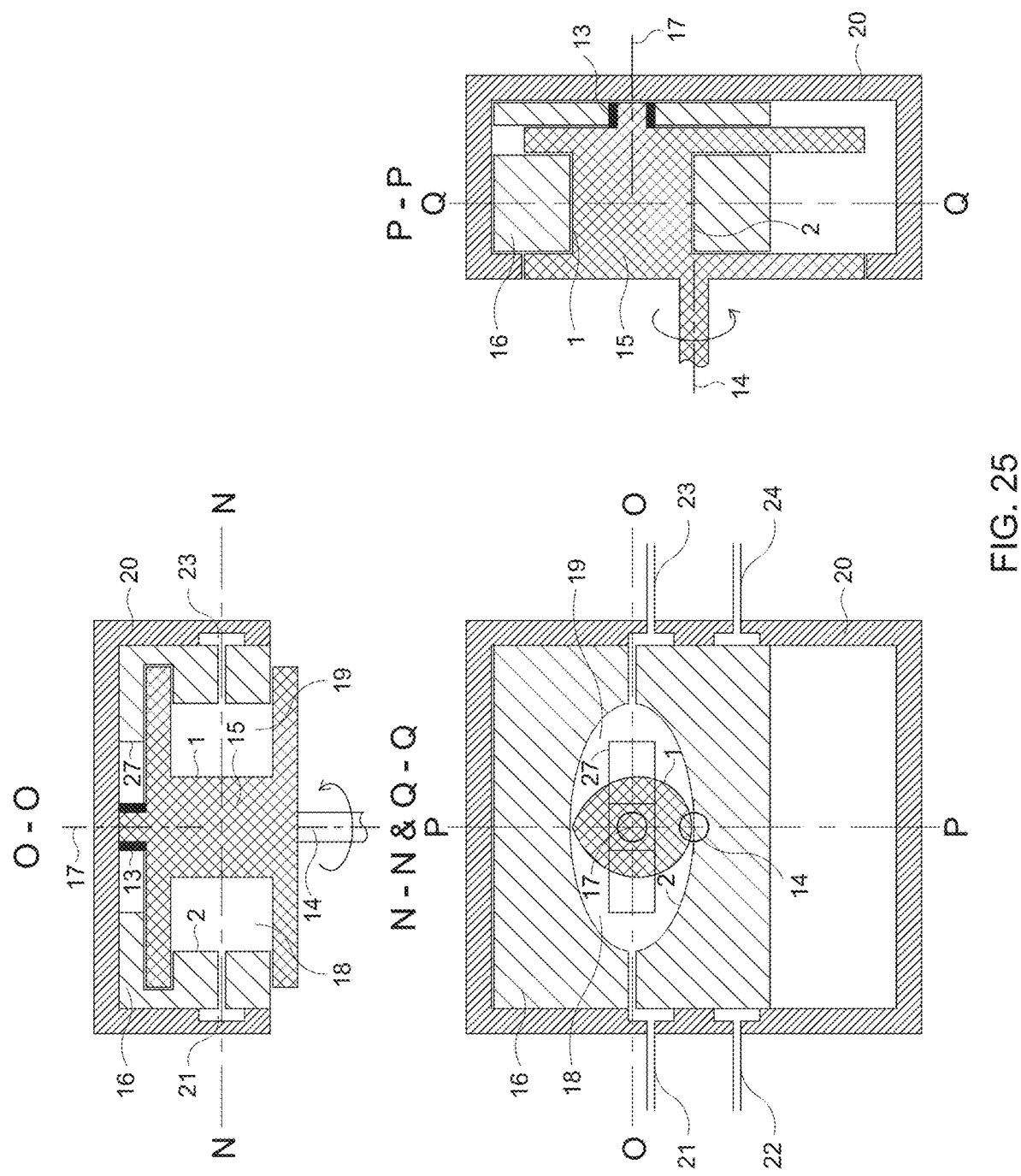
FIG. 25 shows an exemplary Scotch yoke for guiding the vertical of movement of an oscillating elliptic cylinder in another exemplary limaçon-based pressure changing device.
Figure 27A:
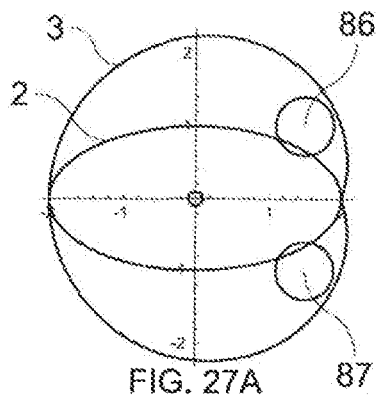
FIGS. 27A-L show stages of counterclockwise rotation of an external loop limaçon cylinder around a fixed axis and a vertically oscillating ellipse therein.
Figure 27B:
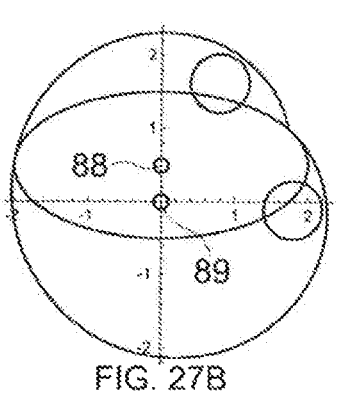
Figure 27C:
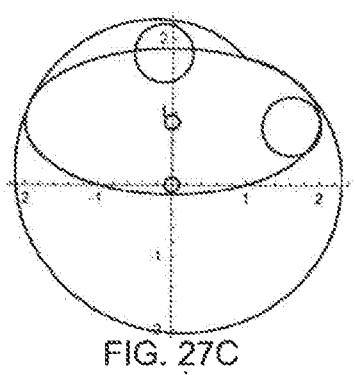
Figure 27D:
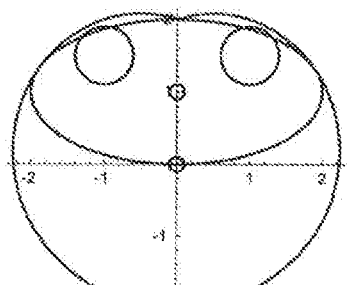
Figure 27E:
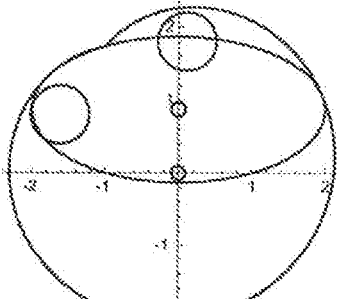
Figure 27F:
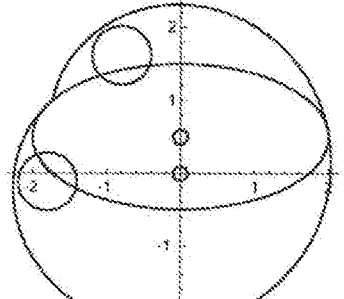
Figure 27G:
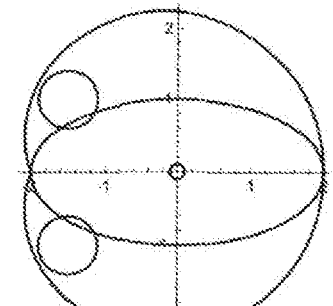
Figure 27H:
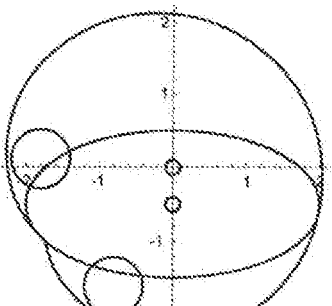
Figure 27I:
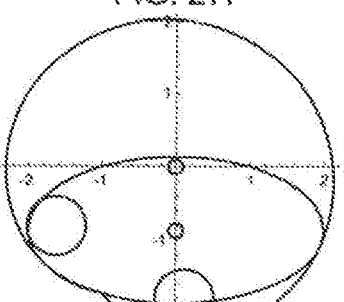
Figure 27J:
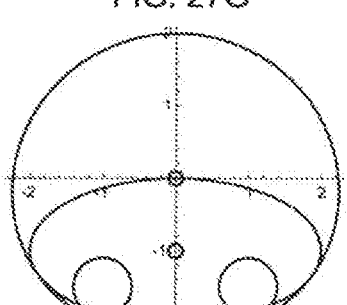
Figure 27K:
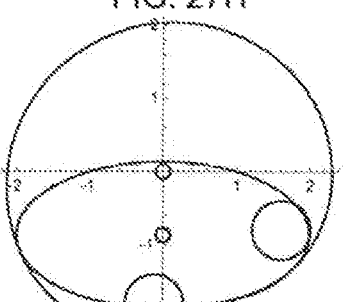
Figure 27L:
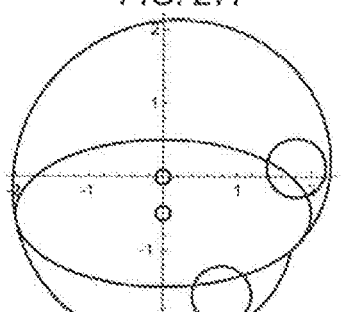
Figure 29A:
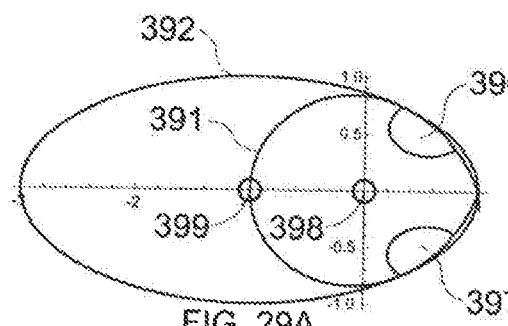
FIGS. 29A-L show stages of an inner loop limaçon piston rotating counterclockwise around a fixed axis inside an oscillating elliptic cylinder similar to FIGS. 24A-H, but with the ellipse oscillating along its major axis.
Figure 29B:
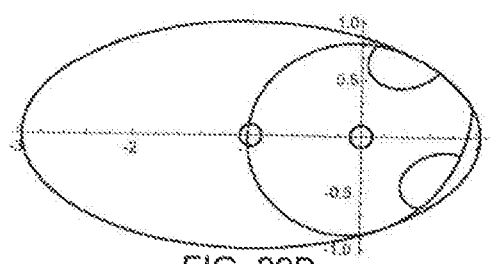
Figure 29C:
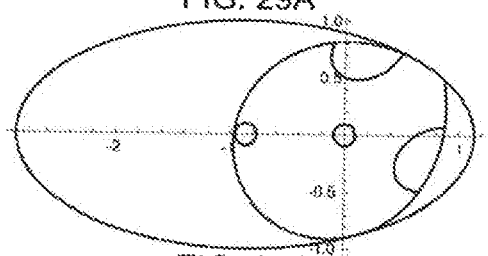
Figure 29D:
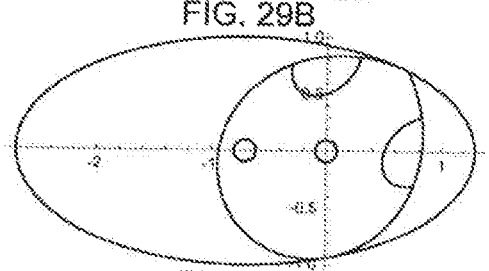
Figure 29E:
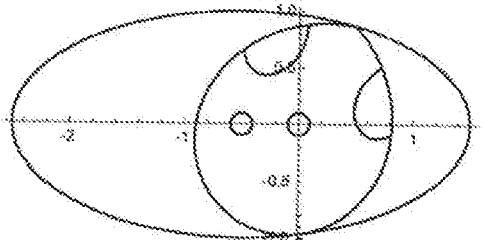
Figure 29F:
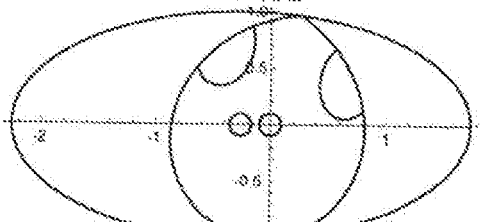
Figure 29G:
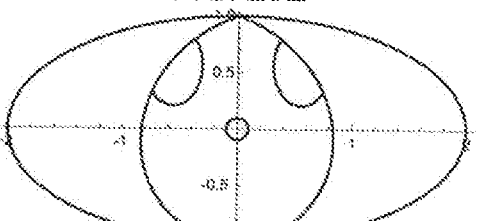
Figure 29H:
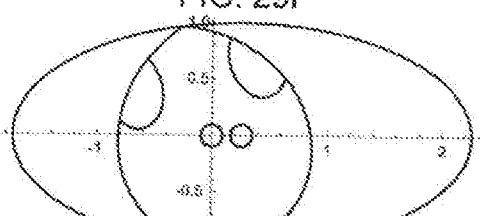
Figure 29I:
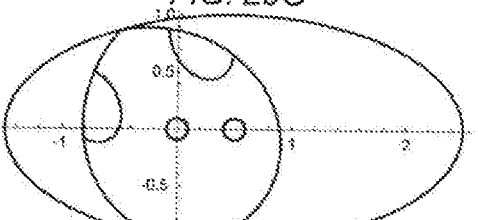
Figure 29J:
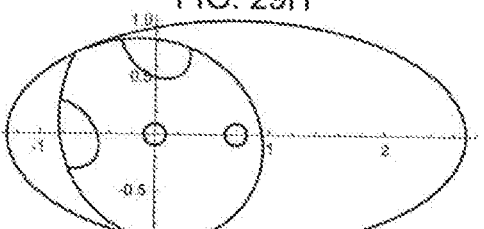
Figure 29K:
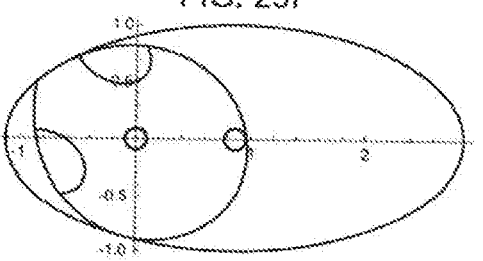
Figure 29L:
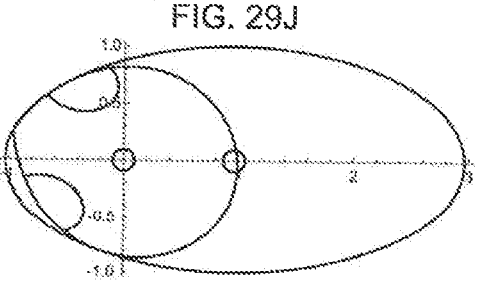

FIG. 25 shows a pressure changing device with a Scotch yoke for guiding the vertical of movement of an oscillating elliptic cylinder 16 in a frame or housing 20. The inner loop limaçon piston 15 has a surface 1 that sealingly contacts the elliptic cylinder surface 2 in two locations as it rotates around a fixed axis 14. The elliptic cylinder 16 slides in the frame 20. A sliding bearing 13 for an axis 17 extends from the center of the limaçon inner loop portion of the piston 15. The sliding bearing 13 slides in a Scotch yoke sliding slot 27 in the center (e.g., along the long axis) of the oscillating elliptic cylinder 16. When the piston 15 rotates counterclockwise, gas flows into the cylinder volume 19 through port 23 and out from the cylinder volume 19 through port 24, and gas flows out from the cylinder volume 18 through port 21 and into the cylinder volume 18 through port 22.

The device of FIG. 25 may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIG. 26 is graphic depiction of the above description of the volume-to-volume expansion and compression processes. FIG. 26 shows volume-to-volume compression, expansion and simultaneous compression-and-expansion processes involving rotating inner loop limaçon pistons 138, 148 and 158 and vertically oscillating elliptic cylinders 139, 149 and 159, respectively. In these examples of devices or systems 120, 130 and 140 including three compressors and/or expanders, all pistons are rotating counterclockwise. Axis 119 is the center of the cylinder, and axis 118 is the axis of rotation of the piston.

In the device/system 120, both sides (e.g., 141 and 142, 143 and 144, and 145 and 146) of the cylinders 139, 149 and 159 are compressing the gas. In the device/system 130, both sides of the cylinders 139, 149 and 159 are expanding the gas. In the device/system 140, the spaces 141, 144 and 145 are compression volumes, and the spaces 142, 143 and 146 are expansion volumes.

The volume in each of the connections between ports of the compressors and/or expanders are "dead volumes," which diminish the efficiency of the device, and which should be as small as possible. The cylinders 139, 149 and 159 may be stacked on each other along a common axis. In one embodiment, a single backplate with ports therein is common to two adjacent stacked cylinders. Consequently, the volume between the ports can be quite small. All pistons that have the same b-value also have the same vertical oscillation for corresponding cylinders. The a-value and the cylinder length determine the volume, even when the b-values are the same.

FIGS. 27A-L show stages of counterclockwise rotation of an external loop limaçon cylinder 3 around a fixed axis 89 (e.g., at [0,0]) and an elliptic piston 2 with the center 88 in yet another pressure changing device according to the present invention. The elliptic piston 2 oscillates (e.g., vertically in the plane of the page). In the shown example, port 87 is an intake port, and port 86 is an exhaust port. In expansion mode, the intake port 87 is connected to a high-pressure gas supply, and the exhaust port 86 is connected to a low-pressure gas sink. In compression mode, the intake port 87 is connected to a low-pressure gas supply, and the exhaust port 86 is connected to a high-pressure gas sink.

FIGS. 28A-L show stages of counterclockwise rotation of a single loop limaçon cylinder 237 around a fixed axis 239 in yet another pressure changing device according to the present invention. Piston 236 has a center 238 that oscillates along minor axis (e.g., vertically, in the plane of the page) in the cylinder 237. In the shown example, port 235 is an intake port, and port 234 is an exhaust port.

The device of FIGS. 28A-L may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIGS. 29A-31L show devices that have one part (i.e., a cylinder or piston) on a fixed rotating axis, and the other part oscillating along the major axis of an elliptic cross-section.

FIGS. 29A-L show stages of counterclockwise rotation of an inner loop limaçon piston 391 around a fixed axis 398 similar to the pressure changing device of FIGS. 24A-H, but with the elliptic cylinder 392 oscillating along the major axis (e.g., horizontally) instead of along the minor axis as in FIGS. 24A-H. A pressure changing device comprising the limaçon piston 391 and the elliptic cylinder 392 may have an intake port 397 and exhaust port 396 located near the tip of the inner loop limaçon piston.

The device of FIGS. 29A-L may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIGS. 30A-L show stages of counterclockwise rotation of an external loop limaçon cylinder 402 around a fixed axis 409 similar to FIGS. 27A-L, but with the elliptic piston 401 with the center 408 oscillating along its major axis instead of its minor axis, as in FIGS. 27A-L. The elliptic piston 401 in FIGS. 30A-L oscillates along major axis (horizontally in the plane of the page), rather than vertically, as the cylinder 402 rotates. In the shown example, port 407 is an intake port, and 406 is an exhaust port.

The device of FIGS. 30A-L may operate as a compressor when a check valve is connected to the high-pressure port (port 406 in compression mode). The device can operate as a reversible pressure changing device when a timing valve is connected to the high-pressure port (port 407 in expansion mode, and port 406 in compression mode or only to one port and changing the direction of rotation). The device may operate as part of an expander, a compressor, or both when connected in a volume-to-volume pressure changing series as described herein.

Figure 30A:
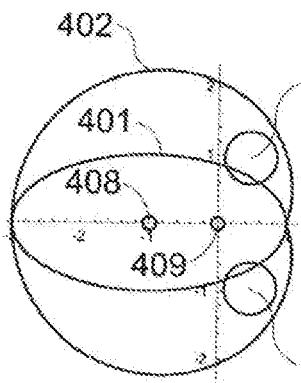
FIGS. 30A-L show stages of counterclockwise rotation of an external loop limaçon cylinder around a fixed axis and an oscillating elliptic piston therein, similar to FIGS. 27A-L, but with the ellipse oscillating along its major axis.
Figure 30B:
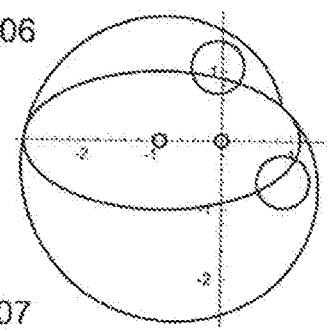
Figure 30C:
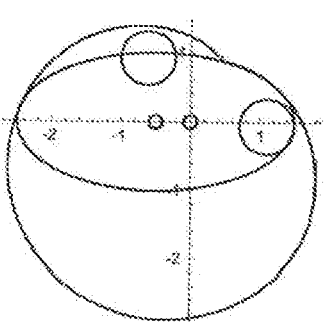
Figure 30D:
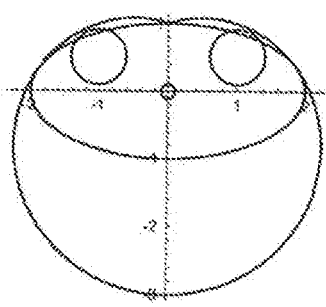
Figure 30E:
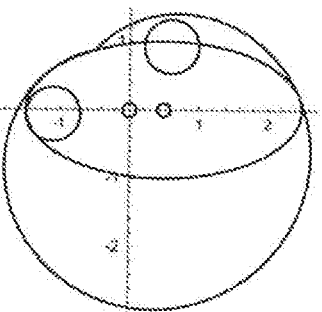
Figure 30F:
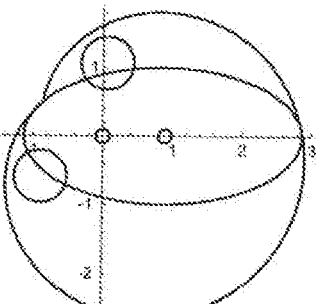
Figure 30G:
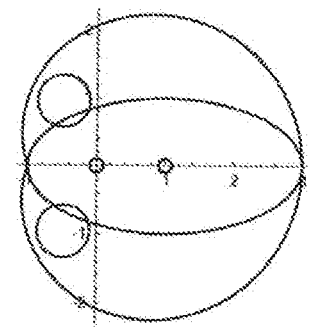
Figure 30H:
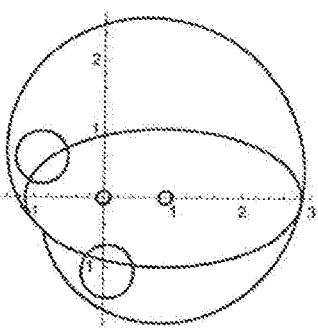
Figure 30I:
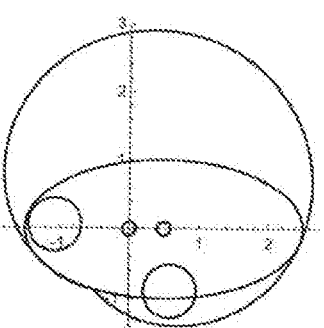
Figure 30J:
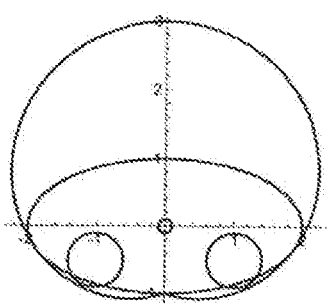
Figure 30K:
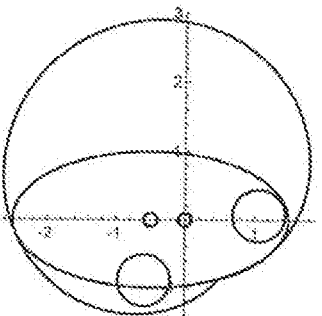
Figure 30L:
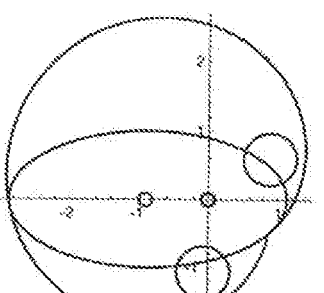
Figure 31A:
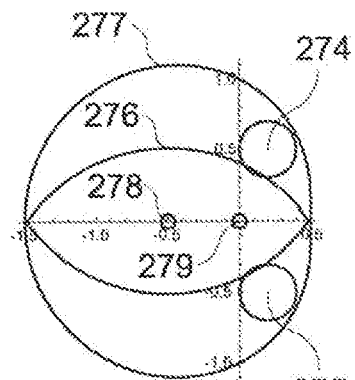
FIGS. 31A-L show stages of counterclockwise rotation of a single loop limaçon cylinder around a fixed axis with a piston therein oscillating along its major axis.
Figure 31B:
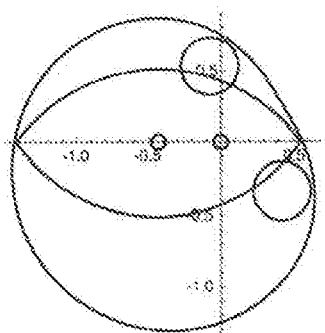
Figure 31C:
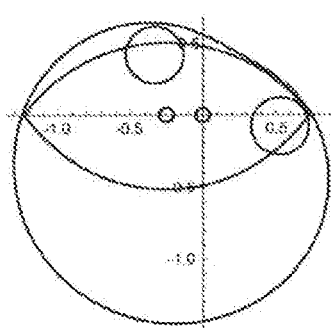
Figure 31D:
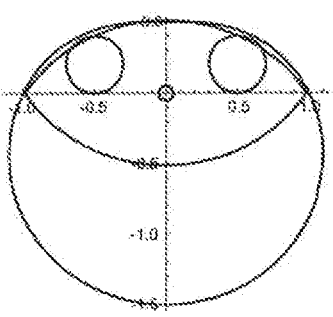
Figure 31E:
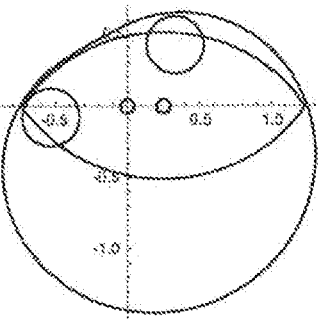
Figure 31F:
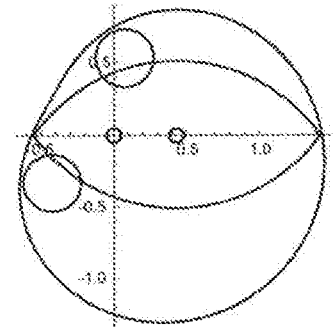
Figure 31G:
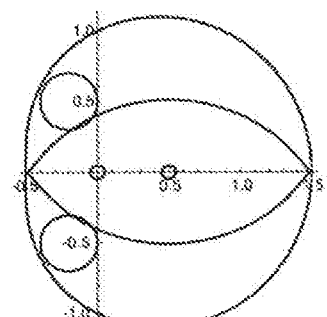
Figure 31H:
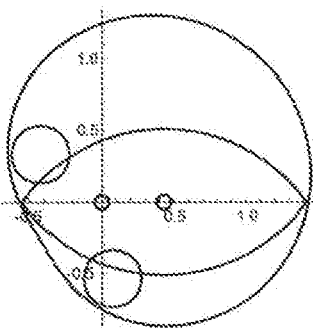
Figure 31I:
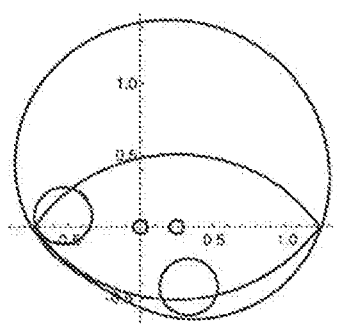
Figure 31J:
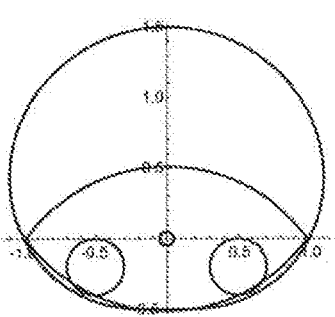
Figure 31K:
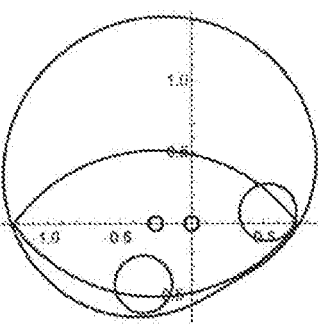
Figure 31L:
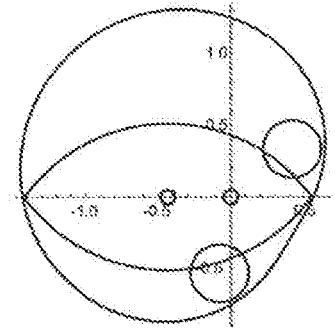

FIGS. 31A-L show stages of counterclockwise rotation of a single loop limaçon cylinder 277 around a fixed axis 279 similar to FIGS. 28A and 30L, including a piston 276 with relatively sharp end points (similar to FIGS. 28A-L), and in which the piston oscillates along its major axis (e.g., horizontally). In the shown example, port 275 is an intake port, and port 274 is an exhaust port. In expansion mode, the intake port 275 is connected to a high-pressure gas supply, and the exhaust port 274 is connected to a low-pressure gas sink. In compression mode, the intake port 275 is connected to a low-pressure gas supply, and the exhaust port 274 is connected to a high-pressure gas sink.

The device of FIGS. 31A-L may operate as a compressor when a check valve is connected to the high-pressure port. The device can operate as a reversible pressure changing device when a timing valve is connected to the high-pressure port. The device may operate as part of an expander, a compressor, or both when connected in a volume-to-volume pressure changing series as described herein.

FIGS. 32A-37H are examples of multiple limaçon pairs with one or two common shafts or axes.

Figure 32A:
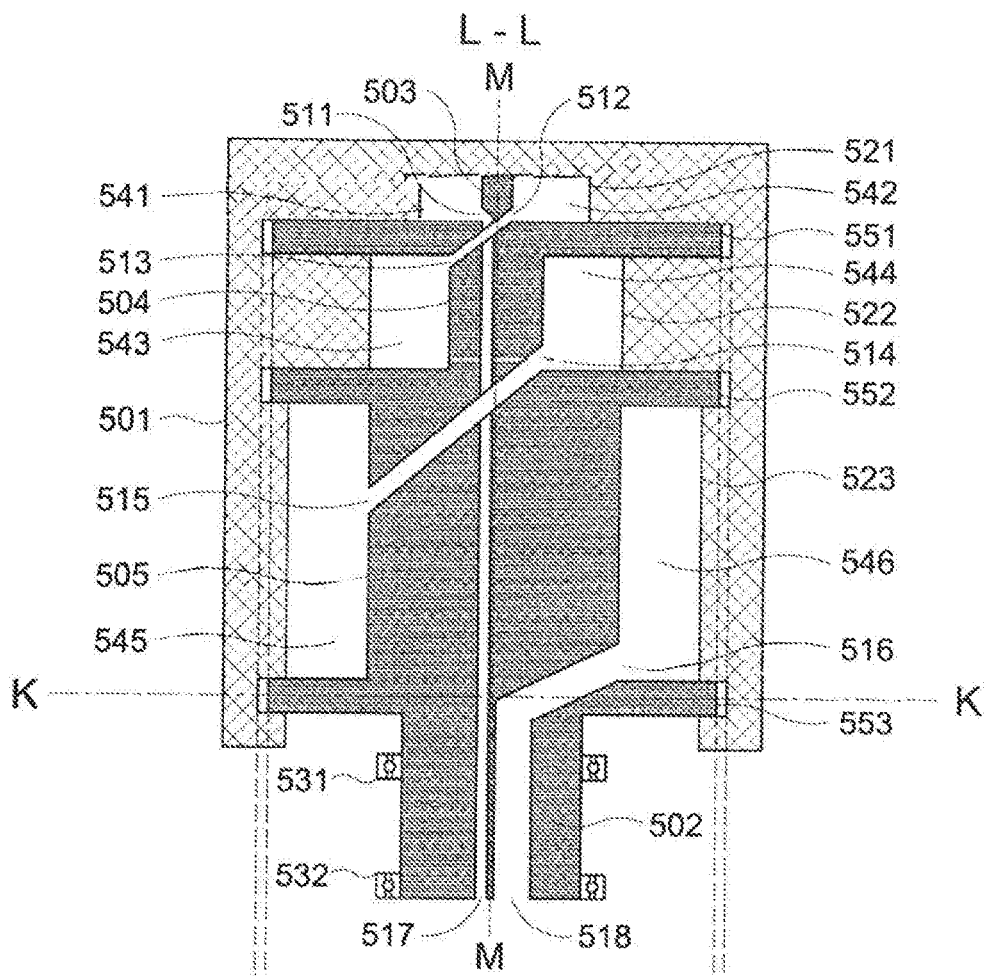
FIGS. 32A-B show an example of a 2-step volume-to-volume limaçon pressure changing system with 3 devices in series, having the same b-value but different a-values and different lengths
Figure 32B:
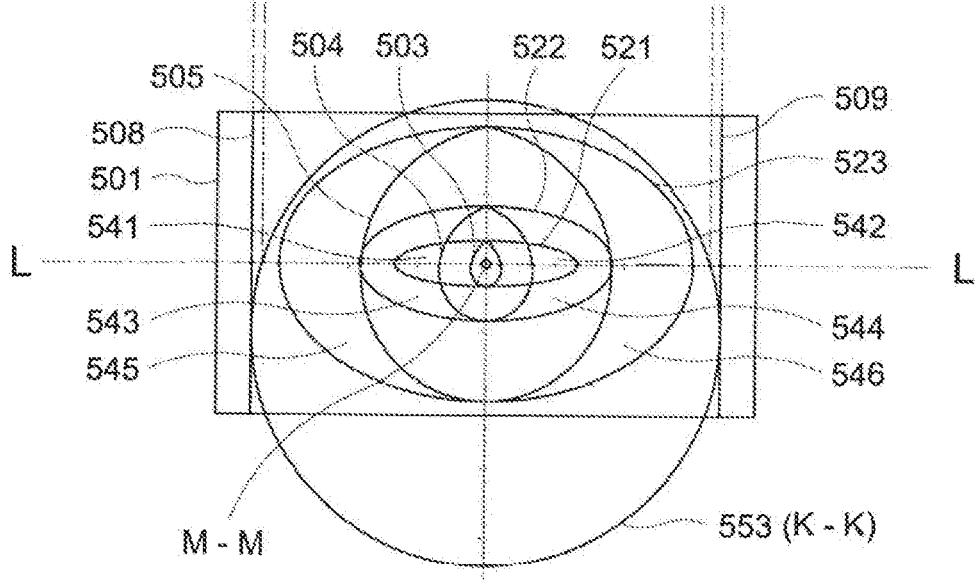
Figure 33A:
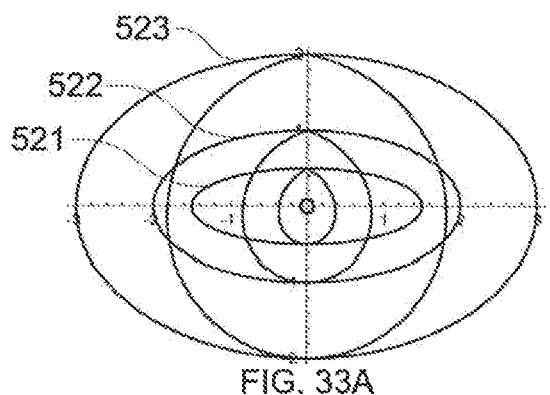
FIGS. 33A-H show stages of the 2-step volume-to-volume limaçon pressure changing system in FIGS. 32A-B.
Figure 33B:
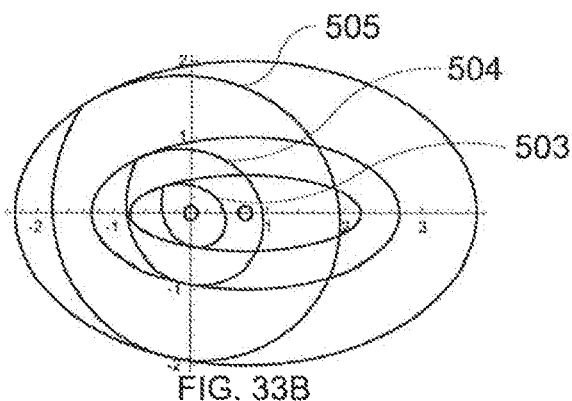
Figure 33C:
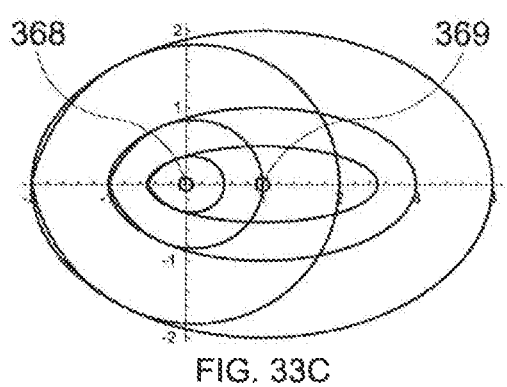
Figure 33D:
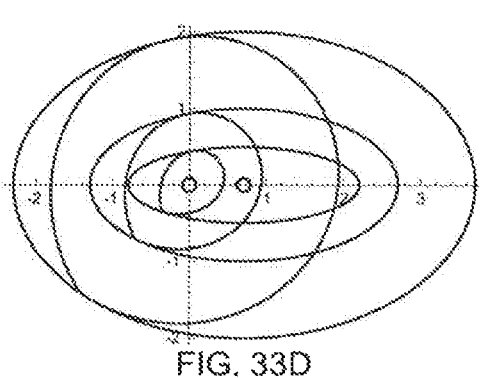
Figure 33E:
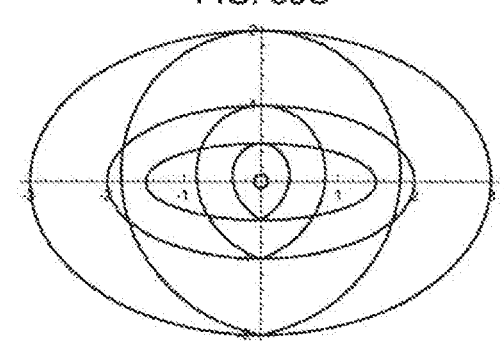
Figure 33F:
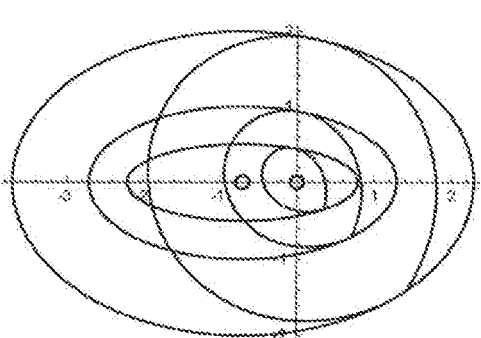
Figure 33G:
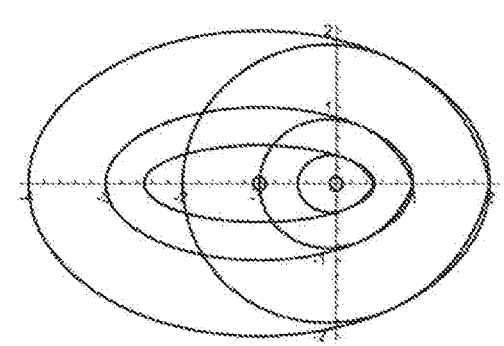
Figure 33H:
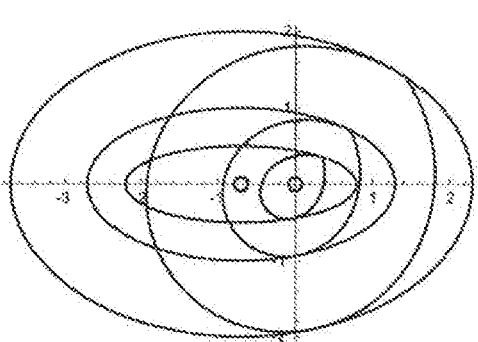
Figure 36A:
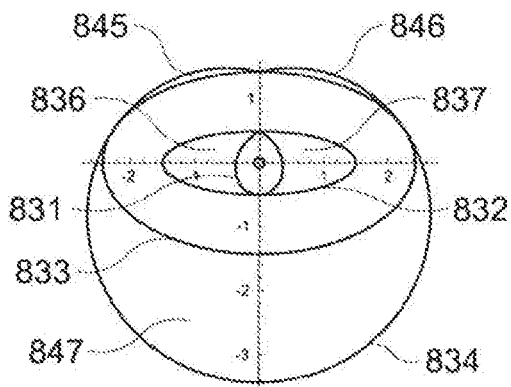
FIGS. 36A-H show stages of a fixed axis rotating external loop limaçon cylinder and inner loop limaçon piston with a common oscillating elliptic cylinder-piston.
Figure 36B:
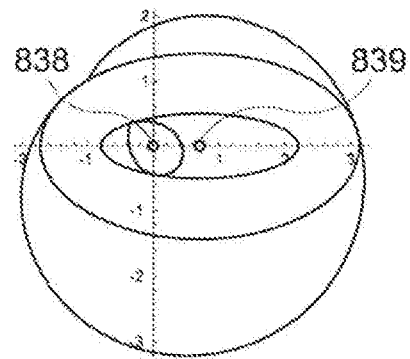
Figure 36C:
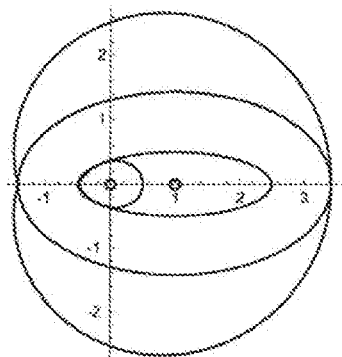
Figure 36D:
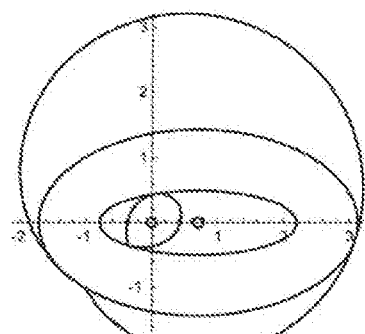
Figure 36E:
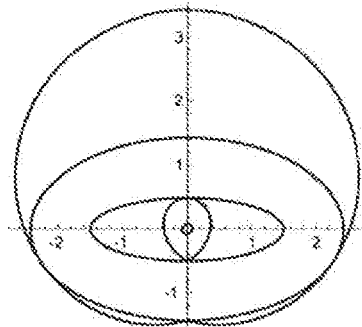
Figure 36F:
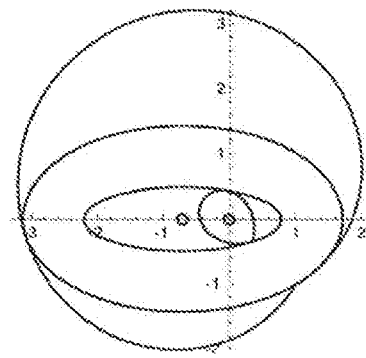
Figure 36G:
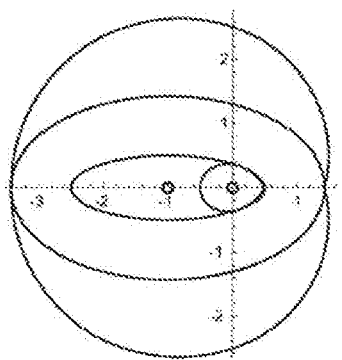
Figure 36H:
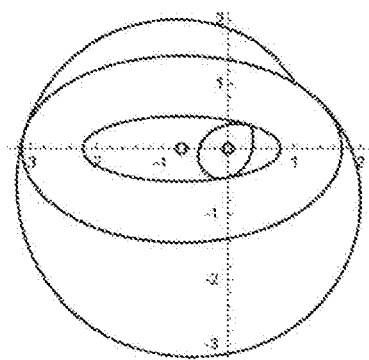
Figure 37A:
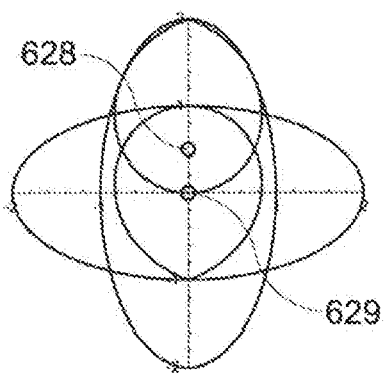
FIGS. 37A-H show stages of two rotating inner loop limaçon pistons with rotating cylinders and with a 90° phase difference between the cylinders.
Figure 37B:
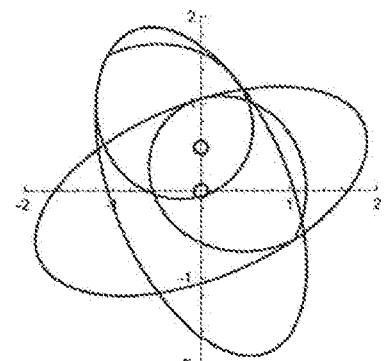
Figure 37C:
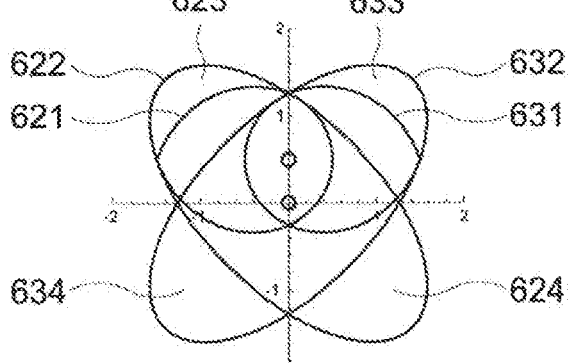
Figure 37D:
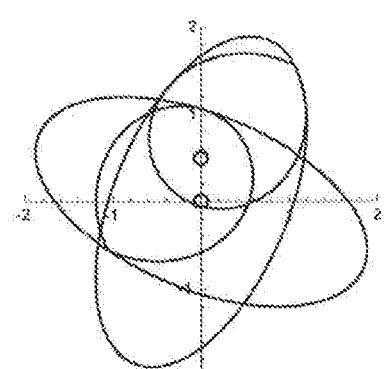
Figure 37E:
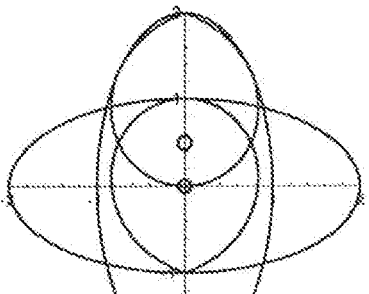
Figure 37F:
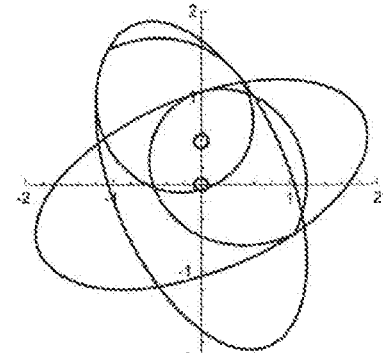
Figure 37G:
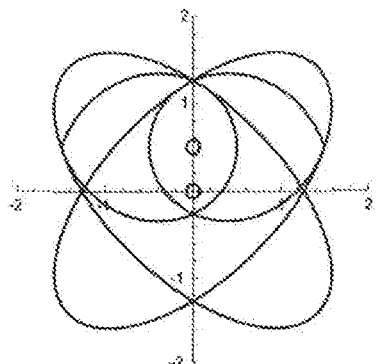
Figure 37H:
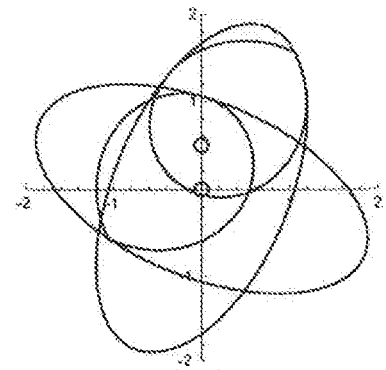
Figure 41A:
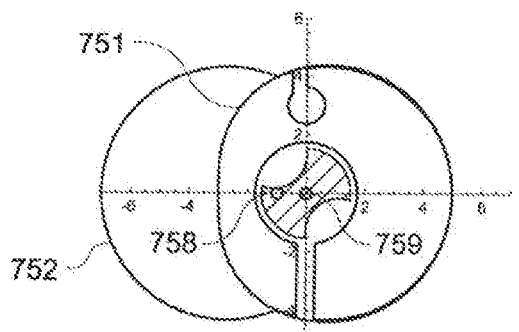
FIGS. 41A-H show stages of a single-loop limaçon piston rotating counterclockwise around a fixed axis inside a non-rotating orbiting cylinder.
Figure 41B:
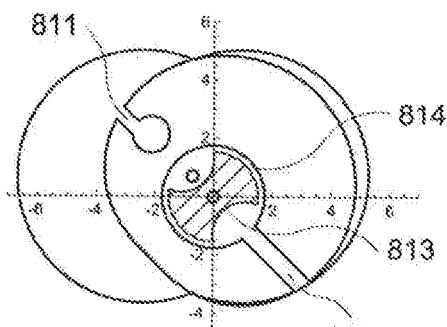
Figure 41C:
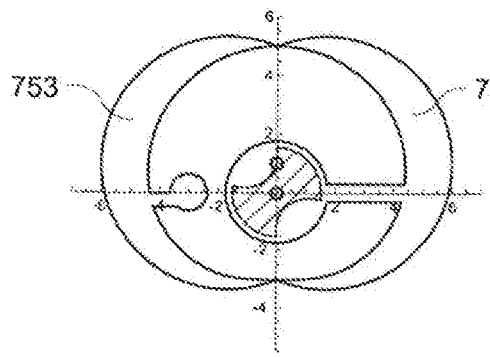
Figure 41D:
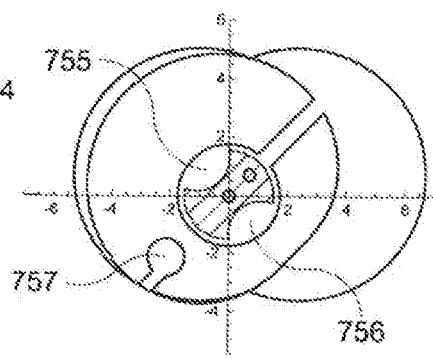
Figure 41E:
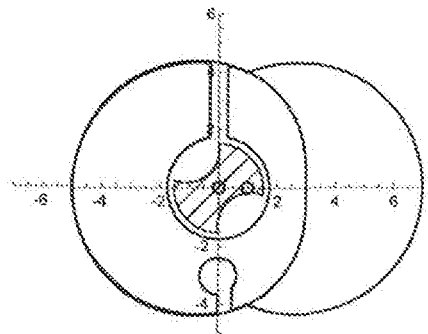
Figure 41F:
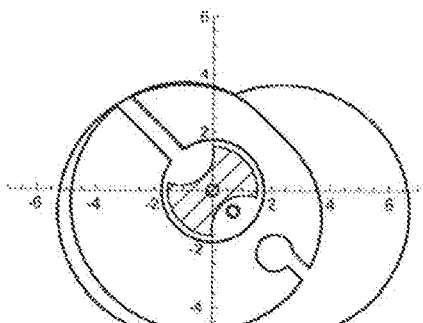
Figure 41G:
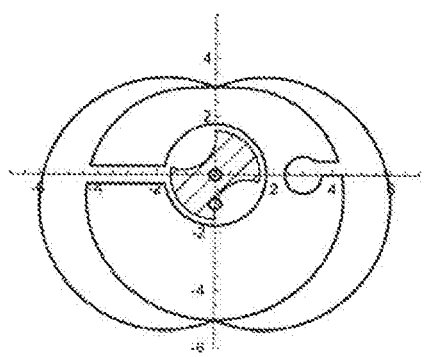
Figure 41H:
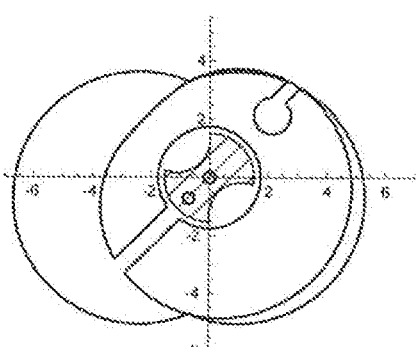
Figures 42A, 42B:
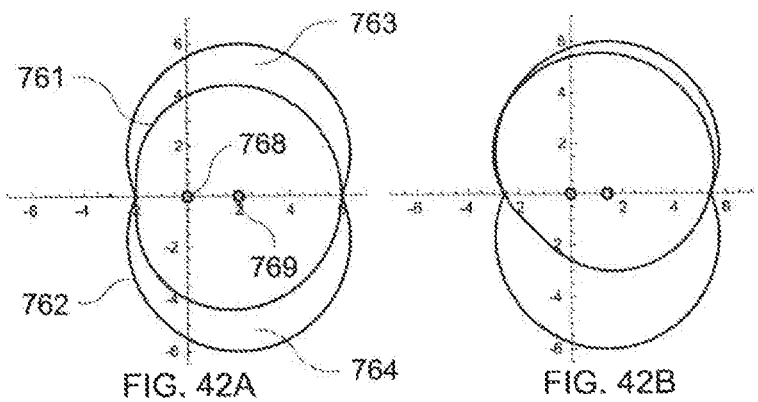
FIGS. 42A-H show stages of a single-loop limaçon piston rotating counterclockwise around a fixed axis inside a horizontally oscillating cylinder.
Figures 42C, 42D:
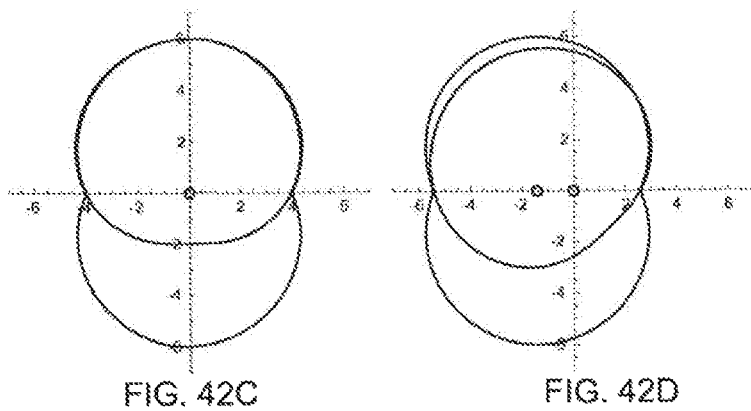
Figures 42E, 42F:
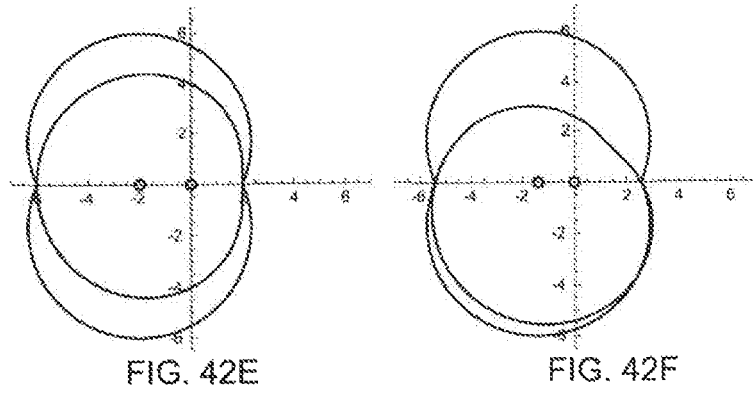
Figures 42G, 42H:
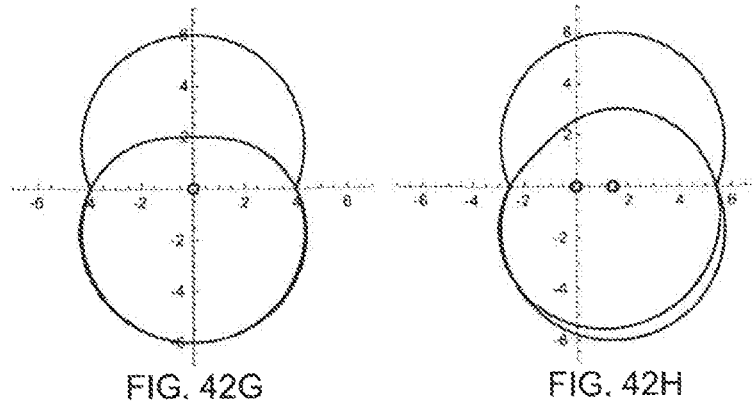
Figures 43A, 43B:
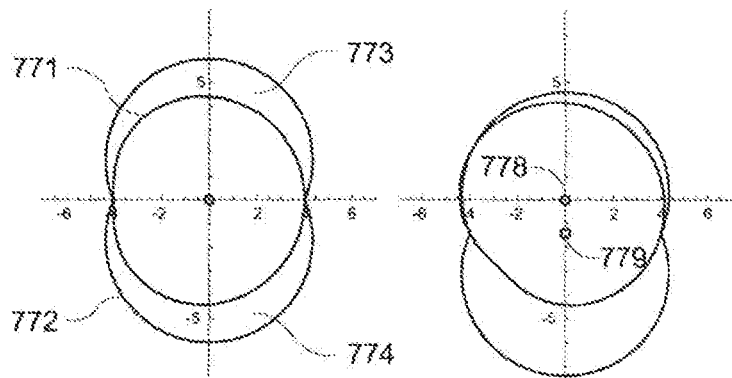
FIGS. 43A-H show stages of a single-loop limaçon piston rotating counterclockwise around a fixed axis inside a vertically oscillating cylinder.
Figures 43C, 43D:
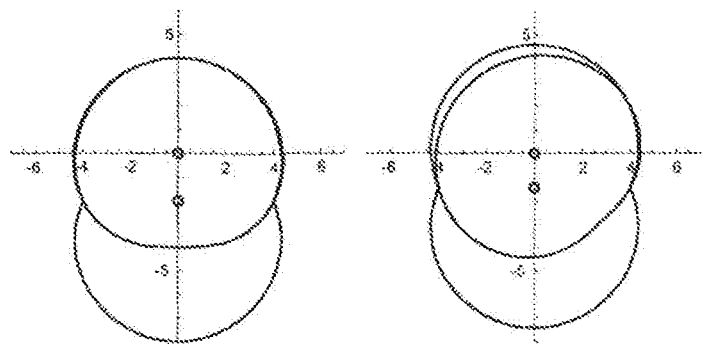
Figures 43E, 43F:
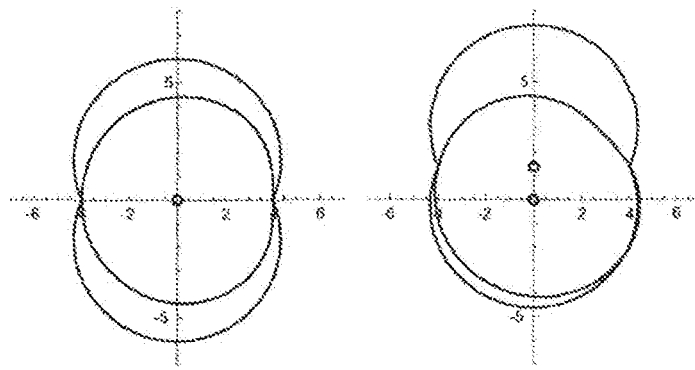
Figures 43G, 43H:
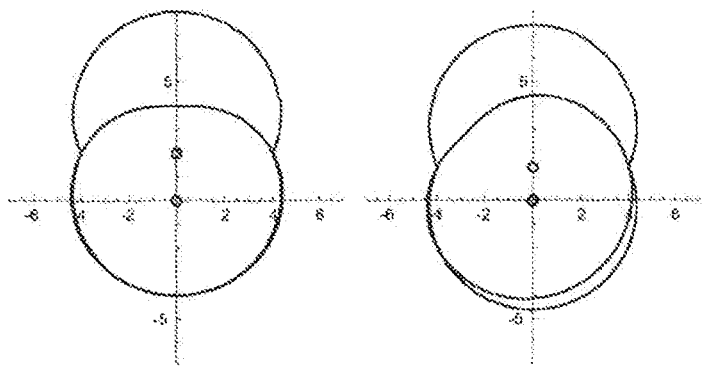
Figures 47A, 47B:
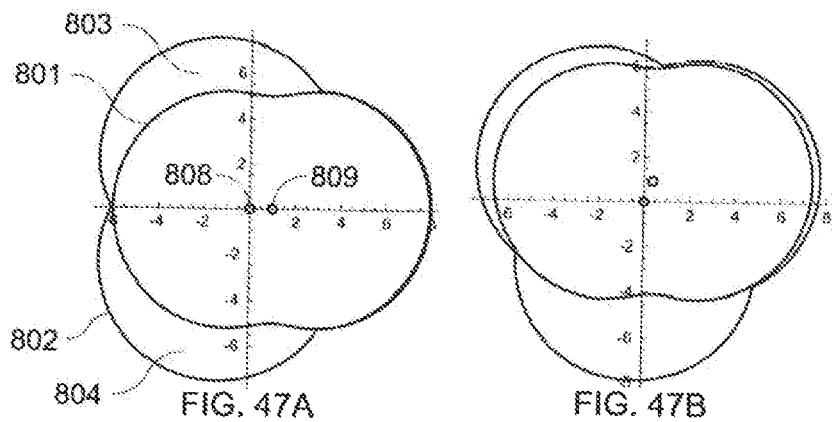
FIGS. 47A-H show stages of a non-rotating and orbiting trochoid piston inside a rotating cylinder.
Figures 47C, 47D:
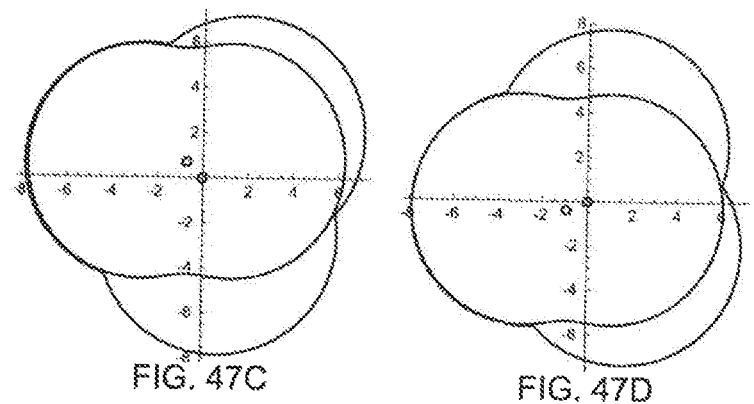
Figures 47E, 47F:
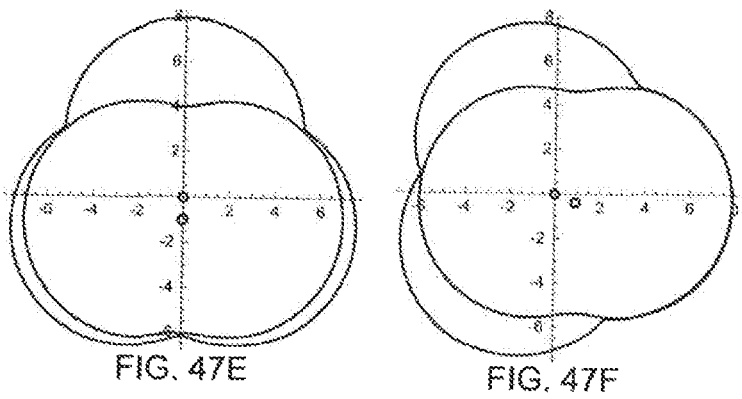
Figures 47G, 47H:
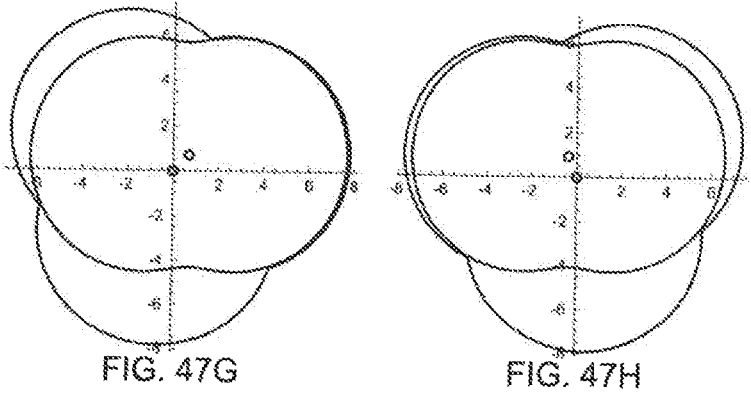
Figures 48A, 48B:
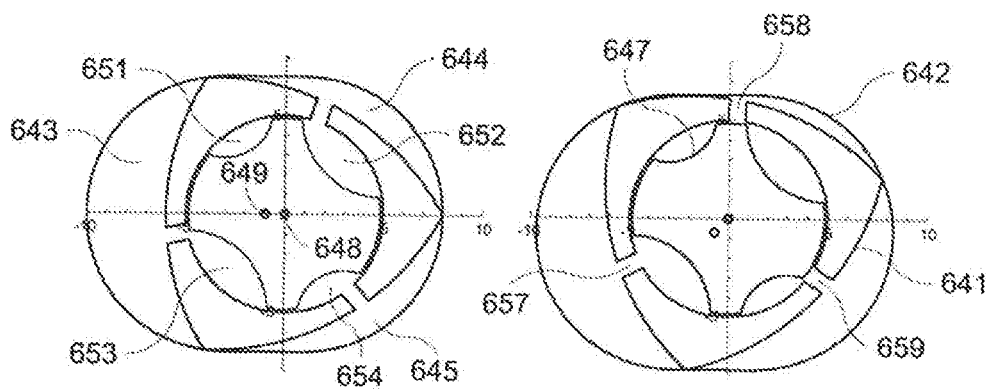
FIGS. 48A-H show stages of a triangular piston rotating counterclockwise around a fixed axis inside a non-rotating, counterclockwise-orbiting Wankel-type trochoid cylinder.
Figures 48C, 48D:
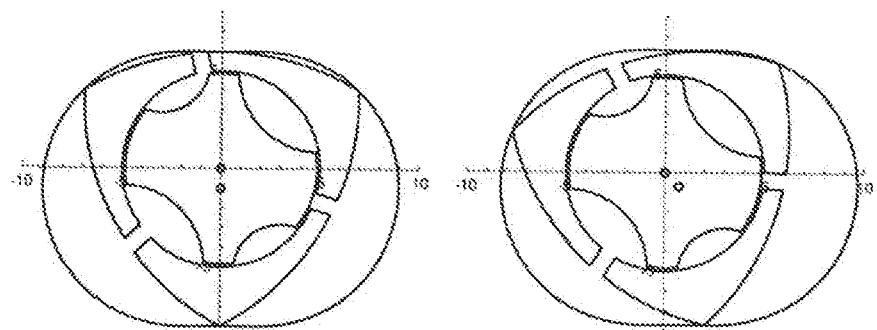
Figures 48E, 48F:
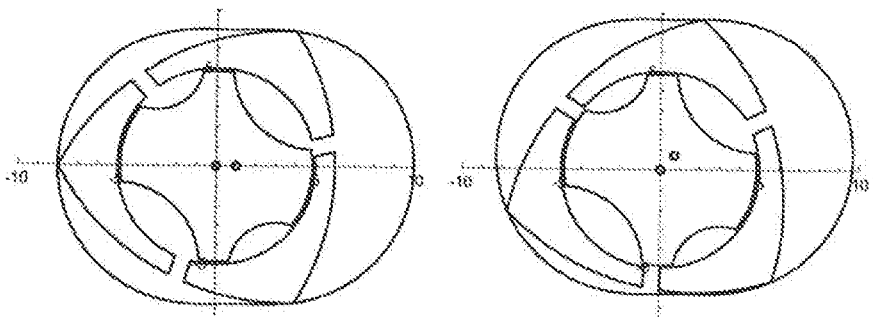
Figures 48G, 48H:
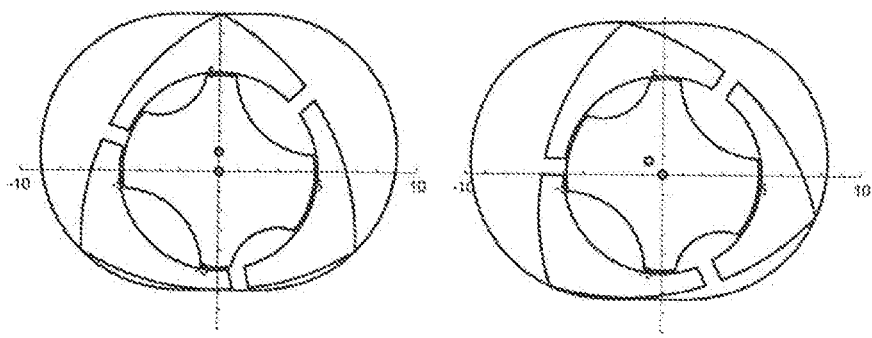
Figures 49A, 49B:
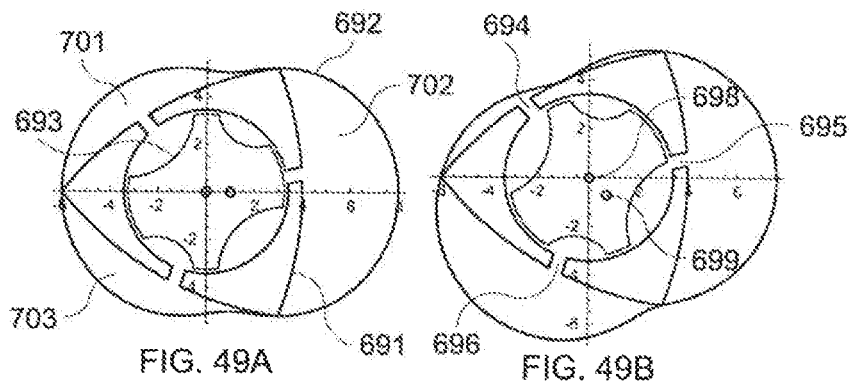
FIGS. 49A-H show stages of a fixed triangular piston inside a counterclockwise-rotating and clockwise-orbiting Wankel-type trochoid cylinder.
Figures 49C, 49D:
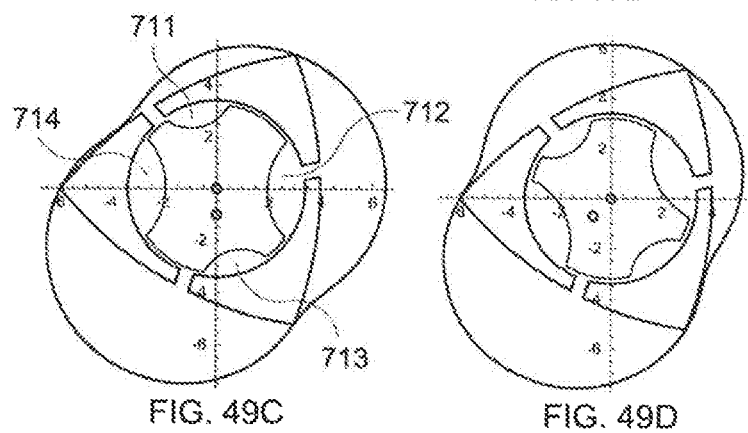
Figures 49E, 49F:
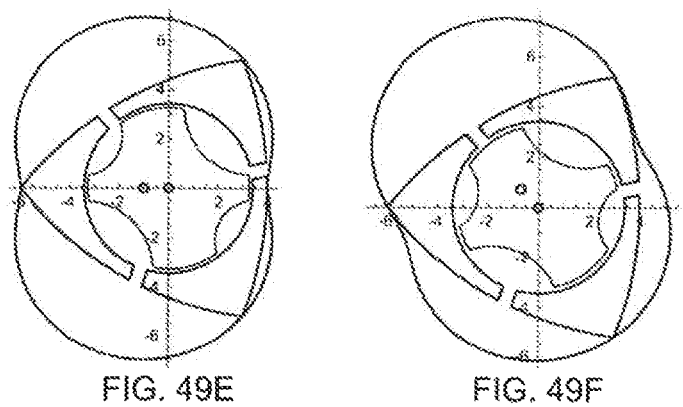
Figures 49G, 49H:
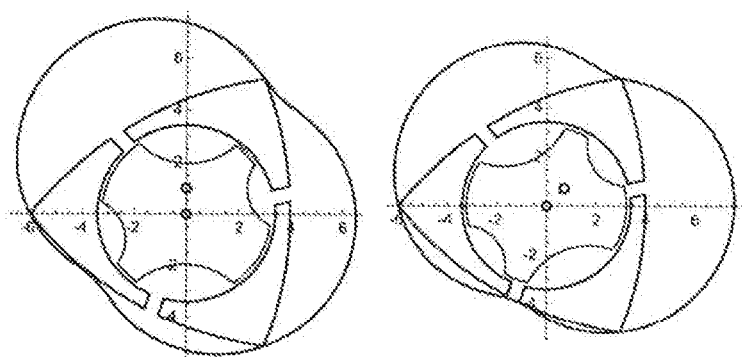
Figures 52A, 52B:
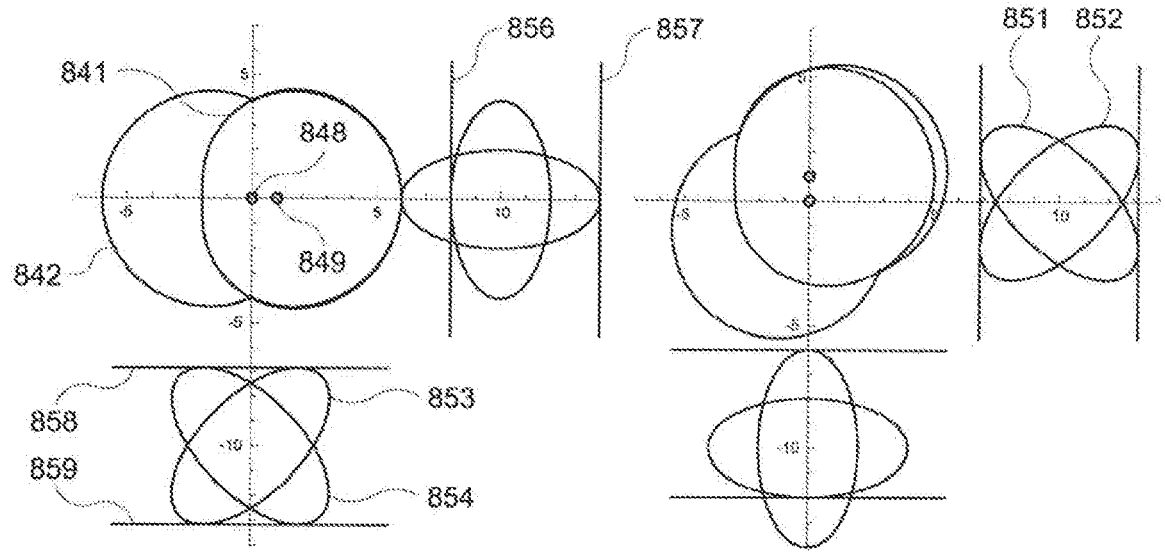
FIGS. 52A-D show stages of a cam and cam-follower device orbiting and rotating in the same direction, and orbiting with an angular speed two times the angular speed of the rotating part.
Figures 52C, 52D:
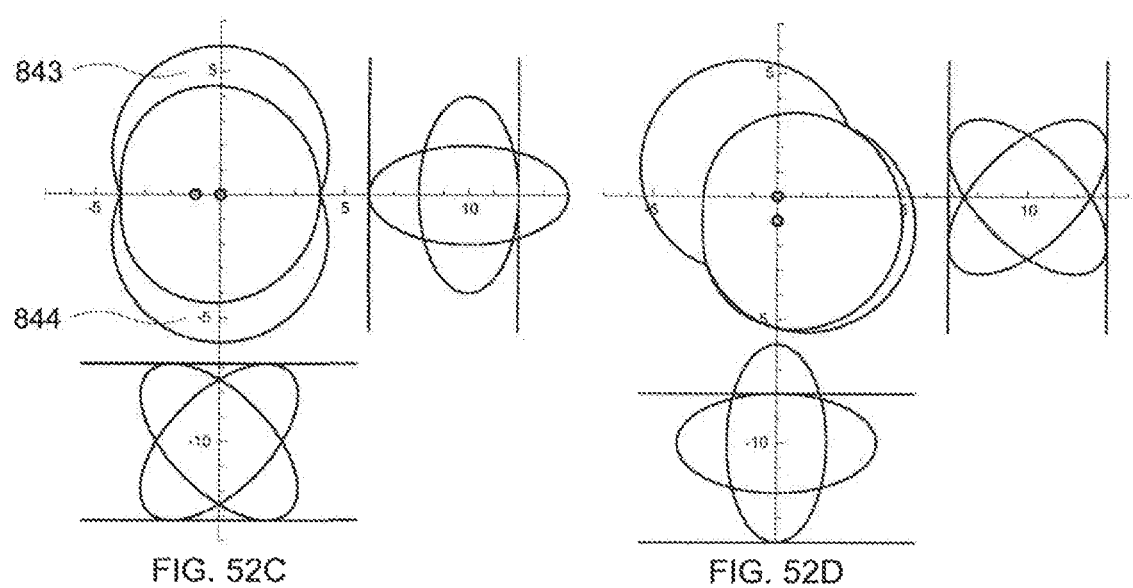
Figures 53A, 53B:
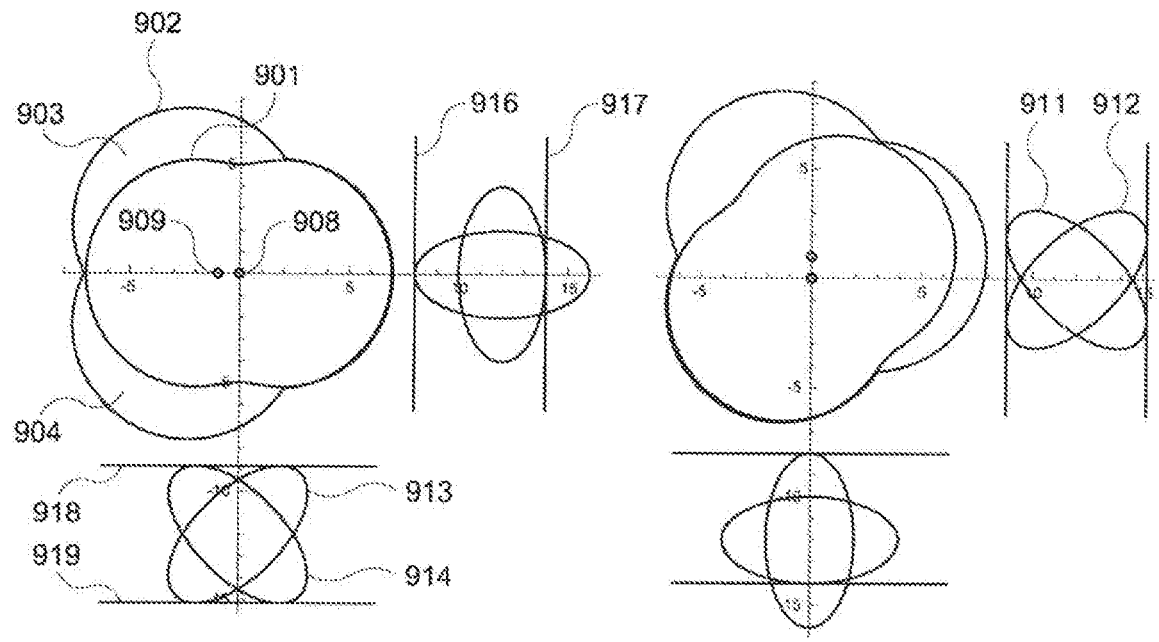
FIGS. 53A-D show stages of a cam and cam-follower device orbiting and rotating in the opposite direction and orbiting with an angular speed two times the angular speed of the rotating part.
Figures 53C, 53D:
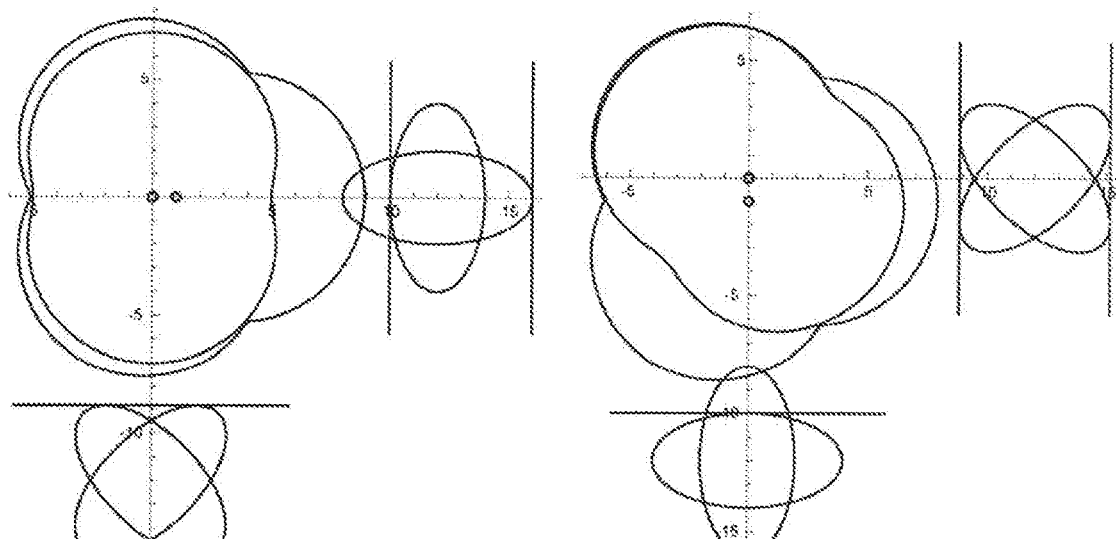
Figure 54A:
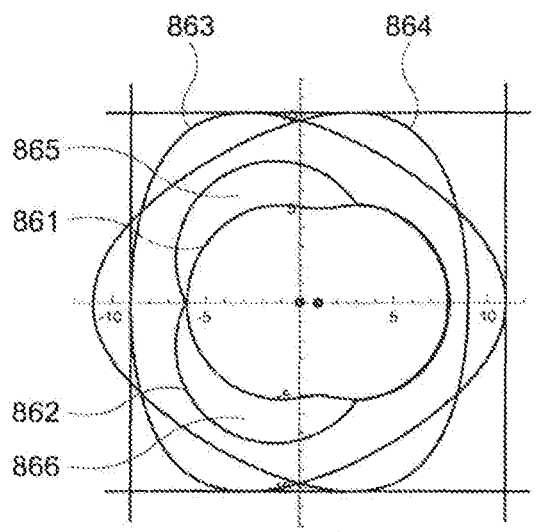
FIGS. 54A-F show stages of a cam and cam-follower device orbiting and rotating in the same direction and orbiting with an angular speed three times the angular speed of the rotating part.
Figure 54B:
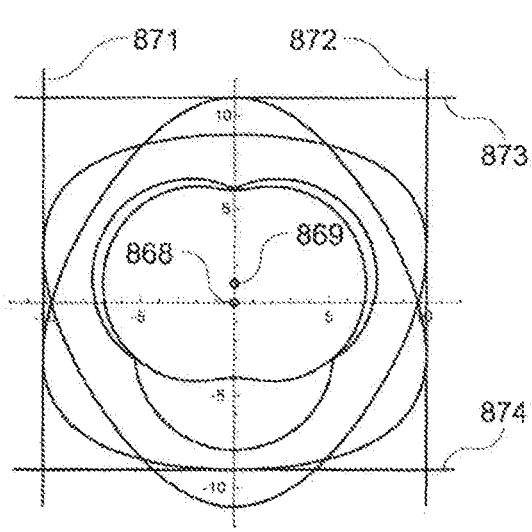
Figure 54C:
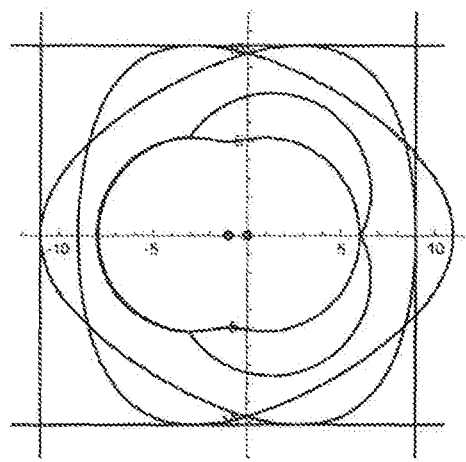
Figure 54D:
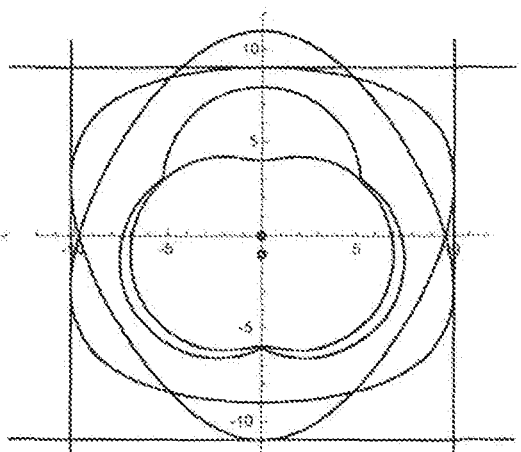
Figure 54E:
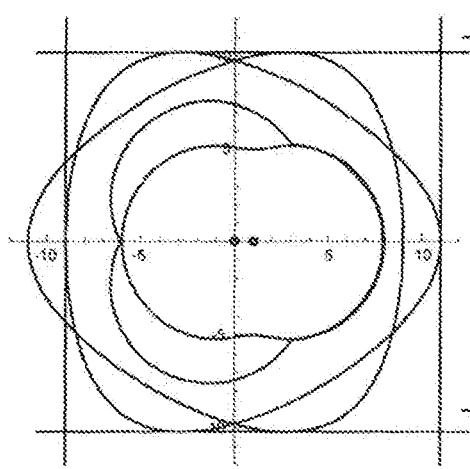
Figure 54F:
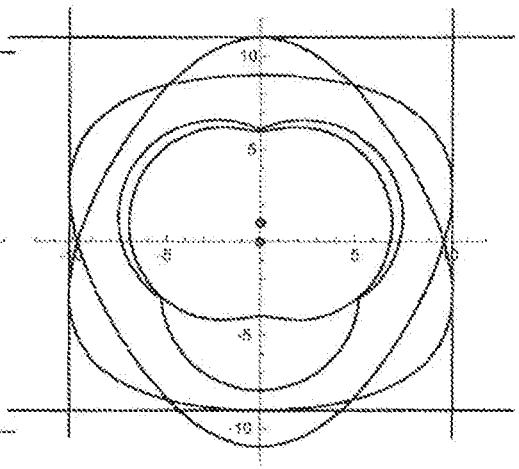

FIGS. 32A-B show an example of a 2-step limaçon pressure changing system with 3 devices in series, having the same b-value but different a-values and different lengths. FIG. 32A has an axis M-M in the drawing plan. A cylinder casing 501 encloses or defines the 3 different elliptic cylinders 521, 522 and 523 oscillating along the major axes of the elliptic cylinders. The piston 502 rotates around the axis M-M in the casing 501 and includes 3 different inner loop limaçon piston sections 503, 504 and 505, each in a unique cylinder section. The circular eccentric discs 551, 552 and 553 rotate in slots and work as gas sealings between the devices. The circular eccentric discs 551, 552 and 553 also work as cams in sliding contact with the surfaces 508 and 509 on the casing 501, controlling the oscillating movement of the cylinder casing 501 that results in the casing 501 oscillating one full cycle for every one turn of the piston 502. In expansion mode, ports 512, 514 and 516 are outlet or exhaust ports, and ports 511, 513 and 515 are inlet ports. Port or inlet 517 is connected to a high-pressure gas supply/source, and port or outlet 518 is connected to a low-pressure gas outlet or sink. FIG. 32B shows the cross-sections of the different cylinders 521, 522 and 523 and the corresponding piston sections 503, 504 and 505, and the cross-section K-K of the cam disc 553 in contact with the sliding surfaces 508 and 509.

FIGS. 33A-H show stages of the 2-step limaçon pressure changing system in FIG. 32. A cylinder casing (501 in FIGS. 32A-B) encloses or defines the 3 different elliptic cylinders 521, 522 and 523, and is oscillating along the major axes of the elliptic cylinders. The piston (502 in FIGS. 32A-B) rotates around the axis 368 (M-M in FIGS. 32A-B) in the casing (501 in FIGS. 32A-B) which includes 3 different inner loop limaçon piston sections 503, 504 and 505, each in a unique cylinder section 521, 522 and 523.

FIGS. 34A-H show an embodiment of a two-stage expander/compressor device with an orbiting and rotating ellipse. FIGS. 34A-H shows stages of an elliptic piston 573 and an elliptic cylinder 572 rotating around an axis 569. The axis 569 orbits around axis 570. The external loop limaçon cylinder 574 and inner loop limaçon piston 571 are fixed. Ports 562 and 564 are intake ports, and ports 561 and 563 are outlet ports. In the shown example, the combined elliptic piston-cylinder 572-573 is orbiting and rotating counterclockwise. The high-pressure gas flows into the space 567 from the port 562 in FIGS. 34E-H and 34A-C. The space 567 transitions in FIG. 34D from an intake space into an exhaust space. The gas space 566 is compressing as gas flows out through port 561 via the connection 575 through port 564 into the intake space 577 in an outer chamber 574 (see FIGS. 34G-H and 34A-D). The gas expands and flows into the intake space 577 in FIGS. 34G-H and 34A-C. The space 577 transitions in FIG. 34H from an intake space into an exhaust space. In FIGS. 34A-34H, the gas in space 576 flows out through the low-pressure exhaust port 563. FIGS. 34A-H show a device with a first timed port expansion, a volume to volume expansion and a second timed port expansion.

FIGS. 35A-H shows stage of a two-stage expander/compressor including an inner loop limaçon piston 481 that rotates around an axis 489 inside an elliptic cylinder 482, and an elliptic piston 483 that rotates around an axis 488 inside a rotating external loop limaçon cylinder 484. The axis 489 is common for the limaçon cylinder 484 and the limaçon piston 481. The axis 488 is common for the elliptic cylinder 482 and the elliptic piston 483.

FIGS. 36A-H show stages of a multi-stage expander/compressor including an external loop limaçon cylinder 834, an inner loop limaçon piston 831 that rotates around a common axis 838, an elliptic cylinder 832, and an elliptic piston 833 with a common center 839 that oscillates horizontally.

FIGS. 37A-H show an embodiment of a two-stage expander/compressor device that is similar to that shown in FIGS. 38A-H, but with elliptic cylinders and limaçon pistons rotating around respective fixed axes, instead of fixed elliptic cylinders as shown in FIGS. 38A-H. FIGS. 37A-H shows stages of two inner loop limaçon pistons 621 and 631, each rotating counterclockwise around a first fixed axis 628, inside two elliptic cylinders 622 and 632. The elliptic cylinders 622 and 632 rotate around a second fixed axis 629, with a 90° phase difference between the elliptic cylinders 622 and 632.

FIGS. 38A-H show stages of two inner loop limaçon pistons 581 and 591 rotating counterclockwise around an orbiting axis 589 inside two fixed elliptic cylinders 582 and 592 having a 90° phase difference between them. This arrangement is useful for a Stirling engine or a Stirling heat pump. In most Stirling engines and heat pumps, there is a phase difference of about 90° between the expansion space and the compression space. In both the heat engine and the heat pump, heat is supplied to the gas in the expansion space and extracted from the gas in the compression space. The compression space is warmer than the expansion space in the heat pump, and vice versa in the heat engine. Spaces 593 and 594 are compression spaces, and spaces 583 and 584 are expansion spaces. The shown example is useful for a solar driven air conditioning system. Heat exchange path 600 includes a heat exchanging system comprising a first heat exchanger 604 (that supplies heat to the heat engine), an intermediary regenerator 603, and a second heat exchanger 602 (that rejects heat to the environment from the heat engine). Heat exchange path 610 is a heat exchanging system comprising a first heat exchanger 612 (that supplies heat to the heat pump from, e.g., a cold room or other relatively low-temperature environment), an intermediary regenerator 613, and a second heat exchanger 614 (that rejects heat to the environment from the heat pump).

FIGS. 39A-H show stages of a piston 661 rotating counterclockwise around a fixed axis 668 inside an orbiting non-rotating single-loop limaçon cylinder 662. The center 669 of the cylinder 662 orbits counterclockwise around the fixed axis 668. Space 665 is an intake space, space 664 is an outlet space, and space 663 is a transition space (e.g., that transitions from an expansion space to an outlet space).

FIGS. 40A-H show stages of a non-rotating, orbiting single-loop limaçon piston 741 inside a cylinder 742 rotating counterclockwise around a fixed axis 748. The center 749 of the piston 741 orbits counterclockwise around the axis 748. The cylinder 742 has an internal surface with a cross-section that is the external part of a 3-loop hypotrochoid (the internal part is the triangular shape of the Wankel piston) that approximates parts of two circles or ovals. In expansion mode, the space 744 is an expansion space, and the space 743 is an exhaust space.

FIGS. 41A-H show stages of an expander that includes a single-loop limaçon piston 751 rotating counterclockwise around a fixed axis 759 inside an orbiting non-rotating cylinder 752. The cylinder 752 has a center 758 that orbits clockwise around the axis 759. The cylinder 752 has an internal surface with a cross-section that is approximately parts of two circles or ovals. A cylinder 814 within the piston 751 includes a timing valve 813, a high-pressure port 812, and a low-pressure port 811. The timing valve 813 is fixed and does not rotate. The timing valve 813 includes two high-pressure channels 755 and 756. In expansion mode (counterclockwise rotation of the piston 751 and clockwise orbit of the cylinder 752), the high-pressure port 812 works as an intake port, and the low-pressure port 811 works as an exhaust port. The low-pressure port 811 is connected to a low-pressure channel 757 in the piston 751. The timing valve 813 works similar to the timed valve in FIG. 12.

FIGS. 42A-H show stages of a single-loop limaçon piston 761 rotating counterclockwise around a fixed axis 768 inside an oscillating cylinder 762. The cylinder 762 has a center 769 that oscillates along its minor axis and has an internal surface with a cross-section that is approximately parts of two circles or ovals. In expansion mode, the space 764 is an expansion space, and 763 is an exhaust space.

FIGS. 43A-H show stages of a single-loop limaçon piston 771 rotating counterclockwise around a fixed axis 778 inside an oscillating cylinder 772. The cylinder 772 has a center 779 that oscillates along its major axis and has an internal surface with a cross-section that is approximately parts of two circles or ovals. In expansion mode, the space 774 is an expansion space, and 773 is an exhaust space.

FIGS. 44A-H show stages of a fixed single-loop limaçon piston 821 inside a cylinder 822 that rotates counterclockwise around an axis 829. The axis 829 orbits counterclockwise around a fixed axis 828. The cylinder 822 has an internal surface with a cross-section that is approximately parts of two circles or ovals. In the shown example, the port 825 is an intake port, and the port 826 is an exhaust port. The space 824 receives gas, and the space 823 exhausts gas. In compression mode, a check valve is connected to port 826. In a volume-to-volume pressure changing system, multiple devices having the design shown in FIG. 44, but of different sizes, may be connected in series.

FIGS. 45A-H show stages of a fixed trochoid piston 781 inside a cylinder 782 that rotates counterclockwise around an axis 789. The axis 789 orbits counterclockwise around a fixed axis 788. The cylinder 782 has an internal surface with a cross-section that is approximately parts of three circles or ovals. Channel 776 is a high-pressure channel, and channel 786 is a low-pressure channel. Ports 775 and 777 are high-pressure ports, and ports 785 and 787 are low-pressure ports. Valves 766 and 767 are leaf check valves. This check valve configuration may be used with other movements (e.g., piston-cylinder pairs), such as those exemplified in FIGS. 46A and 47H.

FIGS. 46A-H show stages of an epitrochoid piston 791 rotating counterclockwise around a fixed axis 798 inside a non-rotating orbiting cylinder 792. The cylinder 792 has a center 799 that orbits clockwise around the fixed axis 798. The cylinder 792 has an internal surface with a cross-section that is approximately parts of three circles or ovals. A cylinder 796 within the piston 791 includes a timing valve 797, two high-pressure ports 816 and 817, two low-pressure ports 818 and 819, and two low-pressure channels 704 and 705. The timing valve 797 is fixed, and does not rotate. In expansion mode (counterclockwise rotation of the piston 791 and clockwise orbit of the cylinder 792), the high-pressure ports 816 and 817 work as intake ports, and the low-pressure ports 818 and 819 work as exhaust ports. The timing valve 797 works similarly to the timing valve in FIGS. 12A-L and 41A-H. The space 793 is an intake space in FIGS. 46G-H, an expansion space in FIG. 46A, and an exhaust space in FIGS. 46B-F. The space 794 is an intake space in FIGS. 46D-E, an expansion space in FIG. 46F, and an exhaust space in FIGS. 46G-H and 46A-C. The space 795 is an intake space in FIGS. 46B-C, an expansion space in FIG. 46D, and an exhaust space in FIGS. 46E-H. Other port configurations for the device shown in FIGS. 46A-H may be as described elsewhere herein (see, e.g., paragraph [0103]). This timed port configuration may be used with other movements (e.g., piston-cylinder pairs), such as those exemplified in FIGS. 45A-H and 47A-H.

FIGS. 47A-H show stages of a non-rotating trochoid piston 801 having a center 809 that orbits counterclockwise around a fixed axis 808 inside a cylinder 802 that rotates counterclockwise around the fixed axis 808. The cylinder 802 has an internal surface with a cross-section that is approximately parts of three circles or ovals.

FIGS. 48A-H show stages of a triangular piston 641 rotating counterclockwise around a fixed axis 648 inside a non-rotating Wankel-type trochoid cylinder 642. The center 649 of the cylinder 642 orbits counterclockwise around the axis 648. Inside the piston 641 is a fixed timing valve 647 with two high-pressure inlet channels 651 and 654 and two low-pressure outlet channels 652 and 653. Three ports 657, 658 and 659 in the piston 641 are alternating inlet and outlet ports. In the shown example, the space 645 is an intake (expansion) space, the space 644 is an outlet space, and the space 643 is a space in transition from an expansion space to an outlet space. When the port 657, 658 or 659 is in an expansion space, it is an inlet port, and when the port 657, 658 or 659 is in an outlet space, it is an outlet port. The angular velocity of the orbiting center 649 is 3 times the angular velocity of the piston 641. The fixed axis 648 of the piston 641 and the orbital movement of the cylinder 642 makes it suitable to stack this device with other limaçon devices (which may have the same or a different arrangement and/or design of the piston and cylinder). One side of the device in FIGS. 48A-H can be a compressor, and simultaneously, another side can be an expander, similar to the Brayton device in FIGS. 20A-B. The phase difference in the device in FIGS. 48A-H is 120°, which can be used in Stirling devices.

FIGS. 49A-H show stages of a fixed triangular piston 691 inside a counterclockwise-rotating dual-loop trochoid cylinder 692. The center or axis of rotation 699 of the cylinder 692 orbits clockwise around the axis 698. The angular speed of the orbiting center 699 is 2 times the angular speed of the cylinder 692, and the cylinder 692 orbits in an opposite direction from its rotation.

FIGS. 50A-H show stages of a non-rotating, orbiting triangular piston 711 having a center or axis 719 inside a trochoid cylinder 712 that rotates counterclockwise around a fixed axis 718. The angular speed of the clockwise-orbiting center or axis 719 is 2 times the angular speed of the cylinder 712, and the cylinder 712 orbits in an opposite direction from its rotation. In expansion mode, the space 723 is an intake space, and 721 is an exhaust space.

FIGS. 51A-H show rotational stages of a transmission for a compressor/expander including a non-rotating orbiting part (e.g., cylinder or piston) and a rotating part (i.e., the other of the cylinder or piston), orbiting and rotating in opposite directions. The orbiting part orbits with the same angular speed as the angular rotational speed of the rotating part, but the orbiting part orbits in an opposite direction from the rotation of the rotating part. The example shown in FIGS. 51A-H includes the device in FIGS. 41A-H, wherein the rotating part is the piston 881, and the orbiting part is the cylinder 882. Two Scotch yokes control the orbital movement of the cylinder 882. The slot part 891 of one of the Scotch yokes is fixed to the cylinder 882 and controls the vertical movement of the cylinder 882, and the slot 892 of the other of the Scotch yokes is fixed to the cylinder 882 and controls the horizontal movement of the cylinder 882. Inside the slots 891 and 892 are excenter parts of the Scotch yoke shafts or cams 894 and 893, respectively, having a 180° phase difference with respect to the piston 881. The devices in FIGS. 18A-L, 19A-L, 20A-B and 41A-H can use the transmission shown in FIGS. 51A-H with the cylinder as the orbiting part. The devices in FIGS. 21A-L and 22A-L can use the transmission shown in FIGS. 51A-H with the piston as the orbiting part.

FIGS. 52A-D show rotational stages of a transmission for a compressor/expander including a non-rotating orbiting part (e.g., cylinder or piston) and a rotating part (i.e., the other of the cylinder or piston), orbiting and rotating in the same direction. The orbiting part orbits with an angular speed two times the angular speed of the rotating part. The example shown in FIGS. 52A-D includes the device in FIGS. 40A-H, wherein the rotating part is the cylinder 842, and the non-rotating orbiting part is the piston 841. Cams 851 and 852 and cam-followers 856 and 857 control the horizontal movement of the orbiting piston 841. Cams 853 and 854 and cam-followers 858 and 859 control the vertical movement of the orbiting piston 841. For clarity, the cams are drawn 10 units displaced from the central cylinder axis 848, but in practice, the center of each of the cams may be aligned with the center 849 of the piston 841. The devices in FIGS. 17A-H and 39A-H can use this transmission with the cylinder as the orbiting part. The devices in FIGS. 16A-H and 40A-H can use this transmission with the piston as the orbiting part.

FIGS. 53A-D show stages of a transmission similar to the transmission in FIGS. 52A-D. In FIGS. 52A-D, the phase of the horizontal movement cams is 90° after the vertical cams, and in FIGS. 53A-D, the phase of the horizontal movement cams is 90° before the vertical movement cams. The transmission has a non-rotating orbiting part and a rotating part, orbiting and rotating in the opposite direction. The orbiting part orbits with an angular speed two times the angular speed of the rotating part. The example shown in FIGS. 53A-D includes the device in FIGS. 46A-H, wherein the rotating part is the piston 901, and the non-rotating orbiting part is the cylinder 902. Cams 911 and 912 and cam-followers 916 and 917 control the horizontal movement of the rotating piston 901. Cams 913 and 914 and cam-followers 918 and 919 control the vertical movement of the orbiting piston 901. For clarity, the cams are drawn 12 units displaced from the axis 909, but in practice, the center of the cams may be aligned with the center 908 of the piston 901. The device in FIGS. 46A-H can use this transmission with the cylinder 792 as the orbiting part. The device in FIGS. 50A-H can use this transmission with the piston 711 as the orbiting part.

FIGS. 54A-F show stages of a device with a non-rotating, orbiting part and a rotating part, orbiting and rotating in the same direction. The orbiting part orbits with an angular speed three times the angular speed of the rotating part. The example shown in FIGS. 54A-F includes the device in FIGS. 47A-H, wherein the rotating part is the cylinder 862, and the orbiting part is the piston 861. The cam 864 working with the cam-followers 873 and 874 control the vertical movement of the orbiting piston 861. The cam 863 and the cam-followers 871 and 872 control the horizontal movement of the orbiting piston 861. The device in FIGS. 48A-H can use this transmission with the cylinder 642 as the orbiting part. The device in FIGS. 47A-H can use this transmission with the piston 801 as the orbiting part.

Figure 55:
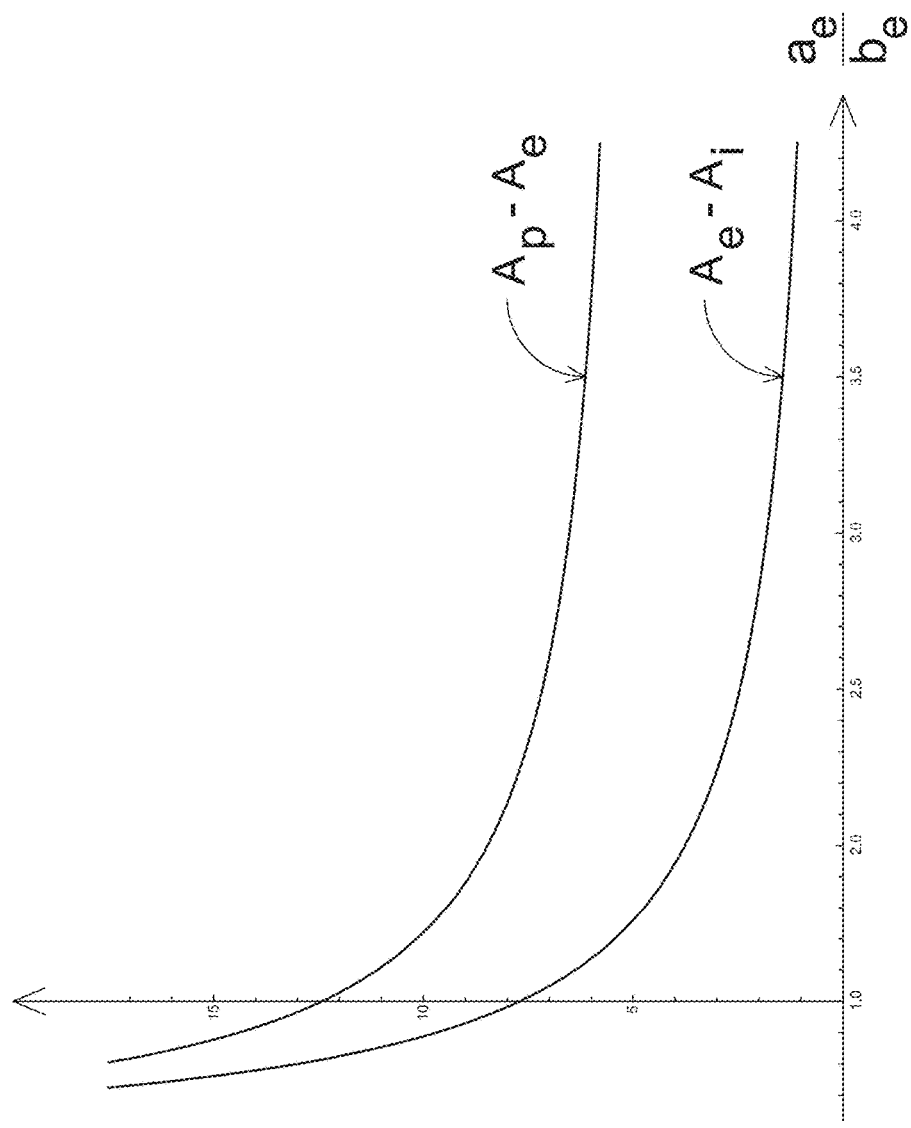
FIG. 55 is a diagram showing the relation between the limaçon cross-section and the form of the ellipse.
Figure 56:
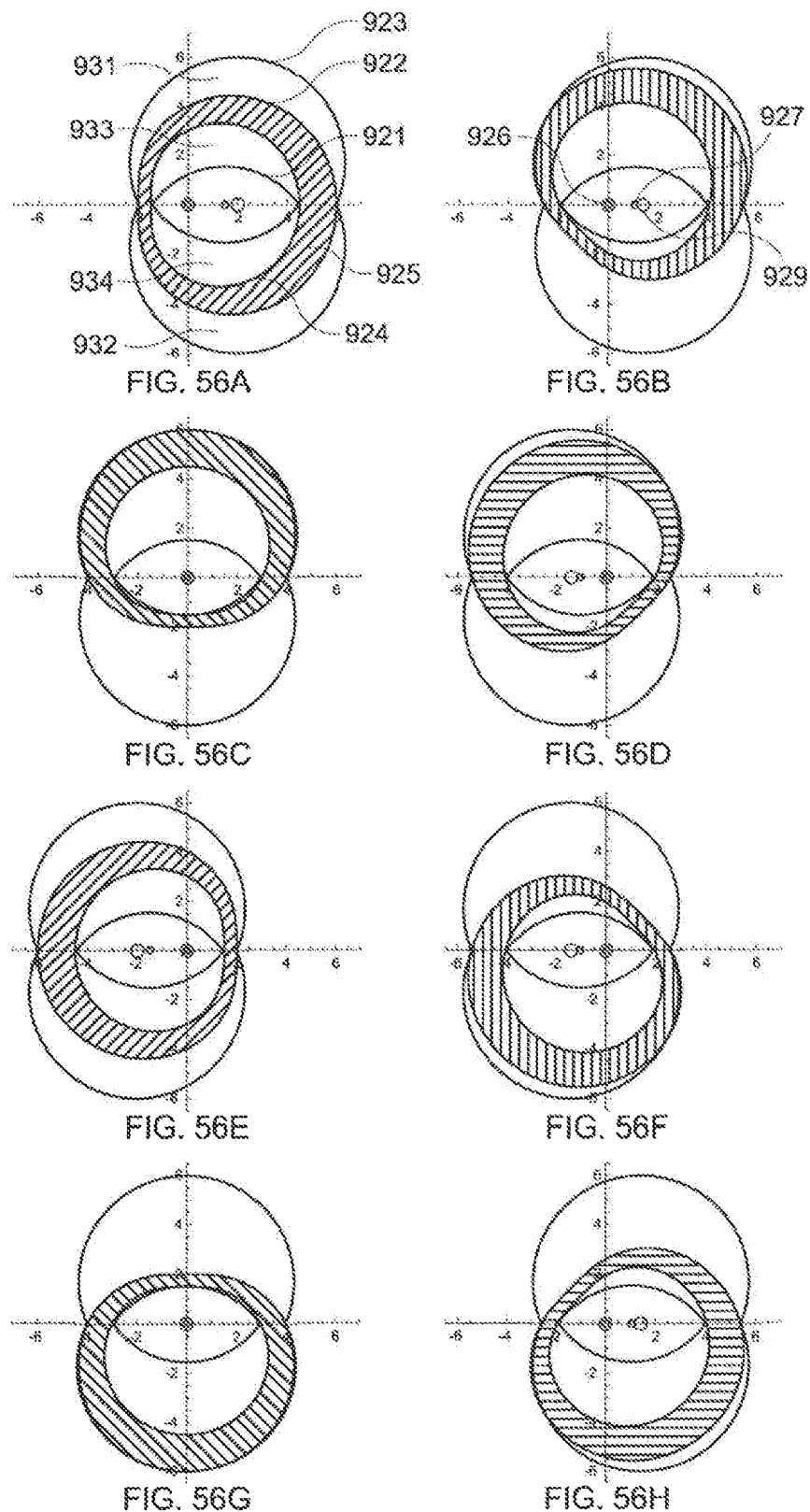
FIGS. 56A-H show examples of different types of epitrochoid piston-cylinder pairs in combination along the same axis.

FIG. 55 shows the relation between the limaçon cross-sectional area and the form of the ellipse. FIG. 55 is a graph showing the area of the cross-section of a limaçon pressure changing device as a function of the roundness of the ellipse. The X-axis is the ratio of the length of the major axis ae to the length of the minor axis be of the ellipse. The Y-axis is the difference between the areas of the limaçon and the ellipse, with b (see the equation in paragraph [0003]) normalized to or equal to 1. Ae is the area of the ellipse. Ap is the area of the external loop of the limaçon de Pascal. Ai is the area of the internal loop of the limaçon de Pascal. Having the same b-value means that two common axes or two common shafts can be used for a multi-step expansion. The Ae-Ai curb is the cross-section area of the internal loop of the pressure changing device. The Ap-Ae curb is the cross-section area of the external loop of the pressure changing device.

FIGS. 56A-H show exemplary stages of two different types of epitrochoid devices, with one part of each device oscillating and another part of each device fixed to a common axis. The rotating part in the example of FIGS. 56A-H is the combined piston and cylinder 925 wherein the external surface 922 and the internal surface 924 of the combined piston-cylinder 925 form a cross-section of a single loop limaçon. The external cylinder 923 has a center of oscillation 929 and the internal piston 921 has a center of oscillation 927. The rotating piston-cylinder 925 rotates around an axis 926.

Figure 57:
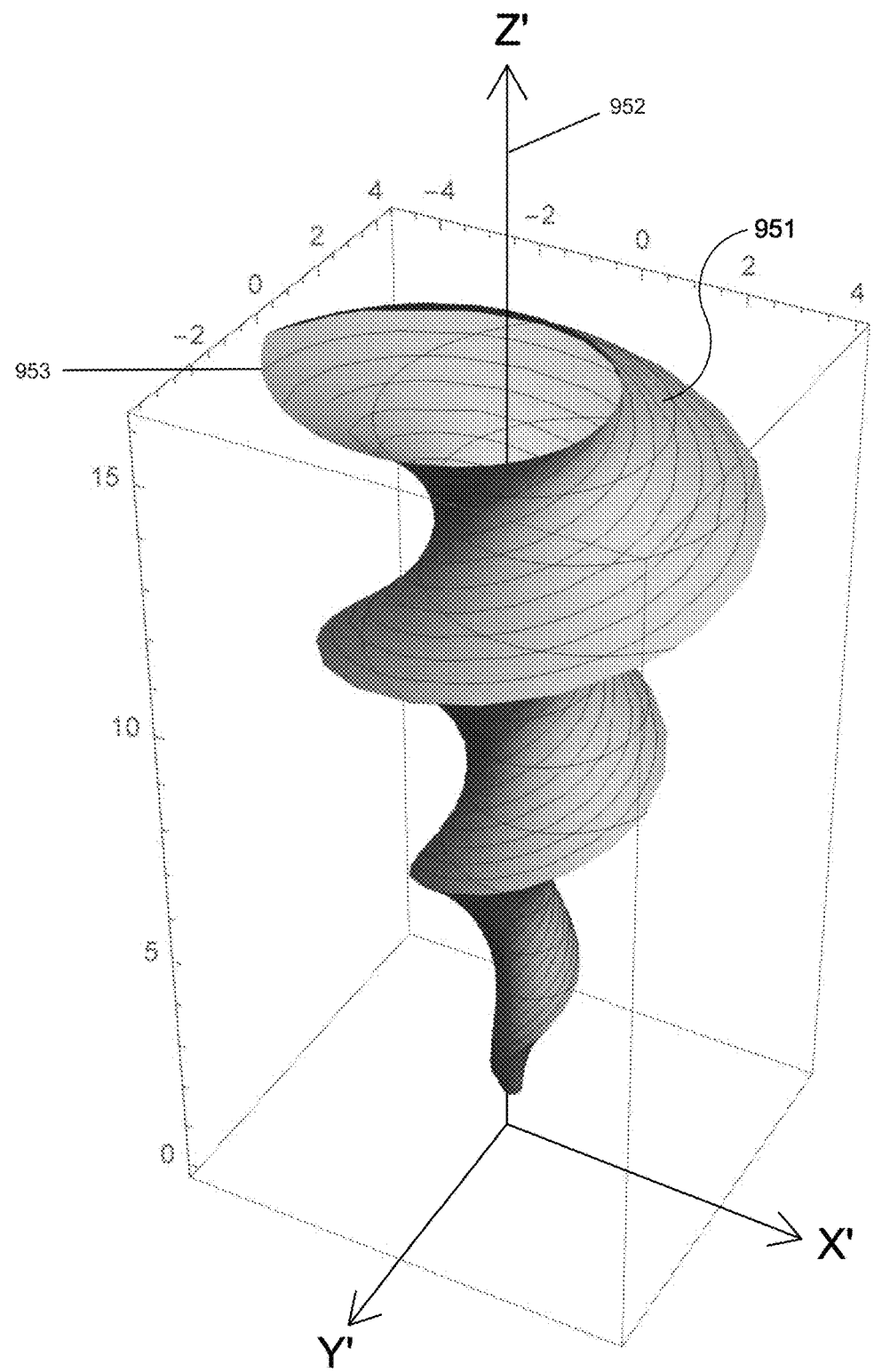
FIG. 57 is a graph of the external surface of a helical piston in accordance with an embodiment of the present invention.

FIG. 57 is a three-dimensional graph of the external surface of a helical piston 951 with an axis 952. The cross-section of the piston 951 is an inner loop limaçon 953 with a center of rotation on or coincident with the axis 952 of the piston 951. The axis 952 is identical with the Z' axis in the X'Y'Z' coordinate system shown in FIG. 57.

Figure 58:
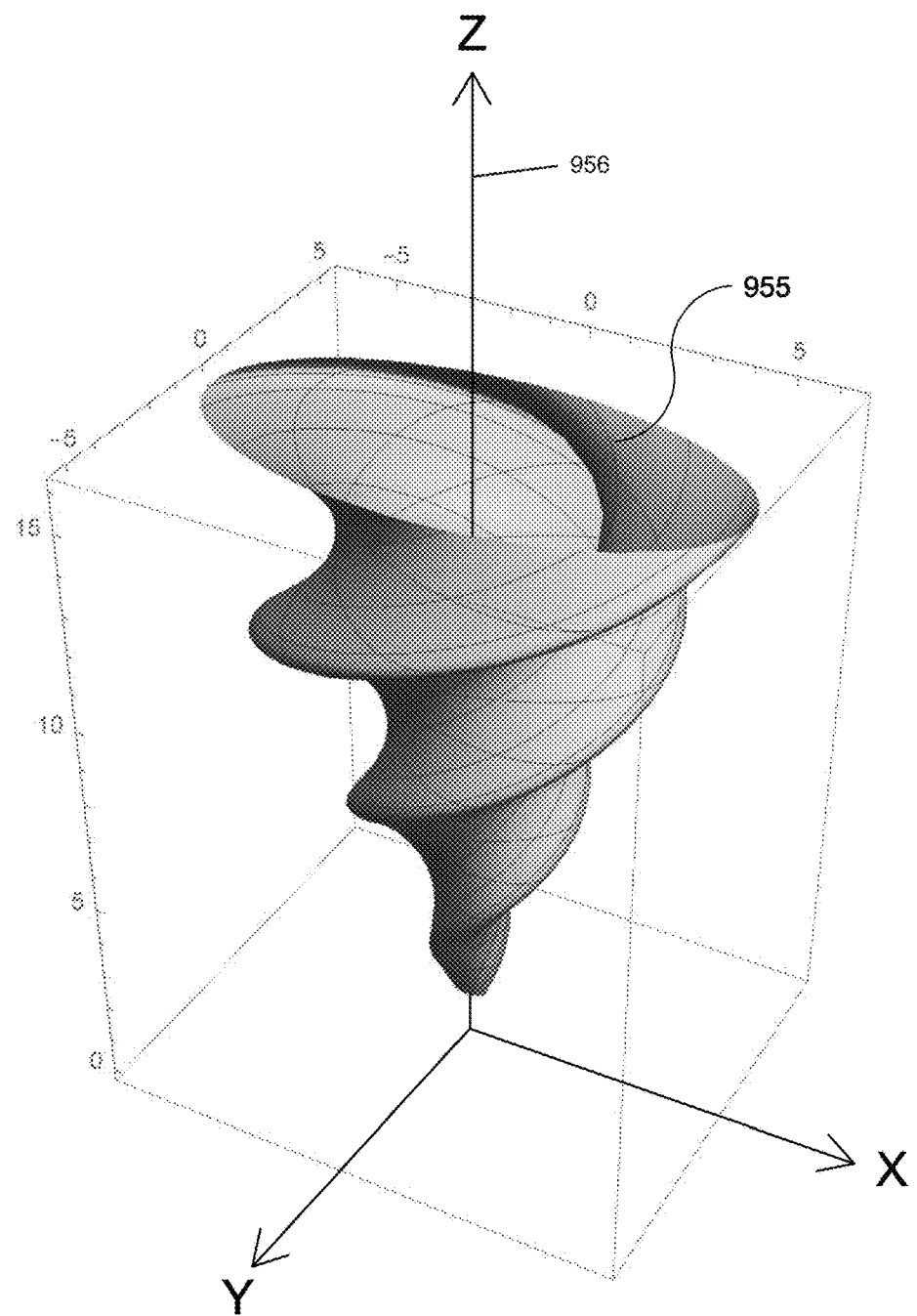
FIG. 58 is a graph of the internal surface of a helical cylinder in accordance with an embodiment of the present invention.

FIG. 58 is a three-dimensional graph of the internal surface of a helical cylinder 955 with an axis 956. The cross-section of 955 is an ellipse with a center on or coincident with the axis 956 of the cylinder 955. The axis 956 is identical with the z axis in the xyz coordinate system shown in FIG. 58.

Figure 59:
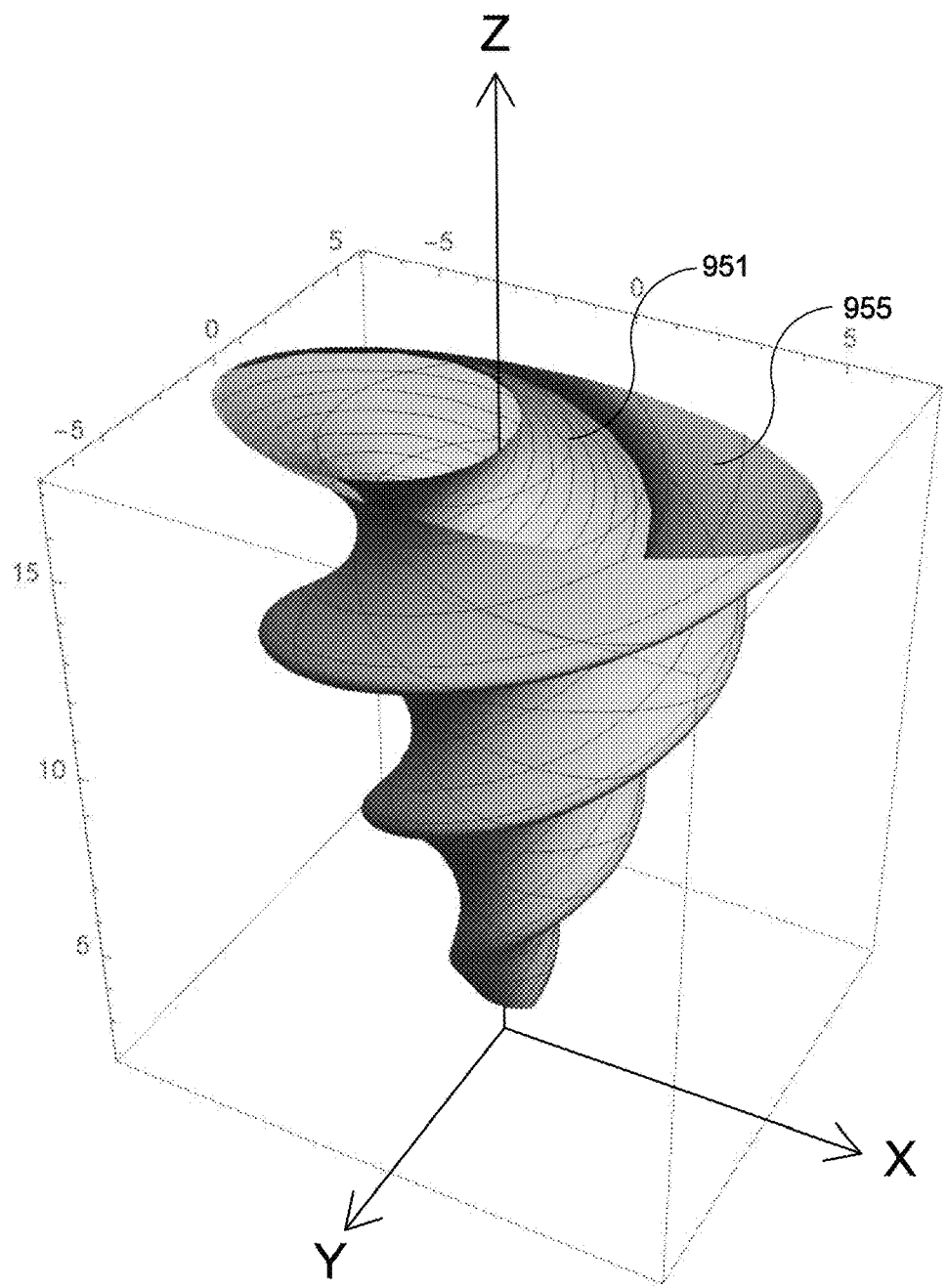
FIG. 59 is a graph of the piston of FIG. 57 in the cylinder of FIG. 58.
Figure 60A:
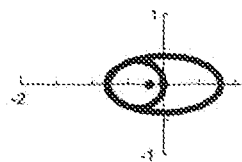
FIGS. 60A-L are cross-sections in the x-y plane of the cylinder-piston pair of FIG. 59.
Figure 60B:
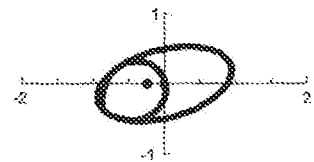
Figure 60C:
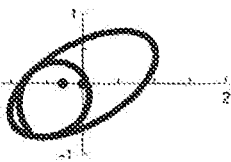
Figure 60D:
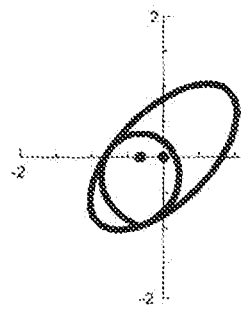
Figure 60E:
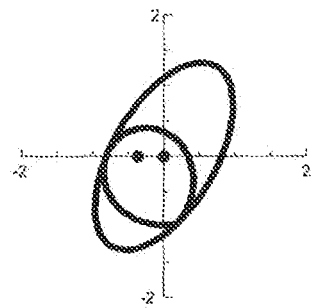
Figure 60F:
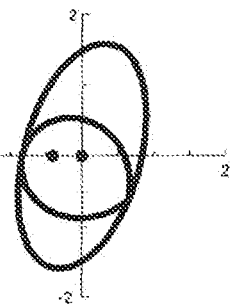
Figure 60G:
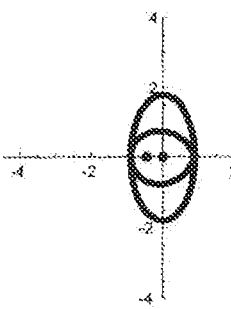
Figure 60H:
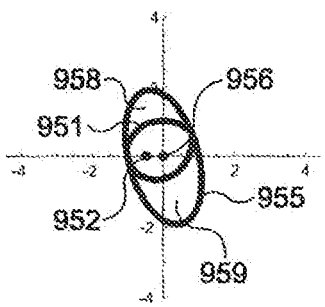
Figure 60I:
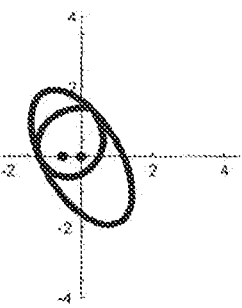
Figure 60J:
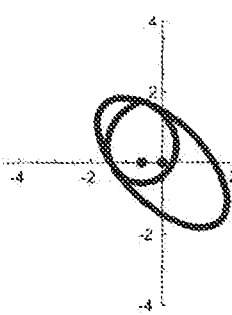
Figure 60K:
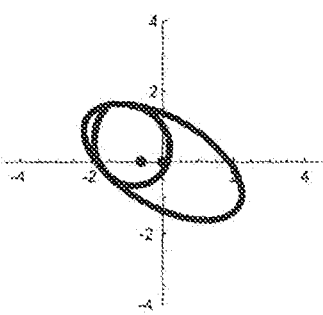
Figure 60L:
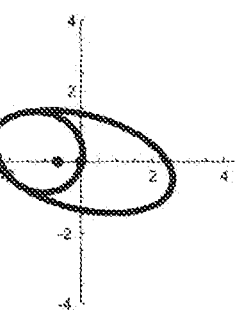
Figures 61A, 61B, 61C:
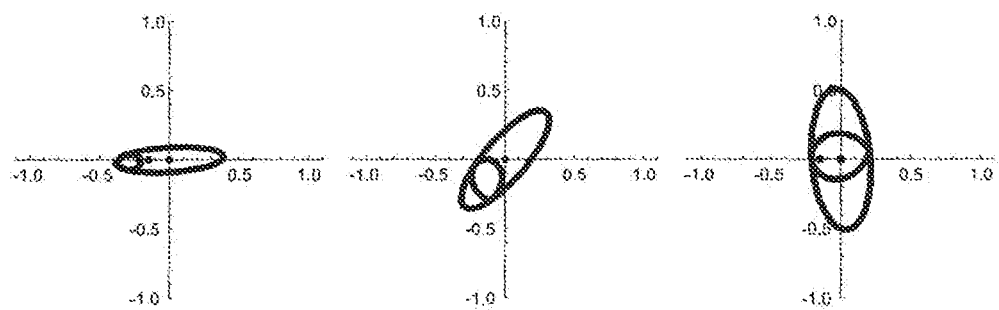
FIGS. 61A-I are cross-sections in the x-y plane of a cylinder-piston pair similar to that of FIG. 59.
Figures 61D, 61E, 61F:
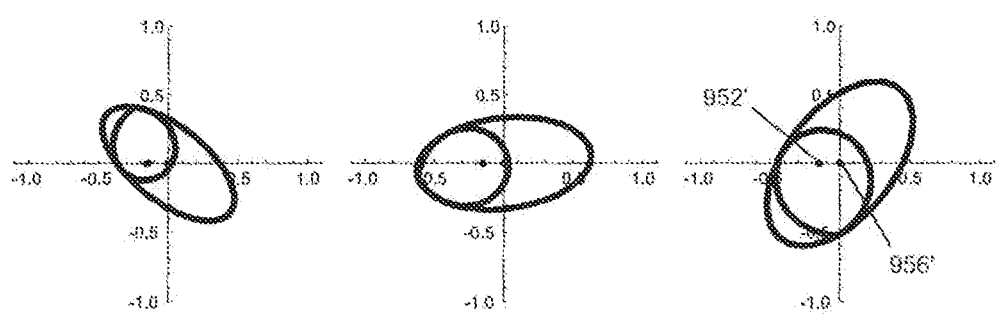
Figures 61G, 61H, 61I:
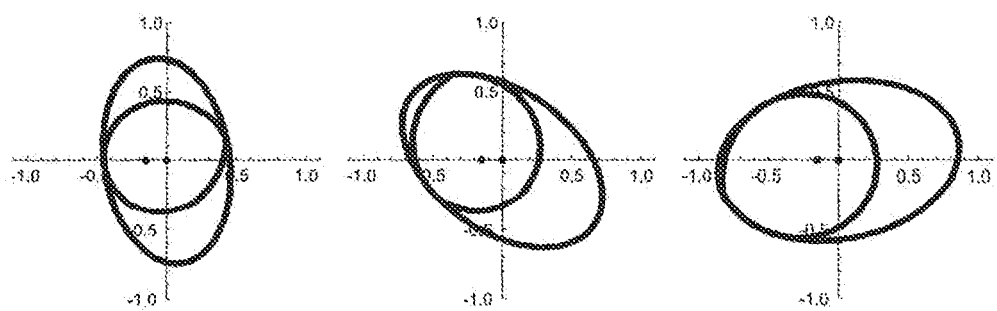

FIG. 59 is a three-dimensional graph showing the piston 951 in the cylinder 955.

FIGS. 60A-L show cross-sections in the x-y plane of the cylinder 955 and the piston 951 of FIGS. 57-59. The piston 951 rotates around the axis 952, and the axis 952 orbits around the axis 956 of the cylinder 955. The same relative motion is obtained if the piston 951 rotates around a stationary axis 952 and the cylinder 955 rotates around a stationary axis 956. In the example shown in FIGS. 57-60L, the piston 951 rotates clockwise one revolution for every revolution that the axis 952 orbits counter-clockwise. Together, the helical cylinder 955 and helical piston 951 define first and second progressing cavities 958 and 959. The eccentricity of the elliptical cross-section of the cylinder 955 is constant along the z-axis. In the example shown in FIGS. 57-60L, axis 952 and axis 956 are angled, and the cross-sectional area continuously diminishes and/or expands along the z-axis of the cylinder.

FIGS. 61A-I are cross-sections in the x-y plane of a cylinder-piston pair similar to the cylinder 955 and the piston 951 in FIGS. 57-60L, but axis 952' and axis 956' are parallel and have a b-value that is constant and an a-value that continuously changes along the z-axis of the cylinder. Accordingly, the eccentricity of the elliptical cross-section changes along the z-axis and the cavities diminish or decrease in cross-sectional area along the z-axis. A cylinder-piston pair with a constant b-value and a variable a-value is shown in FIGS. 13-15H and 55, and described with respect to FIGS. 13-15H and 55.

Figure 62:
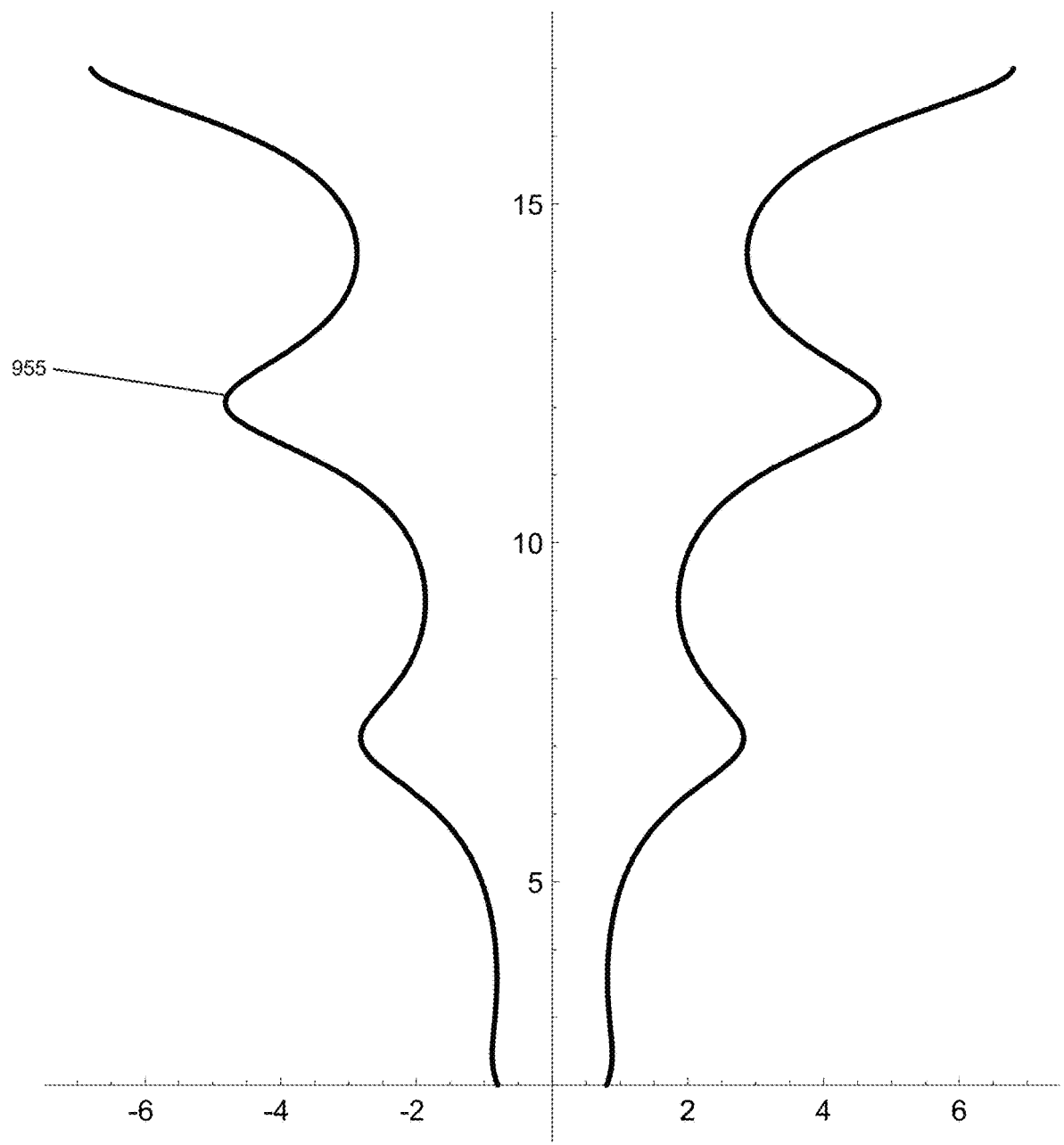
FIG. 62 is a graph showing a cross-section in the x-z plane of the inner surface of the helical cylinder of FIG. 58.

FIG. 62 shows a cross-section of the inner surface of the helical cylinder 955 of FIG. 58 in the x-z plane.

The present invention also concerns a Brayton cycle engine, comprising a helical compressor and/or a helical expander as described herein, connected in series with an intermediary combustion chamber (which may be or comprise a fuel injection combustion chamber). The Brayton engine may thus comprise a compressor, a combustion chamber and an expander in series. For example, the present Brayton engine may comprise the present helical compressor, an intermediary fuel injection combustion chamber, and an expander, connected in series (i.e., the combustion chamber receives compressed air from the helical compressor, and the expander receives hot combustion gases [e.g., air and exhaust] from the combustion chamber). Alternatively, the present Brayton engine may comprise a compressor, an intermediary fuel injection combustion chamber, and the present helical expander, connected in series.

In all applications shown, the cam surface can be the inside of a cylinder, and the cam-follower follows the inner surface of the cylinder.

In all applications shown, the cam-follower may be or comprise a wheel.

In all applications shown with circular cam, a Scotch yoke or crankshaft can have sliding bearings or ball-bearings. For example, when an excenter driver comprises a crankshaft, the excenter follower may comprise a crank bearing controlling an orbital movement of a non-rotating pressure changing part or component. Such bearings have been omitted from the drawings for clarity.

Oscillation and scroll-type orbiting transmissions are known, and are not shown in the drawings for clarity.

The excenter transmissions disclosed herein do not exclude gear transmissions as another choice for the same movement(s).

All of the expanders can also work as compressors and vice versa (except certain compressors with check valves), generally with all rotations and orbits being in opposite directions, and all the intake ports switching to exhaust ports and vice versa. Alternatively, an expander can be transformed to a compressor and vice versa by keeping the rotation direction of the piston and cylinder and changing the port connections, or changing the timing of the ports. All epitrochoid devices (external-loop, inner-loop, single-loop, etc.) can be used as expanders and compressors with timing valves, and as compressors with check valves. The designs of the ports as shown in the Figures are merely examples.

CONCLUSIONS

The present invention relates to a pressure changing device (e.g., an expander, a compressor, a pump, or a liquid pressure energy reclaiming device) and methods of making and using the same. The present pressure changing device may include a trochoid cylinder or piston. The trochoid piston may have a cross-sectional shape of an inner loop limaçon, single loop limaçon or Wankel type epitrochoid. The limaçon cylinder may have a cross-sectional shape of an outer loop limaçon, single loop limaçon or Wankel type epitrochoid. In the present pressure changing device, the cylinder and the piston may rotate in the same or opposite direction, the cylinder may rotate and the piston may oscillate, the cylinder may oscillate and the piston may rotate, the cylinder may rotate and the piston may be fixed, the piston may rotate and the cylinder may orbit around a fixed axis (but not rotate), or the cylinder may rotate and the piston may orbit around a fixed axis (but not rotate), among the possibilities for relative movement between the cylinder and piston. Generally, the pressure changing device includes intake and exhaust ports.

Advantageously, the present pressure changing device is easier than prior pressure changing devices to manufacture and repair. The present pressure changing device can provide efficient gap sealing in the high-pressure expansion part of the cycle. The present pressure changing device can avoid any need for gears in the piston(s), thereby enabling separation of any transmission from the piston and cylinder, which facilitates the use of ceramic pistons and cylinders. Embodiments that include an elliptic cylinder can separate the intake port and the exhaust port by 180°, and generally have a relatively low production cost. Embodiments of the present pressure changing device using two fixed shafts may increase stability compared to an orbiting shaft. This is important for small sealing gap. Embodiments of the present pressure changing device using oscillating movements can avoid any need for gears. Embodiments that include a limaçon cylinder can use one space or volume on one side of the cylinder as a compression space and another space or volume on another side of the cylinder as an expander space simultaneously in the same cylinder, during a single rotation of the piston. Furthermore, certain embodiments of the present pressure changing device can separate the compression and expansion volumes or spaces with a relatively long sealing gap between the piston and the cylinder during most of the high-pressure part of the cycle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A pressure changing device comprising (i) a helical or screw-type cylinder with an internal surface with a cross-section that is an ellipse and (ii) a helical or screw-type piston with an external surface with a cross-section that is an inner loop limaçon, wherein said piston defines at least one pressure changing space in said cylinder.

2. The pressure changing device of claim 1, wherein said cylinder is fixed, said piston rotates around a first axis, and said first axis orbits around a second fixed axis.

3. The pressure changing device of claim 1, wherein said cylinder rotates around a first fixed axis, and said first axis orbits around a second fixed axis, and said piston is fixed.

4. The pressure changing device of claim 1, wherein said cylinder rotates around a first fixed axis, and said piston rotates around a second fixed axis.

5. The pressure changing device of claim 1, wherein said piston rotates around a first fixed axis, and said cylinder orbits around a second fixed axis without rotation.

6. The pressure changing device of claim 1, wherein said cylinder rotates around a first fixed axis, and said piston orbits around a second fixed axis without rotation.

7. The pressure changing device of claim 1, comprising a progressing cavity with a cross-sectional area that continuously diminishes or expands along an axis of the cylinder.

8. The pressure changing device of claim 7, wherein a shape of the inner loop limaçon is defined by a polar equation $r=b+a \cos \alpha$, where b is constant along an axis of the piston, a continuously decreases or increases along the axis of the piston, and said axis of the cylinder is parallel with said axis of the piston.

9. The pressure changing device of claim 8, wherein a and b change in proportion to distance along the axis of the cylinder, and the axis of the cylinder is inclined with respect to the axis of the piston.

10. A system comprising multiple pressure changing devices of claim 1, connected in series.

11. The pressure changing device of claim 1, wherein the fluid is a gas.

12. A compressor, comprising said pressure changing device of claim 11.

13. The compressor of claim 12, further comprising at least one port that includes a check valve.

14. An expander, comprising said pressure changing device of claim 11.

15. The pressure changing device of claim 1, wherein the fluid is a liquid.

16. A pump, comprising said pressure changing device of claim 15.

17. The pump of claim 16, further comprising at least one port that includes a check valve.

18. A liquid pressure energy reclaiming device, comprising said pressure changing device of claim 15.

19. A Brayton cycle engine, comprising the compressor of claim 12, a combustion chamber, and an expander, connected in series.

20. A Brayton cycle engine, comprising a compressor, a combustion chamber, and the expander of claim 14, connected in series.

* * * * *